(12) United States Patent
Patton et al.

(10) Patent No.: US 12,502,308 B2
(45) Date of Patent: Dec. 23, 2025

(54) FLEXIBLE HEATING PADS

(71) Applicant: FLOTHERM, INC., Los Angeles, CA (US)

(72) Inventors: Douglas M. Patton, Irvine, CA (US); Alex W. Demmler, Huntington Beach, CA (US)

(73) Assignee: FLOTHERM, INC., Los Angeles, CA (US)

( * ) Notice: Subject to any disclaimer, the term of this patent is extended or adjusted under 35 U.S.C. 154(b) by 658 days.

(21) Appl. No.: 17/688,755

(22) Filed: Mar. 7, 2022

(65) Prior Publication Data

US 2023/0000667 A1 Jan. 5, 2023

Related U.S. Application Data

(60) Provisional application No. 63/217,692, filed on Jul. 1, 2021.

(51) Int. Cl.
*A61F 7/02* (2006.01)
*A61F 7/00* (2006.01)

(52) U.S. Cl.
CPC ........ *A61F 7/02* (2013.01); *A61F 2007/0045* (2013.01); *A61F 2007/0073* (2013.01); *A61F 2007/0233* (2013.01)

(58) Field of Classification Search
CPC .................................................... A61F 7/007
See application file for complete search history.

(56) References Cited

U.S. PATENT DOCUMENTS

| | | | |
|---|---|---|---|
| 267,435 | A | 11/1882 | Leiter |
| 2,153,357 | A | 4/1939 | Wente |
| 2,531,074 | A | 11/1950 | Miller |
| 2,541,159 | A | 2/1951 | Geiger |
| 2,796,636 | A | 6/1957 | Heerwagen |
| 4,029,087 | A | 6/1977 | Dye |
| 4,107,509 | A | 8/1978 | Scher |
| 4,149,612 | A | 4/1979 | Bschorr |
| 4,177,876 | A | 12/1979 | Pujolle |
| 4,325,461 | A | 4/1982 | Bschorr |
| 4,371,858 | A | 2/1983 | Kanoi et al. |
| 4,442,419 | A | 4/1984 | Kanoi et al. |
| 4,514,714 | A | 4/1985 | Kanoi et al. |

(Continued)

FOREIGN PATENT DOCUMENTS

| | | |
|---|---|---|
| GB | 2010650 A | 6/1979 |
| WO | 9944552 A1 | 9/1999 |
| WO | 2013052281 A1 | 4/2013 |

OTHER PUBLICATIONS

International Search Report and Written Opinion of Int'l Searching Authority for Int'l App. No. PCT/US2022/035346; Oct. 4, 2022.

(Continued)

*Primary Examiner* — Kaitlyn E Smith
(74) *Attorney, Agent, or Firm* — Chang & Hale LLP

(57) ABSTRACT

A heating pad assembly includes a flexible heating pad having a flexible substrate forming a plurality of deflectable tabs and one or more electrically conductive heating traces routed through the plurality of deflectable tabs and configured to radiate heat therefrom in response to electrical current flowing through the one or more heating traces.

20 Claims, 29 Drawing Sheets

(56) References Cited

U.S. PATENT DOCUMENTS

| | | | |
|---|---|---|---|
| 4,624,244 A | 11/1986 | Taheri | |
| 4,688,572 A | 8/1987 | Hubbard et al. | |
| 4,865,020 A | 9/1989 | Bullard | |
| 5,007,411 A | 4/1991 | Dye | |
| 5,074,285 A | 12/1991 | Wright | |
| 5,190,032 A | 3/1993 | Zacoi | |
| 5,372,608 A | 12/1994 | Johnson | |
| 5,405,671 A | 4/1995 | Kamin et al. | |
| 5,411,541 A | 5/1995 | Bell | |
| 5,521,341 A | 5/1996 | Stief et al. | |
| 5,587,564 A | 12/1996 | Stief et al. | |
| 5,626,556 A | 5/1997 | Tobler et al. | |
| 5,674,262 A | 10/1997 | Tumey | |
| 5,851,626 A | 12/1998 | McCorrey et al. | |
| 6,254,554 B1 | 7/2001 | Turtzo | |
| 6,375,673 B1 | 4/2002 | Clifton et al. | |
| 6,375,674 B1 | 4/2002 | Carson | |
| 6,387,065 B1 | 5/2002 | Tumey | |
| 6,478,110 B1 | 11/2002 | Eatwell et al. | |
| 6,792,907 B1 | 9/2004 | Kostun et al. | |
| 7,074,177 B2 | 7/2006 | Pickett et al. | |
| 7,196,289 B2 | 3/2007 | Ellis et al. | |
| 7,249,653 B2 | 7/2007 | Sheng et al. | |
| 7,263,028 B2 | 8/2007 | Thomas et al. | |
| 7,395,898 B2 | 7/2008 | Yang et al. | |
| 7,510,052 B2 | 3/2009 | Ayle | |
| 7,959,657 B1 | 6/2011 | Harsy | |
| 7,972,287 B2 | 7/2011 | Stewart et al. | |
| 8,011,472 B2 | 9/2011 | Tanase et al. | |
| 8,034,007 B2 | 10/2011 | Avitable et al. | |
| 8,162,863 B2 | 4/2012 | Nardi et al. | |
| 8,360,201 B2 | 1/2013 | Tanase | |
| 8,391,540 B2 | 3/2013 | Berriman et al. | |
| 8,454,542 B2 | 6/2013 | Hirata et al. | |
| 8,603,150 B2 | 12/2013 | Kane et al. | |
| 8,616,330 B1 | 12/2013 | McKnight et al. | |
| 8,651,229 B2 | 2/2014 | Franzen | |
| 9,033,906 B2 | 5/2015 | Nolan et al. | |
| 9,144,530 B2 | 9/2015 | Davis et al. | |
| 9,284,727 B2 | 3/2016 | McKnight et al. | |
| 9,956,113 B2 | 5/2018 | Maria et al. | |
| 10,193,209 B2 * | 1/2019 | Blair | H01Q 7/00 |
| 11,191,667 B2 | 12/2021 | Maria et al. | |
| 2002/0107558 A1 | 8/2002 | Clifton et al. | |
| 2004/0133135 A1 | 7/2004 | Diana | |
| 2004/0210176 A1 | 10/2004 | Diana | |
| 2005/0075531 A1 | 4/2005 | Loeb | |
| 2005/0103353 A1 | 5/2005 | Grahn et al. | |
| 2005/0126578 A1 | 6/2005 | Garrison | |
| 2005/0228464 A1 * | 10/2005 | Hammac | A61F 7/007 607/108 |
| 2005/0256556 A1 | 11/2005 | Schirrmacher et al. | |
| 2006/0004245 A1 | 1/2006 | Pickett | |
| 2007/0060988 A1 | 3/2007 | Grenon et al. | |
| 2007/0135743 A1 | 6/2007 | Meyer | |
| 2008/0021531 A1 | 1/2008 | Kane | |
| 2008/0064992 A1 | 3/2008 | Stewart | |
| 2008/0077212 A1 * | 3/2008 | Hammac | A61F 7/007 607/108 |
| 2008/0099609 A1 | 5/2008 | Drost | |
| 2008/0132976 A1 | 6/2008 | Kane | |
| 2008/0135327 A1 | 6/2008 | Matsumura et al. | |
| 2008/0161891 A1 | 7/2008 | Pierre et al. | |
| 2008/0167572 A1 | 7/2008 | Stivoric et al. | |
| 2008/0249444 A1 | 10/2008 | Avitable | |
| 2008/0249449 A1 * | 10/2008 | Brown | A61F 13/085 601/151 |
| 2009/0069731 A1 | 3/2009 | Parish | |
| 2009/0099629 A1 | 4/2009 | Carson et al. | |
| 2009/0177184 A1 | 7/2009 | Christensen | |
| 2009/0221943 A1 | 9/2009 | Burbank et al. | |
| 2009/0227922 A1 | 9/2009 | Nardi | |
| 2009/0228082 A1 | 9/2009 | Ross et al. | |
| 2009/0233045 A1 | 9/2009 | Slama et al. | |
| 2009/0260639 A1 | 10/2009 | Hsu | |
| 2009/0270910 A1 | 10/2009 | Hargens | |
| 2010/0042026 A1 | 2/2010 | Kloecker et al. | |
| 2010/0042027 A1 | 2/2010 | Hirata | |
| 2010/0076356 A1 | 3/2010 | Biondo et al. | |
| 2010/0152821 A1 | 6/2010 | Rein | |
| 2010/0175949 A1 | 7/2010 | Yamaguchi et al. | |
| 2010/0210982 A1 | 8/2010 | Balachandran | |
| 2010/0212999 A1 | 8/2010 | Marion et al. | |
| 2011/0004132 A1 | 1/2011 | Cook | |
| 2011/0051776 A1 * | 3/2011 | Bieberich | G01K 13/20 600/549 |
| 2011/0098792 A1 | 4/2011 | Lowe | |
| 2011/0190675 A1 | 8/2011 | Vess | |
| 2011/0251536 A1 | 10/2011 | Wilford | |
| 2012/0041351 A1 | 2/2012 | Nolan | |
| 2012/0065561 A1 | 3/2012 | Ballas | |
| 2012/0065664 A1 | 3/2012 | Avitable et al. | |
| 2013/0030331 A1 | 1/2013 | Quisenberry | |
| 2013/0052281 A1 | 2/2013 | Farnaby et al. | |
| 2013/0087407 A1 | 4/2013 | McKnight et al. | |
| 2013/0253383 A1 | 9/2013 | Maxon-Maldonado | |
| 2013/0310719 A1 | 11/2013 | Davis | |
| 2013/0324895 A1 | 12/2013 | Avitable et al. | |
| 2014/0207036 A1 | 7/2014 | Perry et al. | |
| 2014/0222121 A1 | 8/2014 | Spence | |
| 2014/0276257 A1 | 9/2014 | Maria et al. | |
| 2014/0350645 A1 | 11/2014 | Diller et al. | |
| 2015/0290065 A1 | 10/2015 | Augustine et al. | |
| 2016/0135706 A1 | 5/2016 | Sullivan et al. | |
| 2016/0228291 A1 | 8/2016 | Calliser et al. | |
| 2017/0135855 A1 | 5/2017 | Stefan et al. | |
| 2017/0258628 A1 | 9/2017 | Awasthi | |
| 2017/0262597 A1 | 9/2017 | Huddar et al. | |
| 2018/0271696 A1 | 9/2018 | Santa Maria et al. | |
| 2019/0373680 A1 | 12/2019 | Barfuss et al. | |
| 2020/0245950 A1 | 8/2020 | Liang | |
| 2020/0246180 A1 | 8/2020 | Liang et al. | |
| 2021/0038259 A1 * | 2/2021 | Langell | A61B 17/42 |
| 2023/0000667 A1 | 1/2023 | Patton et al. | |

OTHER PUBLICATIONS

U.S. Appl. No. 63/089,884, filed Oct. 9, 2020, Douglas M. Patton.
U.S. Appl. No. 63/116,594, filed Nov. 20, 2020, Douglas M. Patton.
U.S. Appl. No. 63/217,692, filed Jul. 1, 2021, Douglas M. Patton.
Extended European Search Report (EPO Form 1507S) and Written Opinion issued Jul. 1, 2025 in EP Application No. 22 83 4080.8,.

* cited by examiner

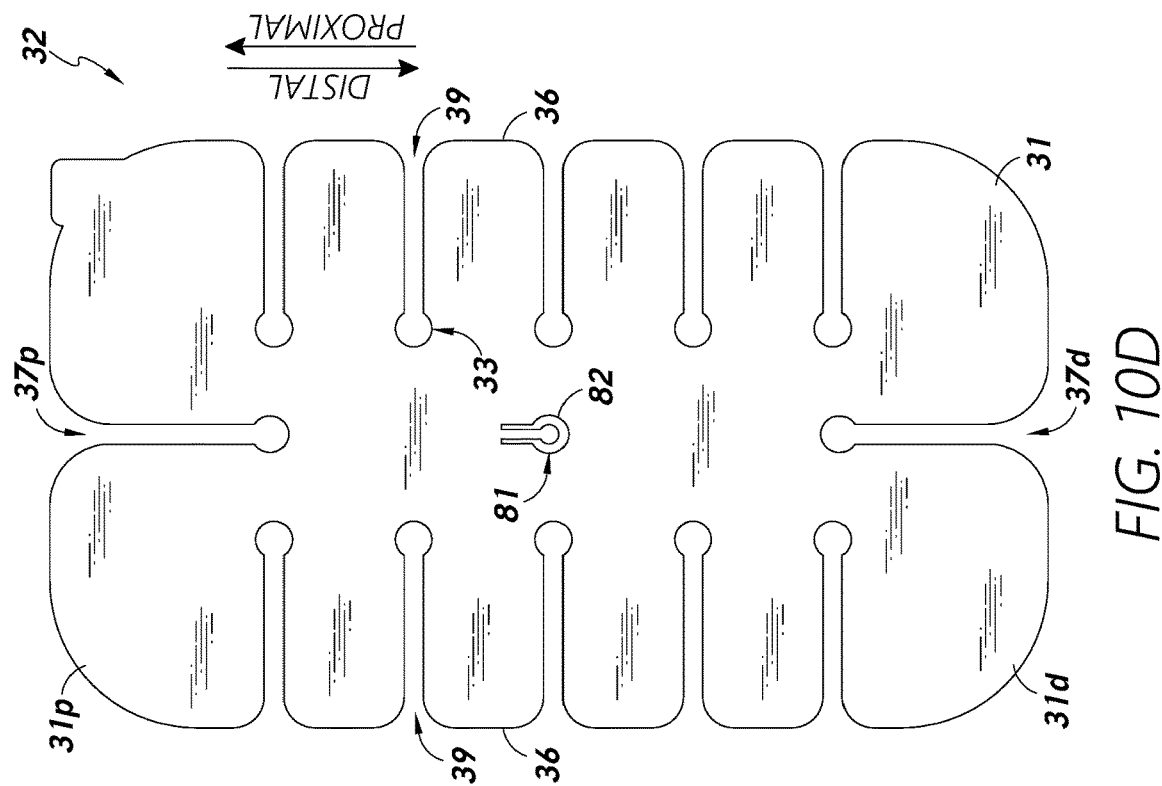
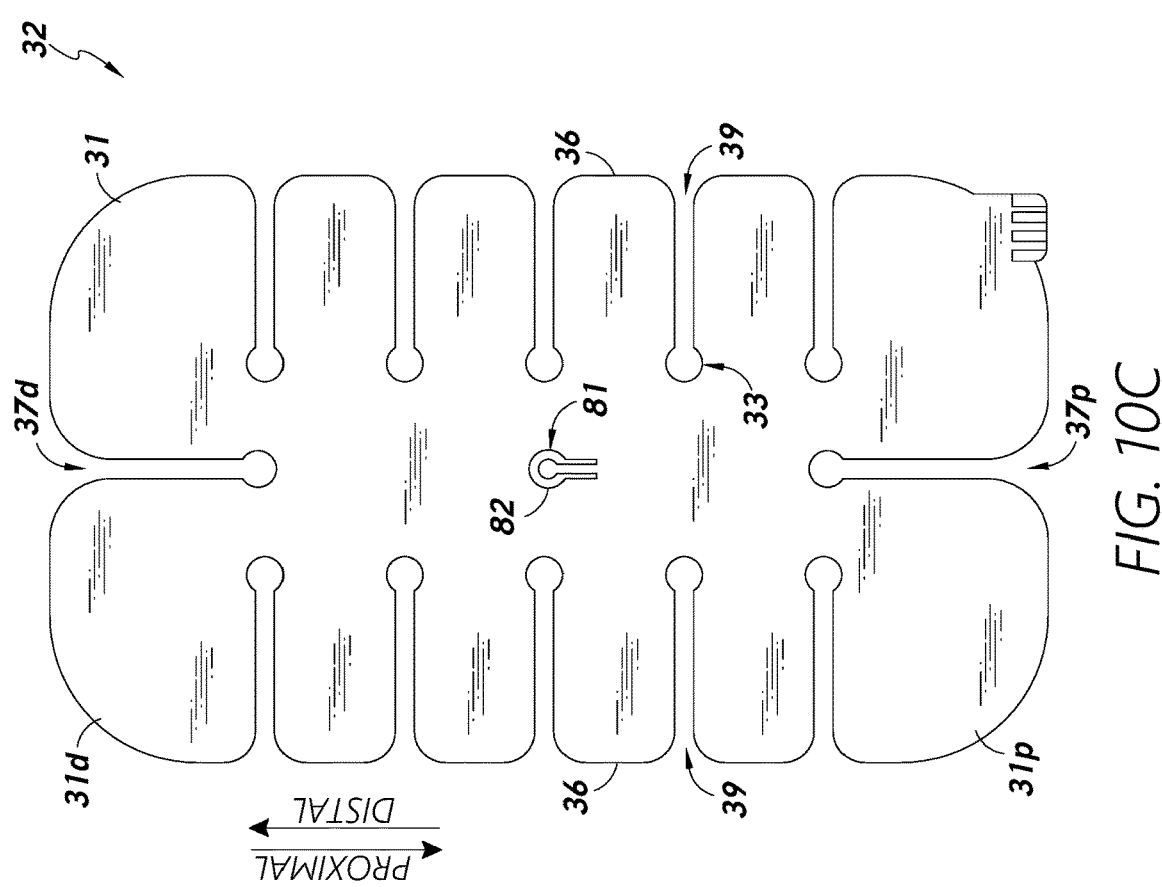

FLEXIBLE HEATING PADS

CROSS-REFERENCE TO RELATED APPLICATION(S)

This application claims priority to U.S. Provisional Application No. 63/217,692, filed Jul. 1, 2021, entitled FLEXIBLE HEATING PAD, the disclosure of which is hereby incorporated by reference in its entirety.

BACKGROUND

Field

The present disclosure relates to the field of heater devices.

Description of Related Art

Heater devices can be used for various applications, including heating a patient during the course of a surgical procedure or other periods. Features of such heater devices, such as profile, heating surface area, and flexibility, can have an effect on heater performance, comfort, and/or other parameters.

SUMMARY

Described herein are systems, devices, and methods for transferring heat. Such heat transfer can be facilitated using certain heat pads and heat pad assemblies. Generally, the conformity of such heating pads to the surface (e.g., anatomy) being heated can affect the amount of heat transfer. Embodiments of the present disclosure include heating pads with shapes, profiles, conductive tracing patterns, and/or other parameters that facilitate efficient heat transfer.

In some implementations, the present disclosure relates to a heating pad assembly comprising a flexible heating pad. The heating pad comprises a flexible substrate forming a plurality of deflectable tabs, and one or more electrically conductive heating traces routed through the plurality of deflectable tabs and configured to radiate heat therefrom in response to electrical current flowing through the one or more heating traces.

In some embodiments, the plurality of deflectable tabs are defined at least in part by one or more slits formed in the flexible substrate. For example, the plurality of deflectable tabs and the one or more slits can have a transverse orientation with respect to length dimension of the flexible heating pad. In some embodiments, the heating pad assembly further comprises a distal longitudinal slit and a proximal longitudinal slit. The heating pad assembly can further comprise a plurality of corner tabs, each of the plurality of corner tabs being defined on one side by one of the distal longitudinal slit or the proximal longitudinal slit. For example, the plurality of corner tabs can be rounded.

The heating pad assembly can further comprise a thermistor. In some embodiments, the thermistor is disposed on at a widthwise center of the flexible substrate. In some embodiments, the flexible substrate includes an internal cut-out that surrounds at least a portion of the thermistor and forms a deflectable tab associated with the thermistor. In some embodiments, the thermistor is electrically coupled to one or more traces that are routed on the flexible substrate along a path that does not overlap with the one or more electrically conductive heating traces.

In some implementations, the present disclosure relates to a heating pad assembly comprising a flexible heating pad. The flexible heating pad comprises a plurality of deflectable tabs and one or more electrically conductive heating traces configured to radiate heat in response to electrical current flowing therethrough. The heating pad assembly further comprises one or more layers of heat-transfer medium in contact with a first side of the flexible heating pad, and a thermal insulator foam structure in contact with a second side of the flexible heating pad that is opposite the first side.

The one or more layers of heat-transfer medium can comprises silicone. In some embodiments, the heating pad assembly is coupled to a sleeve device configured to be worn on a limb of a patient.

The heating pad assembly can further comprise a thermistor associated with the flexible heating pad. In some embodiments, the flexible heating pad is disposed on a deflectable internal tab of the flexible heating pad and the deflectable internal tab passes through at least a portion of the one or more layers of heat-transfer medium.

In some embodiments, the plurality of deflectable tabs include a plurality of transverse tabs and a plurality of corner tabs. For example, the plurality of transverse tabs can be tapered. In some embodiments, two of the plurality of corner tabs have quarter-circular curvature. In some embodiments, a first one of the plurality of transverse tabs has a greater length than a second one of the plurality of transverse tabs. In some embodiments, the flexible heating pad is symmetrical about a longitudinal line.

For purposes of summarizing the disclosure, certain aspects, advantages and novel features have been described. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes and should in no way be interpreted as limiting the scope of the inventions. In addition, various features of different disclosed embodiments can be combined to form additional embodiments, which are part of this disclosure. Throughout the drawings, reference numbers may be reused to indicate correspondence between reference elements.

FIG. 4-1 shows a posterior aspect of portion of a human leg including the popliteal fossa.

FIG. 4-2 shows a heating pad positioned on a popliteal fossa of a human leg in accordance with one or more embodiments.

FIG. 5-1 shows a sole of a human foot.

FIG. 5-2 shows a heating pad positioned on a sole of a human foot in accordance with one or more embodiments.

FIGS. 7-1, 7-2, 7-3, 7-4, and 7-5 show heating pad designs that are generally circular, square, and rectangular, respectively, in accordance with one or more embodiments.

FIGS. 10A-10H show views of a popliteal fossa heating pad in accordance with one or more embodiments.

FIGS. 12-1-12-7 show popliteal fossa heating pad designs in accordance with one or more embodiments.

FIGS. 16-1 and 16-2 show arm heating pad designs in accordance with one or more embodiments.

DETAILED DESCRIPTION

Figure 1:
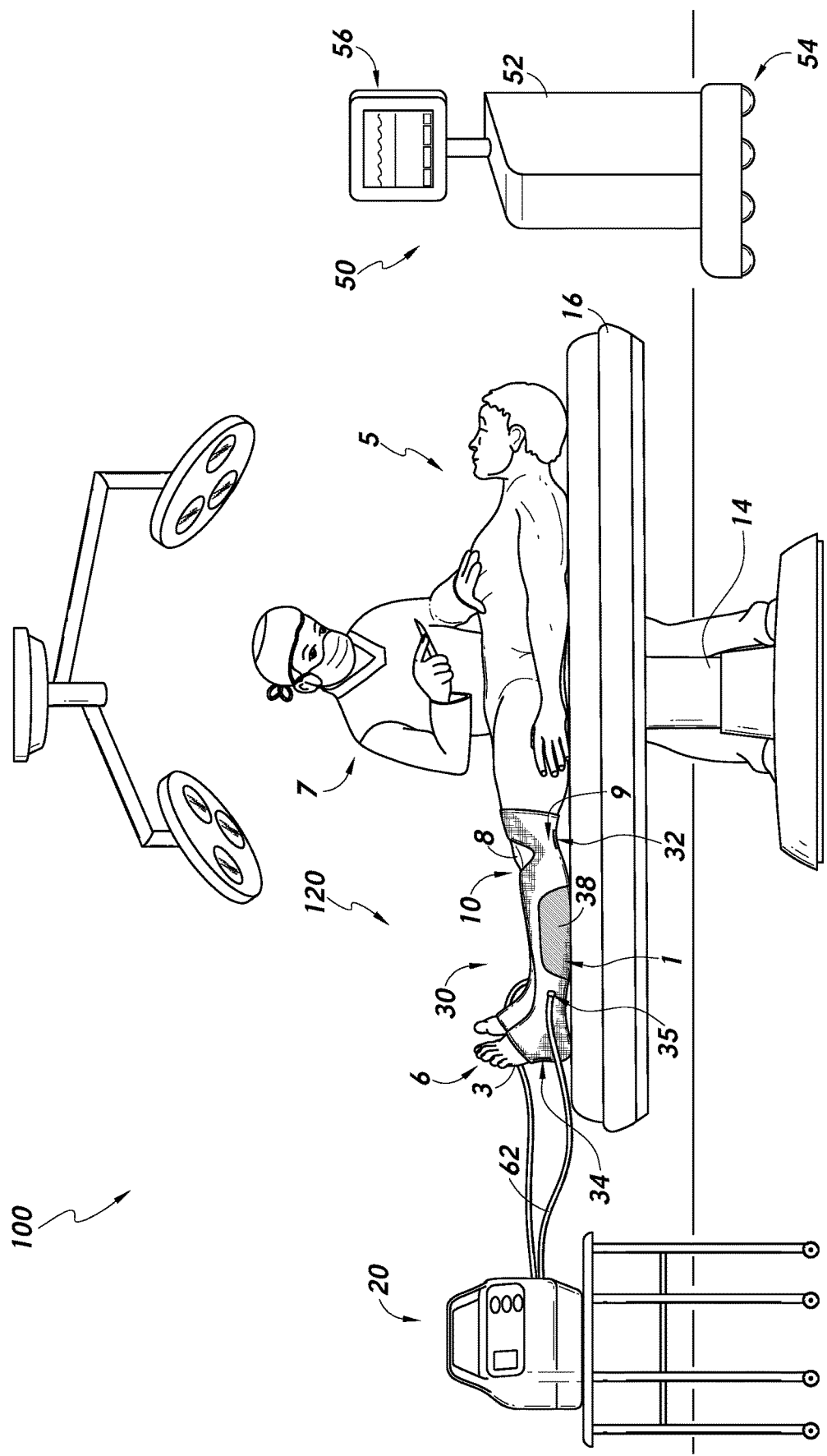
FIG. 1 illustrates an embodiment of a surgical system including a patient-heating subsystem in accordance with one or more embodiments.

The headings provided herein are for convenience only and do not necessarily affect the scope or meaning of the claimed invention. Although certain preferred embodiments and examples are disclosed below, inventive subject matter extends beyond the specifically disclosed embodiments to other alternative embodiments and/or uses and to modifications and equivalents thereof. Thus, the scope of the claims that may arise herefrom is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Although certain spatially relative terms, such as "outer," "inner," "upper," "lower." "below," "above," "vertical." "horizontal," "top," "bottom," and similar terms, are used herein to describe a spatial relationship of one device/element or anatomical structure to another device/element or anatomical structure, it is understood that these terms are used herein for ease of description to describe the positional relationship between element(s)/structures(s), as illustrated in the drawings. It should be understood that spatially relative terms are intended to encompass different orientations of the element(s)/structures(s), in use or operation, in addition to the orientations depicted in the drawings. For example, an element/structure described as "above" another element/structure may represent a position that is below or beside such other element/structure with respect to alternate orientations of the subject patient or element/structure, and vice-versa. It should be understood that spatially relative terms, including those listed above, may be understood relative to a respective illustrated orientation of a referenced figure.

Certain reference numbers are re-used across different figures of the figure set of the present disclosure as a matter of convenience for devices, components, systems, features, and/or modules having features that are similar in one or more respects. However, with respect to any of the embodiments disclosed herein, re-use of common reference numbers in the drawings does not necessarily indicate that such features, devices, components, or modules are identical or similar. Rather, one having ordinary skill in the art may be informed by context with respect to the degree to which usage of common reference numbers can imply similarity between referenced subject matter. Use of a particular reference number in the context of the description of a particular figure can be understood to relate to the identified device, component, aspect, feature, module, or system in that particular figure, and not necessarily to any devices, components, aspects, features, modules, or systems identified by the same reference number in another figure. Furthermore, aspects of separate figures identified with common reference numbers can be interpreted to share characteristics or to be entirely independent of one another.

Overview

The present disclosure relates to systems, devices, and methods for heating and/or maintaining normothermia for a patient, such as during a medical procedure/surgery. Each year, over 60 million surgical procedures are performed in the United States. While great care may be taken to prevent surgical complications, one commonly overlooked and under-addressed problem is the risk of developing hypothermia before, during, or after surgery (referred to as "inadvertent perioperative hypothermia" or "IPH"). For example, patient temperatures can drop precipitously during surgery due to the effects of general anesthesia, lack of insulating clothing, and/or exposure to cold operating room temperatures. Even with modern standards of care, approximately 30-50% of surgical patients may develop hypothermia.

Hypothermia often causes much more than patient discomfort. Patients who suffer even mild IPH can face a significantly elevated risk of developing surgical site infections, cardiac morbidities, intraoperative bleeding, and other avoidable complications. Together, these complications can significantly increase recovery time and overall length of hospital stay, leading to increased costs for all parties. By some estimates, the unmanaged risk for IPH is a $15 billion problem in the United States alone, and yet it is largely overlooked.

Perioperative heat loss can occur predominantly via convective heat transfer, particularly through the palms of the hands, soles of the feet, and exposed surgical site surface area. During preoperative care, patients are often dressed solely in a gown and are often exposed to relatively cold waiting areas with little to no insulation. Although patients are generally only anesthetized at the start of surgery, patients often arrive at the surgical theater moderately hypothermic. This can put a patient at greater risk for developing severe hypothermia once anesthesia has been administered.

Postoperative drops in core temperature can increase the likelihood of developing additional comorbidities, such as morbid cardiac outcomes, surgical site infections, and blood loss, any of which can prolong recovery and hospitalization.

Patients undergoing surgery can develop hypothermia during the surgical procedure itself, especially when the procedure involves the patient's core area, such as procedures involving the posterior or anterior sides of the thoracic, abdominal, and pelvic regions. Surgeries of the core involve the exposure of vital internal organs to the colder environment and thus carry a greater risk of hypothermia. Furthermore, core surgeries often necessitate uncovering of the trunk and chest, which render blankets and many other currently-available interventions inadequate. Once in the operating room, patients may be naked and exposed to a room temperature well below 36 degrees Celsius and to cold liquids used to wash the surgical site during sterilization preparation. At the onset of surgery, delivered anesthetics can immediately impair the normal autonomic thermoregulatory controls. Colder blood may be transferred from the peripheries of the body to the core through a phenomenon known as redistributive hypothermia. Vasodilatation and reduction in muscle tone can cause a significant drop in core temperature within the first half-hour of surgery.

Overall, compared to non-hypothermic patients, those who suffer from IPH experience greater rates of surgical site infections, bleeding, and cardiac complications. Such issues may require additional monitoring and/or increase the length of stay and/or subjective discomfort. The development of IPH is strongly correlated with a multitude of physiological organ system changes impacting the cardiovascular, respiratory, neurologic, immunologic, hematologic, drug-metabolic, and wound-healing mechanisms. The incidence of several post-surgical complications can be increased due to even mild hypothermia.

Intraoperatively, hypothermia can cause a decrease in cardiac output and heart rate, which can lead to ventricular dysrhythmias. Platelet functions can become impaired and there can be a decrease in coagulation factors, which can, in turn, lead to greater intraoperative bleeding and blood loss. Impaired immune functions can increase the rate of surgical site infections. Hypothermia is associated with a four-fold increase in surgical wound infection and twice as many morbid cardiac events. In select procedures such as colorectal, gynecologic, or spinal surgery, where infection rates are normally higher than other surgeries, hypothermia can be exceedingly dangerous to the intraoperative and postoperative recovery. These complications and others are supported in multiple studies and can result in both clinical and economic burdens.

Current methods of preventing hypothermia often are not completely effective. Even with the current interventions, up to 46% of patients are reported to be hypothermic at the start of surgery, and 33% are hypothermic upon arrival to the post-anesthesia care unit (PACU). Assuming the cost savings for maintaining normothermia in one patient is approximately $5,000 per patient, and approximately 30% of the 17 million high-risk surgical patients are hypothermic, a system-wide cost savings of $15 billion could be realized by keeping these patients normothermic. With rising healthcare costs and recent initiatives mandating the maintenance of perioperative normothermia, hospital administrators are in need of new, efficacious and cost-effective devices to address perioperative hypothermia, a product space that has seen little innovation since the introduction of the forced-air warming blanket nearly three decades ago.

Some solutions for perioperative warming may implement forced-air temperature management devices (e.g., warming blankets). For example, some temperature management solutions utilize high-heat transfer conduction heating blankets and intraoperative hand-warming devices. In embodiments in which heated fluid exits a blanket device towards the patient and/or into the surgical environment, such air may introduce certain contaminants into the surgical environment, which can result in infection or other medical issues. That is, it may be desirable for the surgical environment to be substantially sterile to prevent exposure of the patient anatomy, which may be of a particular concern with respect to internal patient anatomy that may be exposed to the surgical environment during the relevant procedure/operation. Forced-air, blanket-type heating systems may further present a relatively cumbersome physical structure that can get in the way, such as when the blanket is disposed in an area near the surgical site. Furthermore, in some situations, operating room staff may turn down the temperature on a forced-air device in consideration of their own comfort, as forced-air systems can heat the surrounding air/environment. Moreover, certain devices may not be used in preoperative warming for one or more of the following reasons, among others: (1) some devices may immobilize the upper limbs, impeding patient mobilization; (2) devices may be cumbersome (e.g., a device may float on the patient and get blown off or fall off during use and/or transport, and they require large, predominantly floor-based blowers that may not be mobile; (3) they may not attach to the patient and/or can become dislodged during transport and obstruct the bed and other monitors and devices; and (4) they can require a conscious administrative decision to implement.

Embodiments of the present disclosure advantageously provide certain improved devices, methods, and systems for maintaining a patient's core body temperature before, during, and/or after surgery. In some embodiments, lower limbs of patients may be leveraged to provide therapy and/or enable mobility. For example, some devices described herein may provide flexibility and/or one or more spaces around a knee, ankle, and/or other portions of a patient's body to allow the patient to flex and/or extend the limbs. Such patient mobility may provide a variety of benefits, including allowing patients to stand up to use the restroom without removing and reapplying the device.

Some embodiments of temperature management devices disclosed herein may be configured to provide warming to one or more arteries and/or veins passing along the patient's lower limbs. Moreover, some embodiments may utilize electrical heating pads comprising one or more electrical conductors configured to radiate heat in response to the flow of electrical current therethrough. Such heating pads may advantageously have certain slits/cut-outs and/or shapes/features designed to permit the pad to assume an uneven topology, thereby allowing for the pad(s) to be placed against, and conform to, an uneven anatomical surface, such as the surface of the popliteal fossa and/or sole of the foot.

Temperature-Management Sleeves and Systems

FIG. 1 illustrates an embodiment of a surgical system 100 including a patient-heating subsystem 120 in accordance with one or more embodiments. The system 100 includes a sleeve-type patient-heating subsystem 120, which can represent an alternative to a blanket-type heating system as referenced above. The sleeve-type heating subsystem 120 can include one or more temperature-management sleeves 30 disposed over and/or on portion(s) of one or more lower limbs 10 (e.g., legs) of the patient 5. The sleeve(s) 30 can include one or more heating elements/devices (referred to herein as "heaters," "heating pads," "heating pad assemblies," etc.), wherein at least one of such heating elements or devices 34 is positioned on or over the sole 3 of the foot 6 of the patient 5 when the sleeve 30 is disposed on the lower limb 10, whereas another heating element/device 32 is placed on or over the popliteal fossa 9 of the lower limb 10, on an opposite side of the limb 10 from the knee 8. The heating pads 32, 34 can have any of the features described herein and may advantageously be flexible and include one or more cut-outs, slits, breaks, channels, or the like that provide hinges and/or other flexible bend points to allow for contortion of the pads to fit the target anatomical topology.

The sleeve 30 may advantageously be open around the knee 8, as shown in FIG. 1, thereby providing flexibility, comfort, and/or access to the knee 8 when the sleeve 30 is disposed on the patient's leg 10. The opening around the knee may further advantageously guide placement of the heating pad 32, such that it is positioned in a desirable position over the popliteal fossa. Furthermore, implementation of the sleeve 30 such that the knee portion is open and/or uncovered may be tenable due to the heating in that region of the leg 10 being focused on and/or limited to the popliteal fossa area 9, which is generally behind the knee on the backside of the leg 10. That is, the sleeve 30 may advantageously not heat the front of the leg in the area of the knee 8, which may be desirable to avoid overheating of the leg and/or knee portion thereof, which may result in injury and/or other complications to the patient 5. Furthermore, the absence of heating pads/devices in the area of the front of the knee can allow for a cut-out in the area of the knee, as shown and described throughout the present disclosure, which can provide improved flexibility/mobility for the limb 10 when the sleeve 30 is secured (e.g., relatively tightly) on the limb 10. Focusing and/or limiting the heating in the upper portion of the sleeve 30 to the popliteal fossa region/area 9 can be effective due to the proximity of certain blood vessels to the skin in the area of the popliteal fossa relative to other areas of the leg, such as the front side of the leg and/or knee 8, where blood vessels may not be as close to the skin, and therefore heating (or cooling) in such areas may not be as effective with respect to increasing (or reducing) and/or maintaining the core temperature of the patient 5.

The temperature-management sleeve 30 may further include one or more fluid-fillable bladders/chambers 38, which may be used for implementing intermittent compression with respect to the leg 10 when the sleeve 30 is disposed on the leg 10 of the patient 5. For example, in some implementations, intermittent compression in the calf area 1 of the leg 10 may be implemented simultaneously with the application of thermal energy/heat to the sole 3 of the foot and the popliteal fossa 9 to facilitate heating of the venous and arterial blood of the patient 5, which may serve to increase the core temperature of the patient. Although fluid-filled bladders are described herein, it should be understood that references to fluid-filled bladders or the like may refer to any type of compression element, whether inflatable, fluid-containing, or any other type of compression element. For example, such compression elements may include certain elastic compression features. In some embodiments, compression elements associated with sleeve devices/structures of the present disclosure can include physical straps and/or smart material(s) configured to implement squeezing and/or relaxing around at least a portion of the calf. In some embodiments, circulation stimulation of the limb 10 may be implemented using electrical stimulation provided by one or more electrodes associated with the sleeve device 30, wherein such stimulation may be in the calf area 1 of the sleeve. The terms "associated" and "associated with" are used herein according to their broad and ordinary meanings. For example, where a first feature, element, component, device, or member is described as being "associated with" a second feature, element, component, device, or member, such description should be understood as indicating that the first feature, element, component, device, or member is physically coupled, attached, or connected to, integrated with, embedded at least partially within, or otherwise physically related to the second feature, element, component, device, or member, whether directly or indirectly.

The patient-heating subsystem 120 can include a control unit, device, or system 20, which may be equipped with one or more fluid-compression devices, electrical power sources, and/or certain control circuitry configured to control the operation of the heating pads/devices 32, 34 and/or compression bladder(s) 38. In some embodiments, the sleeve device 30 includes one or more temperature sensors (e.g., thermistors), which may be generally associated with and/or positioned near the heating pads/devices 32, 34, wherein signals generated by such sensors may be provided to the control unit 20 to provide feedback that may direct operation of the control unit with respect to the application of heating and/or compression to the leg 10. The control unit 20 may include one or more fluid and/or electrical tubes, cables, wires, and/or other connectors 62, which may be used to provide fluid (e.g., air) to the bladder(s) 38 and/or electrically drive the heaters 32, 34 to provide heat to the patient 5. In some embodiments, the control unit 20 is embodied at least in part in/on the sleeve assembly 30.

Figure 2:
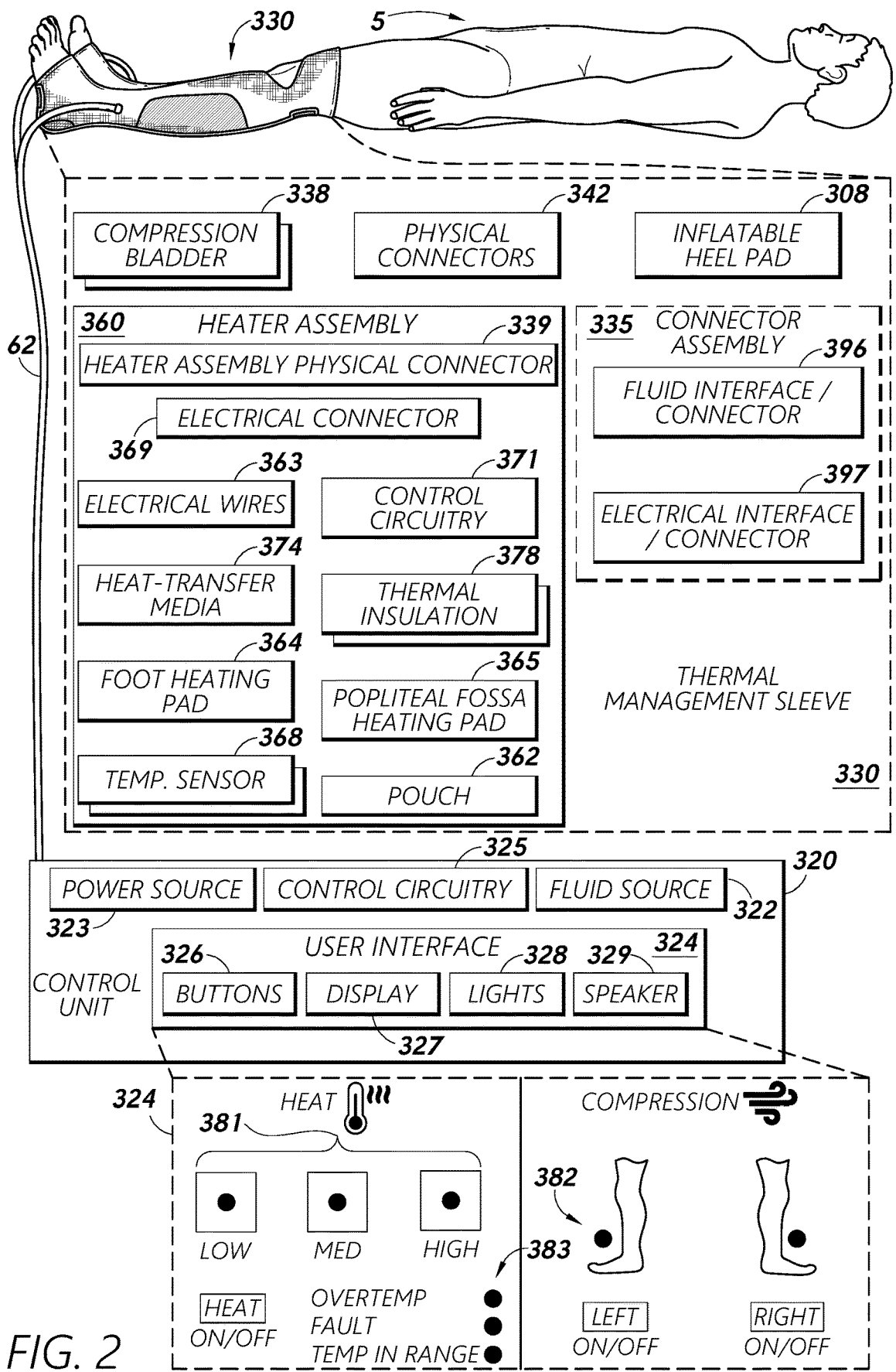
FIG. 2 is a block diagram including components of a temperature-management system in accordance with one or more embodiments.

FIG. 2 is a block diagram including example components of a temperature-management system in accordance with one or more embodiments of the present disclosure. The system includes a temperature-management sleeve 330, which may comprise a body-wearable structure/article/garment configured to be disposed about at least a portion of a limb of the patient 5, such as a lower limb/leg. The term "sleeve" is used herein according to its broad and ordinary meaning, and may refer to any type of sleeve, garment, article, brace, cuff, sock, boot, wrap, or the like configured to be placed and/or secured on or about a limb or other body part of a person. The thermal-management sleeve 330 can include one or more physical connectors 342, which may include one or more straps, clips, clasps, folds, elastically-deformable materials or components, wraps, or other physical components of the sleeve that may be used to secure the sleeve to the limb of the patient.

The sleeve 330 can include one or more compression bladders 338, which may be configured to receive fluid through one or more fluid interfaces/connectors 396 from a fluid source 322 of a control unit or system 320. In some embodiments, the sleeve 330 includes 2, 3, or more compression bladders, which may be individually inflatable and/or depletable to provide sequential compression of the limb of the patient. Although described as compression bladders for convenience, it should be understood that the feature(s) 338 may comprise any type of compression elements. In some embodiments, certain electrical wiring or other electrical connectivity component(s) may be coupled to each compression element 338 for providing electrical power to the respective compression element. For example, electrical current may be provided to the compression element(s) 338 to initiate mechanical tightening or relaxing of the element(s) in order to provide sequential compression of the limb of the patient.

In some embodiments, the sleeve 330 includes an inflatable heel pad 308, which may be fluidly coupled to one or more fluid channels associated with the compression bladder(s) 338. For example, the inflatable heel pad 308 may be configured to receive fluid/air through a one-way fluid valve from one or more of the compression bladder(s) 338 and/or fluid channels associated therewith. The inflatable heel pad 308 may advantageously reduce the risk and/or effects of pressure ulcers (e.g., bedsores) and/or other friction- or pressure-based physical injury that may occur to the heel of the limb on which the sleeve 330 is disposed due to, for example, prolonged positioning of the heel and/or repeated/agitated movement of the heel on the bed or other surface, which may occur during the course of a surgical operation. Although described in connection with certain embodiments as being an inflatable heel pad, it should be understood that any reference herein to a heel pad may be inflatable or non-inflatable. For example, the heel pad 308 can comprise foam or other cushioned material and/or form, which may be associated with a heel portion of the sleeve structure. The heel pad 308 may be a donut-/torus-shaped balloon or foam form.

The sleeve 330 may further have associated therewith a heater assembly 360, which may be removably attached or secured to the sleeve 330 using one or more aspects of the physical connector(s) 342 and/or other attachment means or mechanisms of the sleeve 330. The heater assembly 360 can include a plurality of heating pads/devices disposed within a pouch-type container 362. For example, the pouch 362 may comprise one or more layers of plastic that envelop at least a portion of the heating pads/devices 364, 365. In some embodiments, the heater assembly 360 is contained between fabric layers of the sleeve 330. For example, the heating assembly may be stitched or welded in place in/on the sleeve 330. In such embodiments, the heating assembly may not be contained in a pouch-type container 362 (e.g., polymer pouch), but rather the heating pads and connecting wires may be stitched/welded into/onto the sleeve 330.

The heating pads of the heater assembly 360 may include a foot heating pad 364 and a popliteal fossa heating pad 365. The term "heating pad" is used herein according to its broad and ordinary meaning, and may refer to a heating element that has a relatively broad surface configured to apply heat over a broad (e.g., relatively flat and/or contoured) area, such as an area of the sole of the foot and/or area of the popliteal fossa, or any other area corresponding to the form factor of the heating element/pad. Furthermore, the term "heating pad," as used herein, may refer to the heating element itself, such as a resistive heating element implemented on an at least partially flat substrate or in an at least partially flat plane or form, and/or may be used to refer to a portion of a heater assembly including a heating element and one or more layers or components associated therewith and/or disposed adjacent thereto.

Although embodiments are described herein in the context of heating, it should be understood the various embodiments of temperature management systems and devices disclosed herein can be implemented to provide cooling to the limb of a patient. That is, any reference herein to heating, heating pads, heater assemblies, and/or other heating systems, processes, devices, or the like can be understood to refer to cooling, cooling pads, cooling assemblies, and/or other cooling systems, processes, devices, or the like. Furthermore, it should be understood that the various devices, systems, and processes disclosed herein can be used/implemented to perform or incorporate both heating and cooling functionality. In some embodiments, cooling using a cooling pad is implemented utilizing thermoelectric cooling element(s).

The structure of sleeves disclosed herein may include certain holes or other attachment features for attaching various components of a temperature-management system, including heater/cooler assemblies, physical connectors, tubes, pads, or other features. For example, certain straps (e.g., velcro) may be implemented to attach various components.

Certain electrical wiring and/or other type(s) of conductive tracing(s) 363 may generally be coupled to each of the foot heating pad 364 and the popliteal fossa heating pad 365 for providing electrical power to the respective heating elements/devices. For example, electrical current may be provided through the electrical wires 363 and through resistive conductor(s) of the respective heating pads to generate radiative heat. That is, the foot heating pad 364 and the popliteal fossa heating pad 365 may operate as resistive heaters that are configured to heat certain portions of the patient's anatomy through infrared/heat radiation. It should be understood that any references herein to electrical wiring can be understood to refer to any type of electrically-conductive tracing, or any other signal-transmission medium, means, or mechanism. For example, such signal-transmission means may comprise a pneumatic signal transmission system, which may include an air/gas-filled tube used for signal transmission in some implementations.

In some embodiments, the heating pads 364, 365 are associated with certain thermal insulation features 378, which may be disposed on a side of the heating pads that is generally away from the patient when the sleeve 330 is disposed on the patient's limb. Such insulation may reduce the risk of burn or damage from contact with the outside of the sleeve. Such insulation may further serve to direct heat in the direction of the patient rather than outwardly away from the patient when the heating pads are activated. In some embodiments, heat-transfer media 374 may be applied to one or more heating surfaces or areas of the respective heating pads 364, 365, wherein such transfer media may advantageously promote thermal conduction/transfer from the heating pads to the patient's skin. In some embodiments, heat transfer media can be applied to a patient-facing surface/area of the heating pad(s) 364, 365 and/or sleeve 330 to facilitate heat transfer between the sleeve and the patient's skin.

In some embodiments, the heater assembly 360 includes certain control circuitry 371, which may be implemented on one or more circuit boards or other electrical modules/devices electrically coupled to the wiring 363 in some manner. For example, in some embodiments, the control circuitry 371 may be implemented at least in part in one or more boards and/or chips disposed adjacent to and/or on one or more of the heating pads 364, 365. For example, the heating pads may comprise substrates on/in which resistive heating conductors are disposed, wherein the control circuitry is implemented in/on an area of the substrate that is not covered by the resistive heating conductors. The term "control circuitry" is used herein according to its broad and ordinary meaning, and may refer to any collection of processors, processing circuitry, processing modules/units, chips, dies (e.g., semiconductor dies including come or more active and/or passive devices and/or connectivity circuitry), microprocessors, micro-controllers, digital signal processors, microcomputers, central processing units, field programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. Control circuitry referenced herein may further comprise one or more, storage devices, which may be embodied in a single memory device, a plurality of memory devices, and/or embedded circuitry of a device. Such data storage may comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware and/or software state machine, analog circuitry, digital circuitry, and/or logic circuitry, data storage device(s)/register(s) storing any associated operational instructions may be embedded within, or external to, the circuitry comprising the state machine, analog circuitry, digital circuitry, and/or logic circuitry.

The heater assembly 360 includes physical connector component(s) 339 that physically connect between the foot heating pad 364 and the popliteal fossa heating pad 365 to allow for the heater assembly 360 to span the distance between the popliteal fossa and the sole of the foot of the patient in a manner such that the heater assembly 360 provides a substantially unitary structure that can be placed and span the distance between the popliteal fossa and the sole of the foot. For example, the physical connector 339 may include one or more portions of the electrical wires 363 that connect between the heating pads, and/or between a respective heating pad and an electrical connector 369 of the heater assembly that is configured to be coupled to an electrical interface/connector 397 of the thermal-management sleeve 330. For example, the electrical connector 369 may be configured to be plugged into the electrical interface/connector 397 of the sleeve 330. In some embodiments, the electrical connector 369 is configured to plug directly into one or more cables 62 coupled to the control unit 320. For example, the connector 369 may be configured to be exposed externally from the sleeve 330 when the heater assembly is positioned in/on the sleeve 330.

The heater assembly 360 may further comprise one or more temperature sensors 368, such as one or more thermistors or the like. The temperature sensor(s) 368 may be configured to generate signals indicative of temperatures present and/or experienced at one or more portions of the heater assembly 360 and/or thermal management sleeve 330. For example, the temperature sensors 368 may provide signals indicating temperatures associated with the respective heating pads and/or areas of the sleeve and/or patient anatomy that are disposed/situated in proximity thereto. The temperature sensor(s) 368 may be configured to provide sensor signals to the electrical connector 369 and/or to the control unit 320 via the electrical connector 369 and/or electrical interface/connector 397. The temperature sensor(s) 368 may be disposed on a patient-facing side of the foot 364 and/or popliteal fossa 365 heating pads.

The connector assembly 335 of the thermal-management sleeve 330 may include one or more connectors for coupling to a fluid source 322 of/from the control unit 320, a power source 323 of/from the control unit 320, and/or the electrical connector 369 of the heater assembly. Although the connector assembly 335 is illustrated as including one or more separate fluid interface/connector 396 and electrical interface/connector 397 modules/components, it should be understood that such connectivity features may be implemented in a single connector structure in some embodiments. Furthermore, in some embodiments, either or both of the fluid interface/connector 396 and the electrical interface/connector 397 may be implemented in two or more separate connectors. For example, the electrical interface/connector 397 may comprise a first electrical connector for receiving electrical power from the control unit 320 as well as a second electrical connector for electrically coupling to the electrical connector 369 of the heater assembly 360 to provide power thereto and/or to receive certain electrical signals (e.g., temperature sensor signals) therefrom.

The temperature-management system shown in FIG. 2 further includes a control unit 320. It should be understood that although a single box is used to illustrate the control unit 320, the functionality and/or components associated therewith may be implemented in separate devices, systems, modules, and/or components. The control unit 320 may include a power source 323 configured to provide power to the thermal-management sleeve for powering, for example, the heating elements, the control circuitry 371, and/or temperature sensor(s) 368 of the heater assembly 360. The control unit 320 may further include a fluid source 322, which may comprise one or more air compressors or the like. The fluid source(s) 322 may be used to provide fluid/air to the compression bladder(s) 338 for implementation of sequential compression in the catheter area of the sleeve 330.

The control unit 320 include certain control circuitry 325 configured to implement any of the various functional operations disclosed herein in connection with temperature management solutions of the present disclosure. For example, the control circuitry 325 may be configured to determine when and/or to what degree to activate the compression bladder(s) 338, foot heating pad 364, popliteal fossa heating pad 365, temperature sensor(s) 368, and/or user input/output functionality. The control unit 320 may further comprise certain user interface components, which may further allow for user engagement with the control unit 320 through provision of user input and/or notification/indication of certain information relating to the operation of the control unit 320. For example, the user interface component(s) 324 may include one or more user input buttons and/or one or more user output displays 327, lights 328, speakers or other audible notification means or mechanisms 329, or other input/output components for communication with a user. Example user interface representations are shown in block 324, which shows certain lights or other visual indicators 381 indicating a heating level of one or more heating pads of the heater assembly 360, and/or certain output indicators 383 indicating other conditions of the heater assembly. Additional indicators 382 may be provided to indicate which limb is presently subject to intermittent compression and/or the degree to which such compression is implemented.

In some embodiments, the sleeve 330 includes a pump attachment, such as a mini-pump, which may serve as a fluid source for intermittent compression and/or heated or cooled fluid circulation in the sleeve. The pump attachment may be secured to the calf portion of the sleeve in some implementations. The various components of the thermal management sleeve 330 can be configured to be battery powered. For example, the sleeve may be configured to include one or more battery packs or the like, which may be electrically coupled to the heater assembly 360 and/or one or more components thereof. The battery power source can be a component of the heater assembly in some embodiments. For example, the battery source can be contained within the pouch 362, which may advantageously provide protection from fluids and/or other contaminants for the batter(ies).

Figure 3:
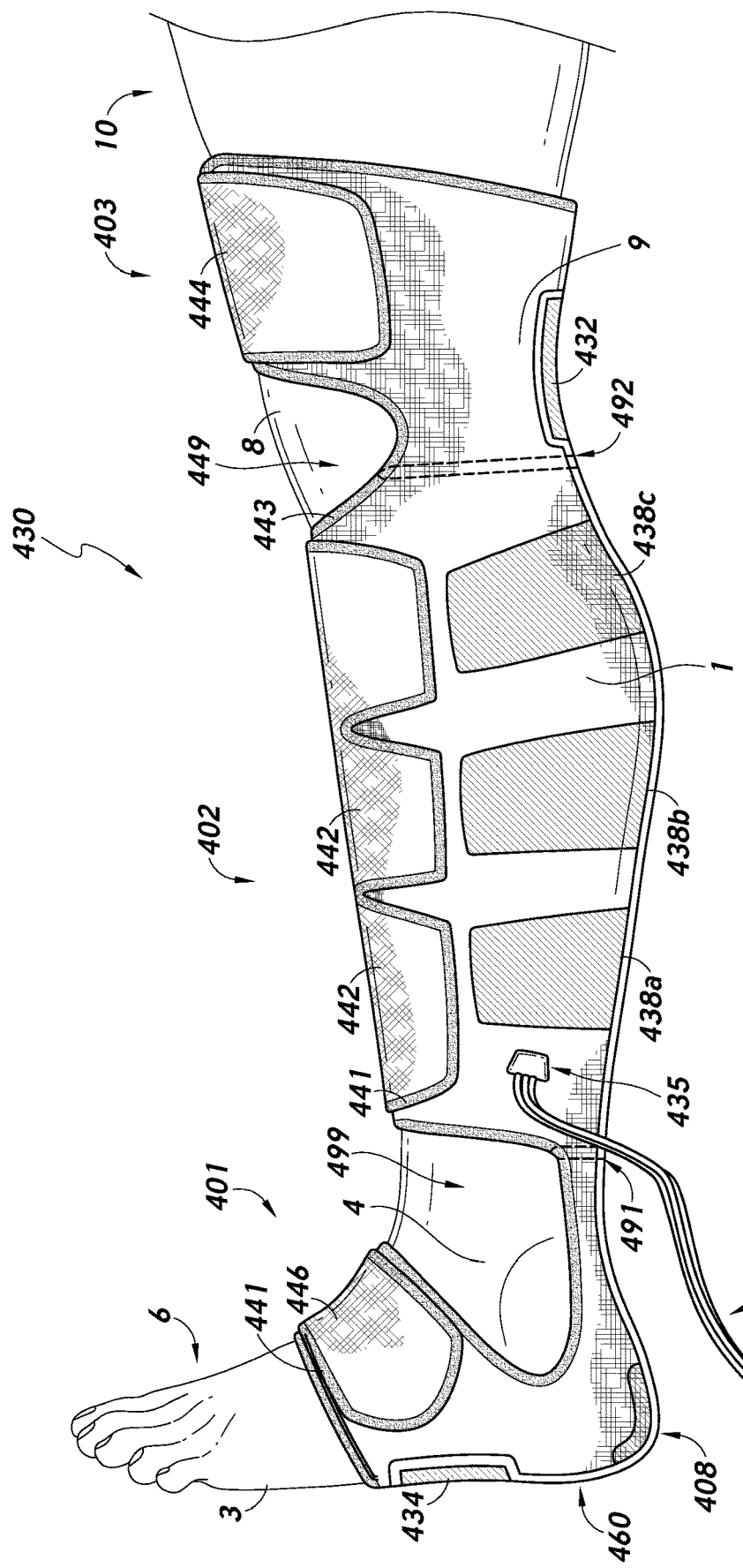
FIG. 3 illustrates a side view of a temperature-management sleeve system secured to a patient in accordance with one or more embodiments.

FIG. 3 illustrates a side view of a temperature-management sleeve system 430 secured to a limb 10 of a patient in accordance with one or more embodiments of the present disclosure. The temperature-management sleeve 430 includes a plurality of heating pads, including a first heating pad 434 disposed in a region of the sleeve 430 that is configured to be placed on and/or in proximity to the sole 3 of a foot 6 of the patient. The sleeve 430 further includes a second heating pad/device 432 that is configured to be situated/disposed on or adjacent to the popliteal fossa region 9 of the patient's limb 10, which may generally be on a backside of the limb 10 opposite the knee 8. The heating pads 432, 434 may be part of a heater assembly 460 that is attachable and/or configured to be coupled to the sleeve 430.

The sleeve 430 further includes a calf portion 402, which may be associated with one or more compression bladders 438, which may be implemented to provide sequential compression for the promotion of blood flow within the limb 10 and/or prevention/treatment of deep vein thrombosis. In some embodiments, sequential compression may be implemented in the calf portion 402 simultaneously with heating of the sole of the foot 3 and the popliteal fossa 9 using the heating pads 434 and 432, respectively. Such simultaneous implementation/execution of the heating and sequential compression as provided by the sleeve system 430 can advantageously provide improved heating and/or temperature maintenance for a patient during a surgical procedure, thereby reducing the risk of hypothermia development as described in detail herein.

In some embodiments, the calf portion 402 of the sleeve 430 is detachable from a foot portion 401 and/or a popliteal fossa portion 403 of the sleeve 430. For example, the sleeve 430 may include a detachable feature or region 491 configured to allow for detachment of the foot portion 401 from the calf portion 402. For example, such detachment/attachment means 491 may comprise a Velcro coupling, and/or other type of clip, strap, tie, snap, or other physical attachment means, mechanism or tearaway feature, wherein the structure of the foot portion 401 can be separated from and/or attached to the calf portion 402. The detachability of the foot portion 401 and/or popliteal fossa portion 403 from the calf portion 402 may allow for the calf portion 402 and associated sequential compression functionality to remain on the limb 10 and/or be implemented even after removal of the foot 401 and/or popliteal fossa 403 portions of the sleeve 430, which may be desirable for the purpose of an increasing patient comfort and/or allowing for patient mobility in certain situations.

The sleeve 430 includes certain physical connectors/couplings, such as one or more calf portion straps 442, foot portion straps 446, and/or popliteal fossa portion straps 444, which may serve to secure the sleeve 430 to the limb 10. The sleeve 430 may further include certain flexibility-enhancement features, such as a knee cut-out/opening 449 and/or ankle cut-out/opening 499. The ankle opening 499 can advantageously allow for rotation of the limb 10 at the ankle 4 with reduced discomfort and/or physical strain on the sleeve 430. The knee opening 449 may advantageously allow for bending of the limb 10 at the knee 8 with reduced obstruction and/or discomfort to the patient.

The sleeve 430 includes a connector assembly 435, which may comprise a physical connector for a fluid source, which may provide heated or non-heated fluid for inflation of the compression bladder(s) 438 and/or heel pad 408, and/or may allow for electrical coupling of the heater assembly 460 associated with the heating pads 432, 434 with an electrical power source, which may be provided from a control unit or the like (not shown in FIG. 3; see FIGS. 1, 2). In some embodiments, the sleeve 430 includes certain visual indicator/color-coordination features 441, 443, which may be used to associate the sleeve 430 with an appropriate heater assembly that is configured and/or designed to fit and/or be attached to the sleeve 430. For example, the heater assembly may have corresponding color indicators indicating the match/association between the heater assembly and the sleeve 430. The color-coordination features 441, 443 may be associated with outer trim, band(s), or similar structural features of the sleeve 430.

Heating Pad Positioning

Embodiments of the present disclosure provide flexible resistive heater pad designs including tab and gap features configured to provide flexibility to conform to compound convexities and concavities of particular anatomies/areas of the human form, such that the heating pads can be utilized to efficiently transfer thermal energy to venous and/or arterial blood vessels in areas where such vessels are relatively close to the skin.

Figures 1, 2, 4:
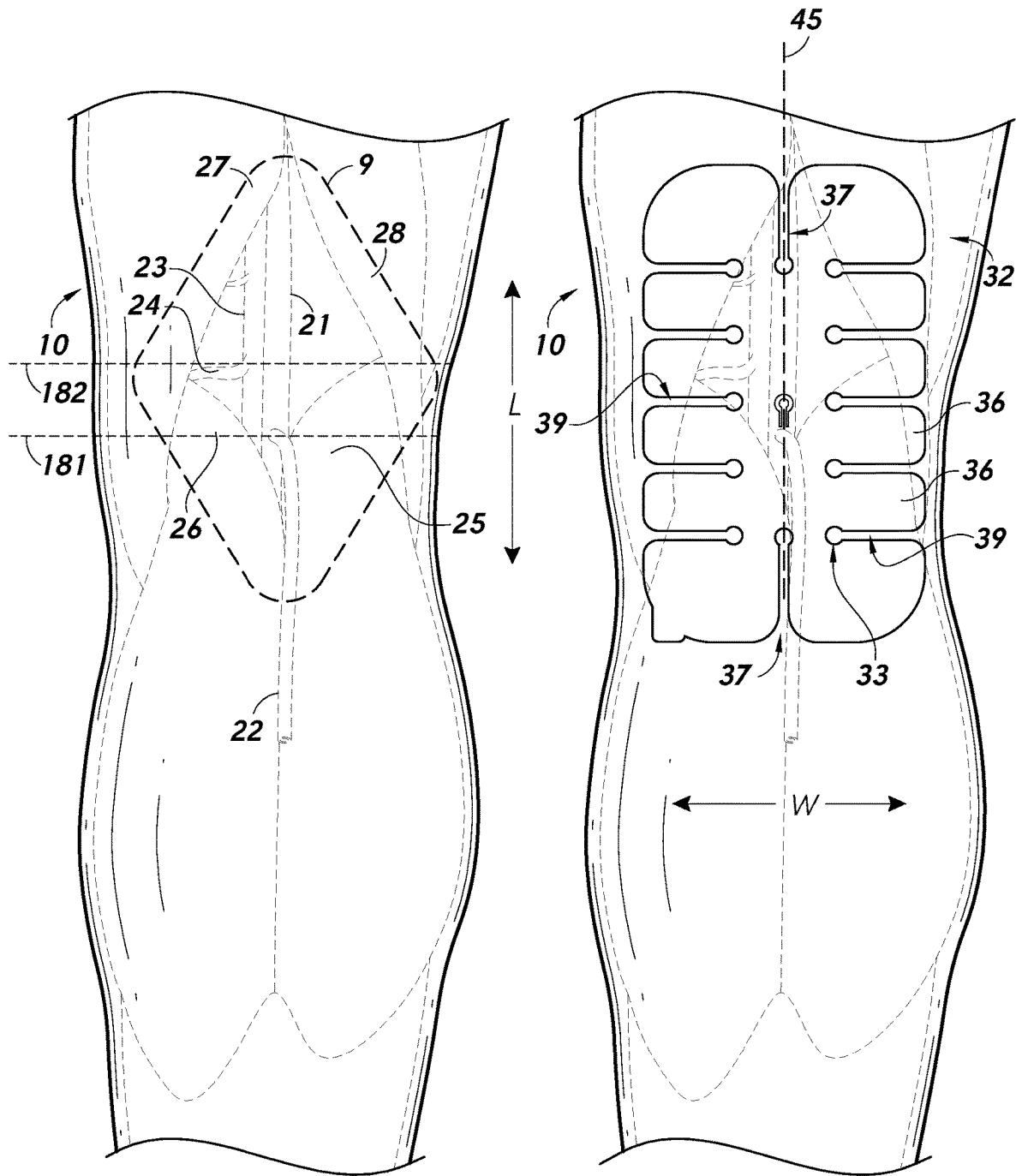

FIG. 4-1 shows a posterior aspect of portion of a human leg 10 including the popliteal fossa 9. The image of FIG. 4-1 shows the popliteal fossa 9 on the back side of the leg 10. Generally, the popliteal fossa 9 is a diamond-shaped depression/area located posterior to the knee joint. Various nerves and blood vessels pass from the thigh to the lower leg by traversing through the popliteal fossa 9. For example, the popliteal artery 23, the popliteal vein 21, the superior medial genicular artery 24, and the small saphenous vein 22 run through the popliteal fossa 9. The blood vessels of the popliteal fossa 9 lie in relatively close proximity to the surface of the skin in the area between/bounded-by the semimembranosus 27, biceps femoris 28, and gastrocnemius 25, 26 muscles.

Due to the exposure of the various blood vessels of the popliteal fossa 9 relatively closely to the skin, as shown in FIG. 4-1, placement of a heating pad over a substantial portion of the popliteal fossa 9 can provide for relatively efficient increasing of the patient's systemic temperature by transferring substantial amounts of heat/thermal energy into the blood flowing through such blood vessels, wherein the patient's temperature can be increased and/or maintained through circulation of the heated blood throughout the body. FIG. 4-2 shows a heating pad 32 positioned on the popliteal fossa 9 in accordance with one or more embodiments.

The vertical (with respect to the upright orientation of the leg shown in FIGS. 4-1 and 4-2) placement/positioning of the heating pad 32 on the leg 10 can be determined/designed based on the relative position of the exposed blood vessel area to the knee structure. For example, The exposed blood vessel center 182 is generally somewhat higher/above the center of the kneecap 181, as shown in FIGS. 4-1 and 4-2. Therefore, the relative position of heating pad 32 to a knee cut-out 449 (see FIG. 3) of a sleeve associated with the heating pad 32 may place the heating pad 32 higher (i.e., farther towards the top of the leg/sleeve) than the center of the knee cap opening 449. The sleeve and/or heating pad 32 may therefore be designed such that the heating pad is positioned in the general area shown in FIG. 4-2.

The heating pad 32 is advantageously designed to allow for contortion thereof to facilitate the resting/placement of the heating pad 32 against the compound surface of the popliteal fossa 9, which generally presents a depression with nonsymmetrical/nonuniform contours, such contoured surface generally varying from patient to patient. The conformal flexibility of the heating pad 32 may be facilitated by one or more slit/cut-out features, which may allow for nonuniform/independent deflection of portions/tabs of the heating pad 32 along lengthwise L and/or widthwise W sides/portions of the heating pad 32. For example, in the illustrated embodiment of FIG. 4-2, the heating pad 32 comprises a plurality of transverse/lateral slits or channels 39 that run from a perimeter of the heating pad 32 towards a centerline 45 of the heating pad 32. Such transverse slits 39 can allow for adjacent tabs 36 formed by the slits/cut-outs 37, 39 to be deflected out-of-plane of the heating pad 32 independently of one another. In some embodiments, as shown in FIG. 4-2, an inner most termination 33 of the slits 39 may expand to form a bulbous void 33, which may reduce the strain on the heating pad form/substrate at the terminus 33 of the slits 39 when the tabs 36 are deflected. In addition to the transverse slits 39, the heating pad 32 may include one or more primarily longitudinal slits 37 on one or more sides/ends of the heating pad 32. Such longitudinal slit(s) 37 may extend into the heating pad form/substrate in the lengthwise direction L, such as towards a longitudinal center of the heating pad. As in FIG. 4-2, the longitudinal slits 37 may be aligned with the centerline 45 of the heating pad 32, or may be positioned at any other position along the width W of the heating pad 32. The terms "slit." "cut-out," "channel." "gap." and similar terms are used herein according to their broad and ordinary meanings, and any reference herein to any one of such list of terms may be interpreted to mean any other of the list of terms.

Figures 1, 5:
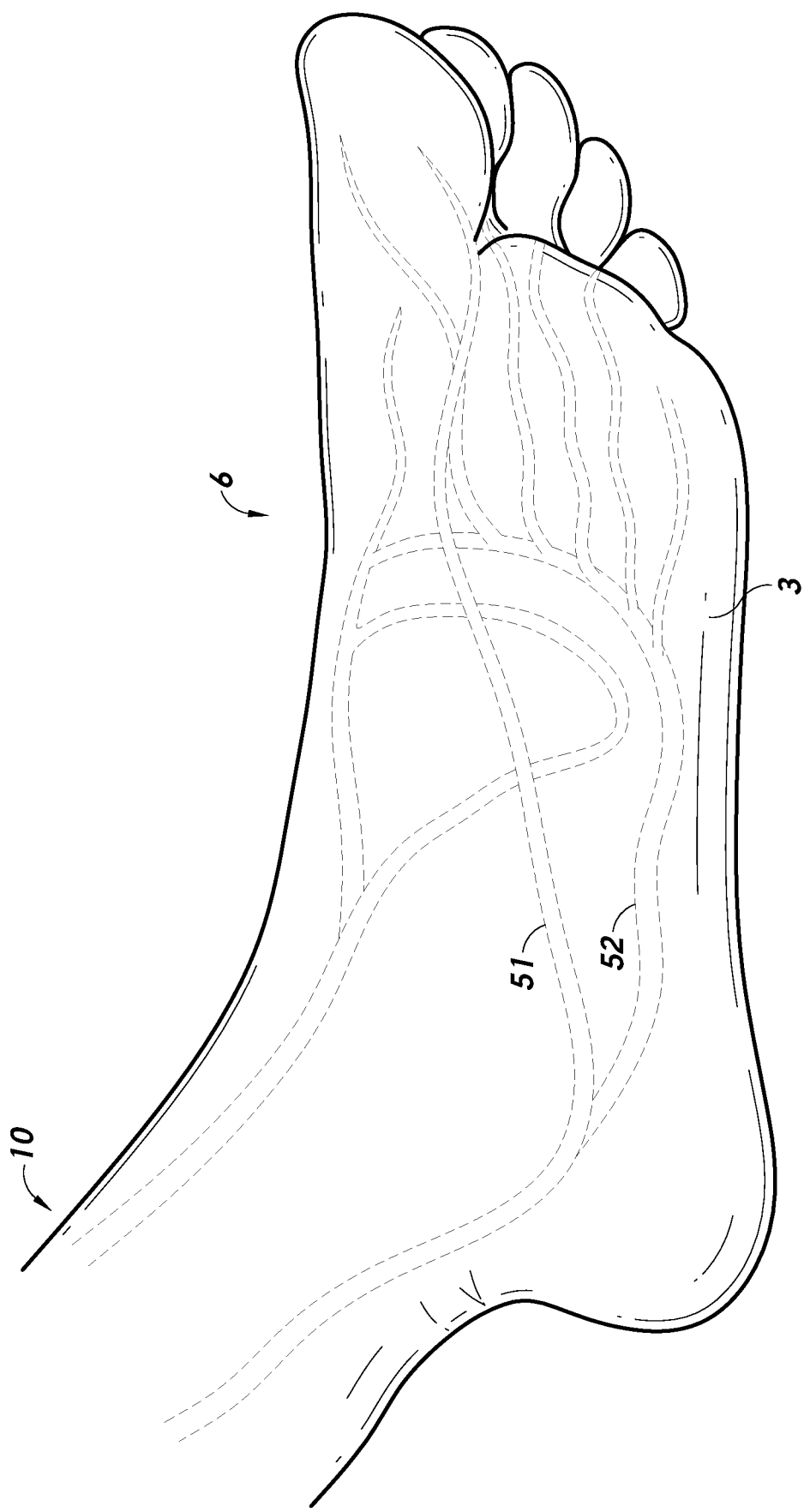
Figures 2, 5:
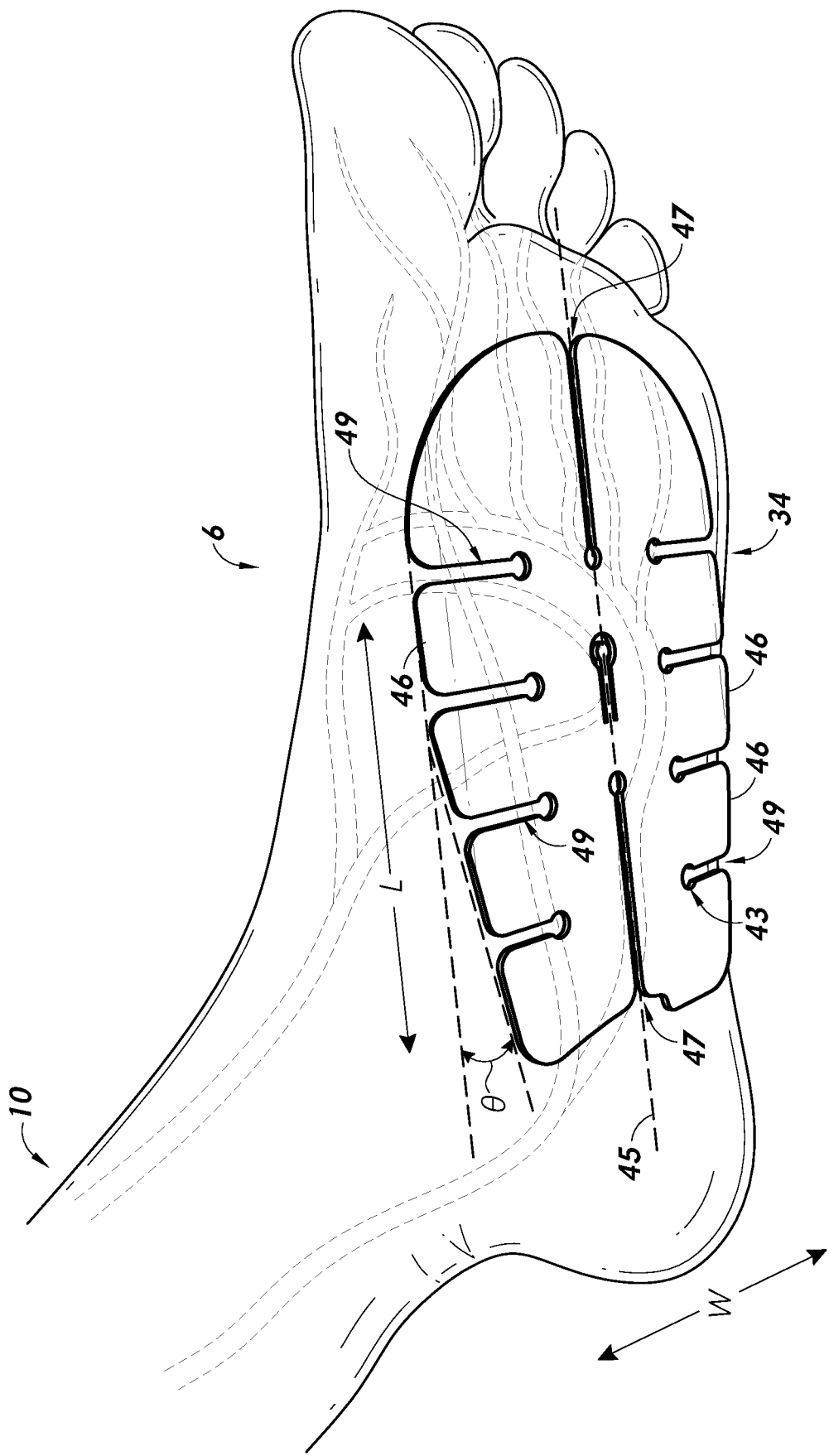

FIG. 5-1 shows a sole of a human foot. The image of FIG. 5-1 shows the sole 4 on the underside of a foot 6 of a patient's leg 10. Generally, the sole 3 is an arched, generally concave surface/area located under the foot. Various nerves and blood vessels pass through the sole 4 of the foot. For example, the popliteal artery 23, the medial plantar artery 51, and the lateral plantar artery 52 run along the sole 3 of the foot. The larger blood vessels of the sole 4 of the foot lie in relatively close proximity to the surface of the skin in the area of the sole 3 compared to surrounding areas, such as the heel. Due to the exposure of the various blood vessels of the sole 3 of the foot relatively closely to the skin, as shown in FIG. 5-1, placement of a heating pad over a substantial portion of the sole 3 of the foot can provide for relatively efficient increasing of the patient's systemic temperature by transferring substantial amounts of heat/thermal energy into the blood flowing through such blood vessels, wherein the patient's temperature can be increased and/or maintained through circulation of the heated blood throughout the body. Such heating can be particularly effective when coupled with heating (e.g., simultaneous heating) of the popliteal fossa, as described herein.

FIG. 5-2 shows a heating pad 34 positioned on the sole 3 of the foot 6 in accordance with one or more embodiments. The heating pad 34 is advantageously designed to allow for contortion thereof to rest against the compound surface of the foot, which generally presents a concave arch with nonsymmetrical/nonuniform contours, such contoured surface generally varying from patient to patient. As with the popliteal fossa heating pad 32 described above, the conformal flexibility of the foot heating pad 34 may be facilitated by one or more slit/cut-out features, which may allow for nonuniform/independent deflection of portions/tabs of the heating pad 34 along lengthwise L and/or widthwise W sides/portions of the heating pad 34. For example, in the illustrated embodiment of FIG. 5-2, the heating pad 34 comprises a plurality of transverse slits or channels 49 that run from a perimeter of the heating pad 34 towards a centerline 45 of the heating pad 42. Such transverse slits 49 can allow for adjacent tabs 46 formed by the slits/cut-outs 47, 49 to be deflected out-of-plane of the heating pad 34 independently of one another. In some embodiments, as shown in FIG. 5-2, an inner most termination 43 of the slits 49 may expand to form a bulbous void/cut-out 43, which may reduce the strain on the heating pad form/substrate at the terminus 43 of the slits 47, 49 when the tabs 46 are deflected. In addition to the transverse slits 49, the heating pad 34 may include one or more primarily longitudinal slits 47 on one or more sides/ends (e.g., lengthwise sides/ends) of the heating pad 34. Such longitudinal slit(s) 47 may extend into the heating pad form in the lengthwise direction L, such as towards a longitudinal center of the heating pad. As in FIG. 5-2, the longitudinal slit(s) 47 may be aligned with the centerline 45 of the heating pad 34, or may be positioned at any other position along the width W of the heating pad 34.

Figure 6:
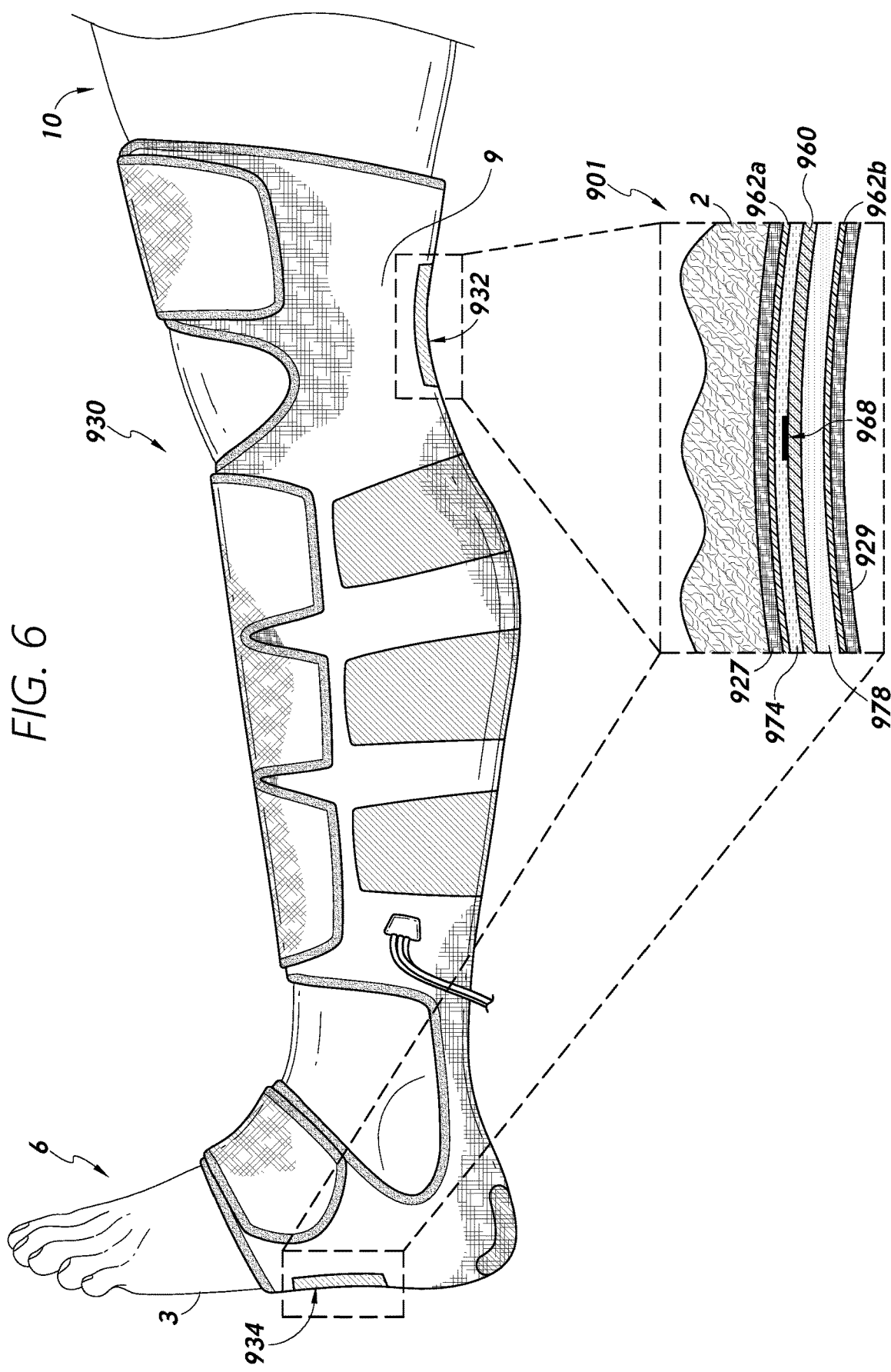
FIG. 6 shows a temperature-management sleeve, including a detailed cross-sectional view of one or more heater portions, in accordance with one or more embodiments.

FIG. 6 shows a temperature-management sleeve 930, including a detailed cross-sectional view of one or more heating pad assembly portions thereof, in accordance with one or more embodiments of the present disclosure. The temperature-management sleeve 930 includes a foot heating pad or portion 934 and/or a popliteal fossa heating pad or portion 932. For example, the foot heating portion 934 may be positioned on or proximate to the sole 3 of a foot 6 of the patient, whereas the popliteal fossa heating portion 932 may be positioned on or proximate to the popliteal fossa 9 of the patient's leg 10. Desirably-close fitting of the various heating pad(s) to the target anatomy can be facilitated by conformal flexibility features as described in detail herein.

The respective heating portions of the sleeve 930 may be embodied at least in part in heater portions of a heater assembly as described in detail in connection with various embodiments disclosed herein. For example, such heater assemblies may include foot and popliteal fossa heating portions, wherein heating pads or other heating elements are physically and/or electrically coupled to one another and/or to portion(s) of a sleeve and/or heater assembly by one or more electrical wires. The detailed image 901 represents a cross-sectional view of an example stack of a heater assembly and relevant/associated portions of the sleeve 930 positioned or disposed around or adjacent to the heating pad assembly portions of the heater assembly. As shown in the detailed image 901, in the respective heating areas of the sleeve 930, a fabric portion of the sleeve 927 may be disposed against the patient tissue/skin 2, wherein a patient-facing plastic layer 962a of the heater assembly may be positioned against the fabric layer 927 of the sleeve. The patient-facing layer 962a of the heater assembly may combine with an outward-facing plastic layer 962b, wherein certain components of the heater assembly are contained between the two plastic layers of the heater assembly in some embodiments. A heat-transfer medium 974, such as thermally-conductive gel or the like may be disposed adjacent to the plastic layer 962a. The thermal-conducting layer 974 may be disposed on a heating element/pad 960, which may be configured according to any of the embodiments disclosed herein and may advantageously be configured to radiate heat in the direction of the patient tissue 2, wherein such radiated heat is conducted through the thermally-conducting medium 974. Some embodiments of the present disclosure do not include the plastic layers 962.

In some embodiments, a thermistor 968, or a plurality of thermistors, is/are disposed on the patient-facing surface of the heating pad/element 960. Although shown directly in contact with the patient-facing surface of the heating element/pad 960, it should be understood that the thermistor(s) 968 may be disposed in any position between the heating pad/element 960 and the patient tissue 2, whether internal to the heater assembly pouch or between the heater assembly pouch and the fabric layer 927, or between the fabric layer 927 and the patient tissue 2. In some embodiments, a backside (i.e., facing away from the patient) of the heating element/pad 960 may be thermally buffered by a thermal insulation layer 978, which may be disposed/present between the heating pad/element 916 and the outward-facing pouch layer 962*b*. In some embodiments, a fabric layer 929 is disposed on outermost portion of the heater assembly. That is, a fabric cover 929 or the like may be placed over the heater assembly when the heater assembly is coupled as desired to the sleeve 930.

Design of Heating Pads and Heating Pad Assemblies

FIGS. 7-1, 7-2, 7-3, 7-4, and 7-5 show heating pad designs that are generally circular 700*a*, square 700*b*, rectangular 700*c*, 700*d*, and tapered 700*e* (collectively and/or individually referred to as heating pads 700 in some contexts), respectively, in accordance with one or more embodiments. As with other figures of the present disclosure, where an alphanumeric reference identifier is used that comprises a numeric portion and an alphabetic portion (e.g., '700*a*,' where '700' is the numeric portion and 'a' is the alphabetic portion), references in the written description to only the numeric portion (e.g., '700') may refer to any feature identified in the figures using such numeric portion (e.g., '700*a*,' '700*b*,' '700*c*,' etc.), even where such features are identified with reference identifiers that concatenate the numeric portion with one or more alphabetic characters (e.g., 'a,' 'b,' etc.). That is, a reference to a feature '739' may be understood to refer to either the identified feature '739*d*' in FIG. 7-4 or the identifier '739*e*' in FIG. 7-5, or both, as an example.

The heater pads 700 can be secured to, or otherwise placed/disposed on, or secured or attached to, a wearable sleeve structure/article, such as a compression-enabled sleeve device as described herein. The heating pads 700 can be configured for placement at or near the sole of a foot, the popliteal fossa of a leg, or any other anatomy or surface (e.g., bend of arm). The heating pads 700 can be part of a pouch-contained or pouch-less heater assembly, as described above. The term "pouch" is used herein according to its broad and ordinary meaning and may refer to any lining, covering, bag, container, compartment, pocket, envelope, or the like, whether sealed or at least partially open and/or whether flexible or rigid in whole or in part. In some embodiments, the heating pads 700 are not contained within a pouch; in such embodiments, the relevant heater assembly components can be stitched, welded, or otherwise secured to a sleeve member/article without a pouch. For example, the heating pads 700 may be stitched, welded, or otherwise secured between layers of fabric or other material of the sleeve member/article, at least with respect to one or more portions of the heating pads.

The heating pads 700 may include certain resistive electrical conductors 710 configured to have electrical current passed therethrough, wherein such current produces radiant heat (e.g., in the form of infrared radiation), which may be used to provide heating to the patient. The electrical conductors 710 may be printed on and/or disposed within one or more layers of non-electrically conductive substrate, which may be made of any suitable or desirable material, such as plastic/polymer (e.g., polyimide or other resin). Such substrate advantageously be flexible to allow for conformity and/or contortion thereof for placement against various nonuniform topologies/surfaces. The traces/conductors can vary in thickness in different embodiments or in different portions/areas of a single embodiment to adjust the watt density and/or other parameter(s) of the respective heating pad(s), such as for the purpose of concentrating heat in certain areas of a heating pad or anatomy for desired (e.g., even) heating effect.

The heating pads 700 may have associated therewith one or more thermistors 768, which may be disposed on and/or buried in the substrate 750, or may be mounted thereto as a discrete component/device. In some embodiments, the substrate includes certain electrical traces/conductors 709 that are electrically isolated from the resistive-heating conductors 710, wherein such other traces/conductors 709 may be used to provide power and/or sensor signals to/from the thermistor(s) 768. For example, the resistive-heating conductors 710 may be designed to follow certain paths/routing that can allow for the routing of conductors 709 to and from the thermistor(s) 768 without shunting/contacting with the resistive-heating conductors 710. Such routing may or may not be in the same substrate layer as the heating conductors/traces 710.

Figures 2, 7:
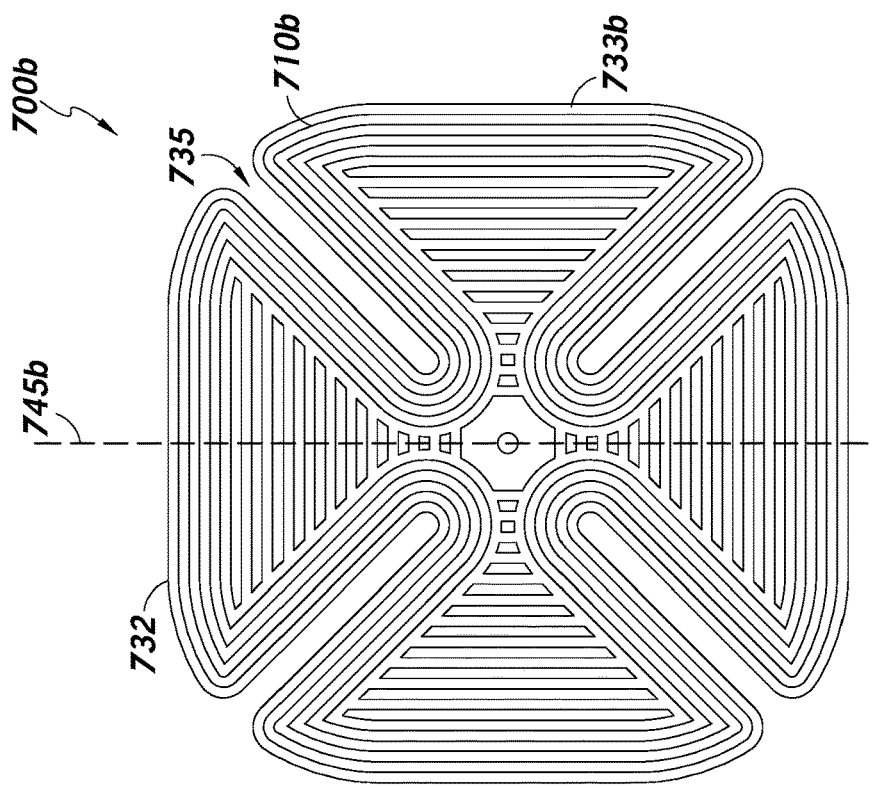
Figures 1, 7:
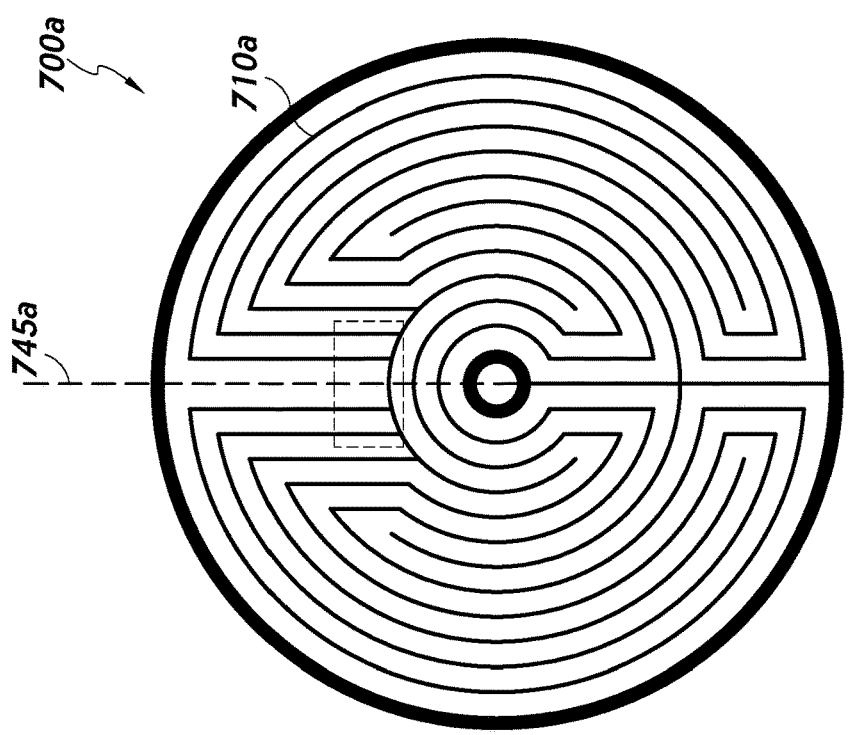
Figures 3, 7:
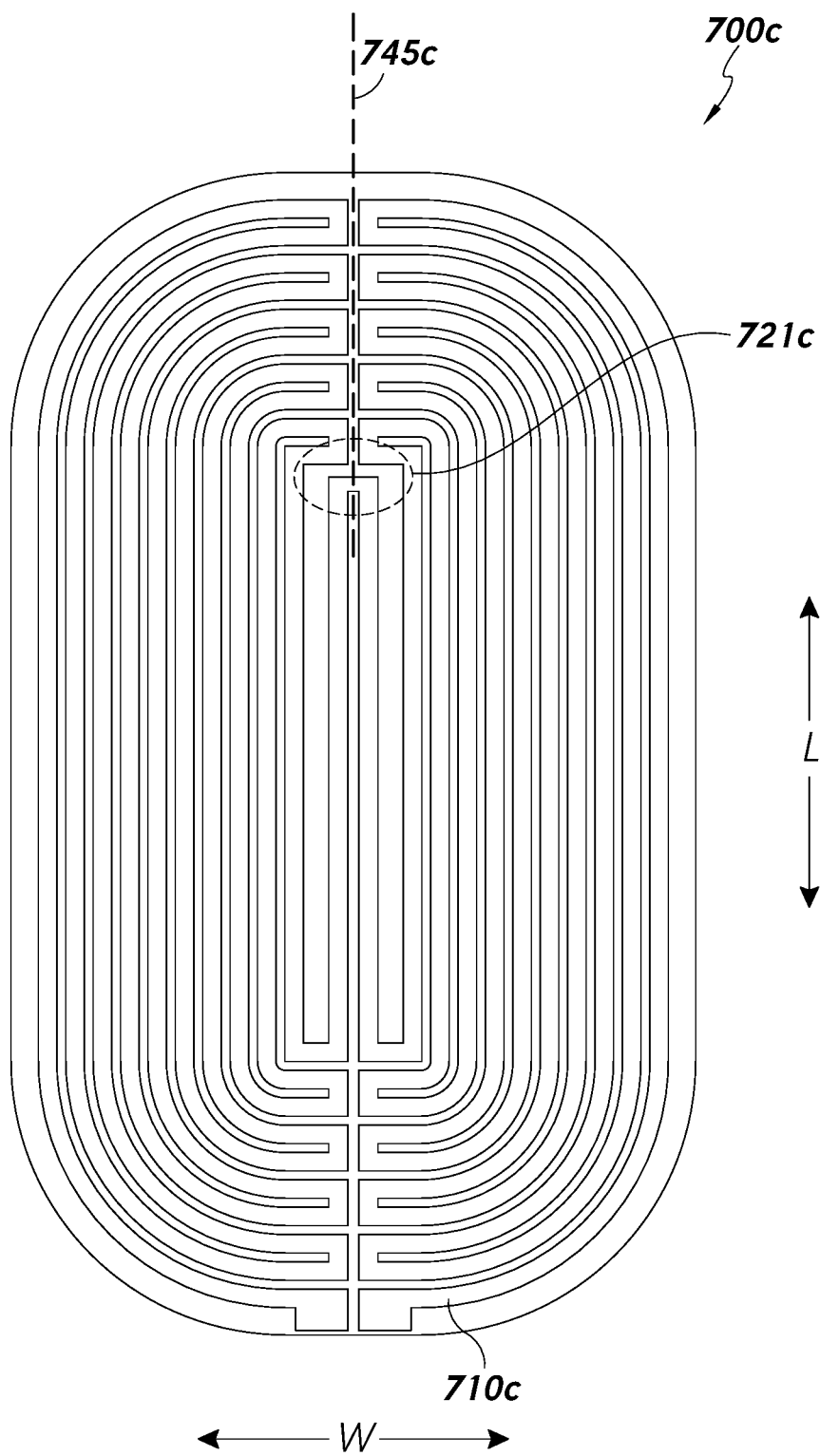
Figures 5, 7:
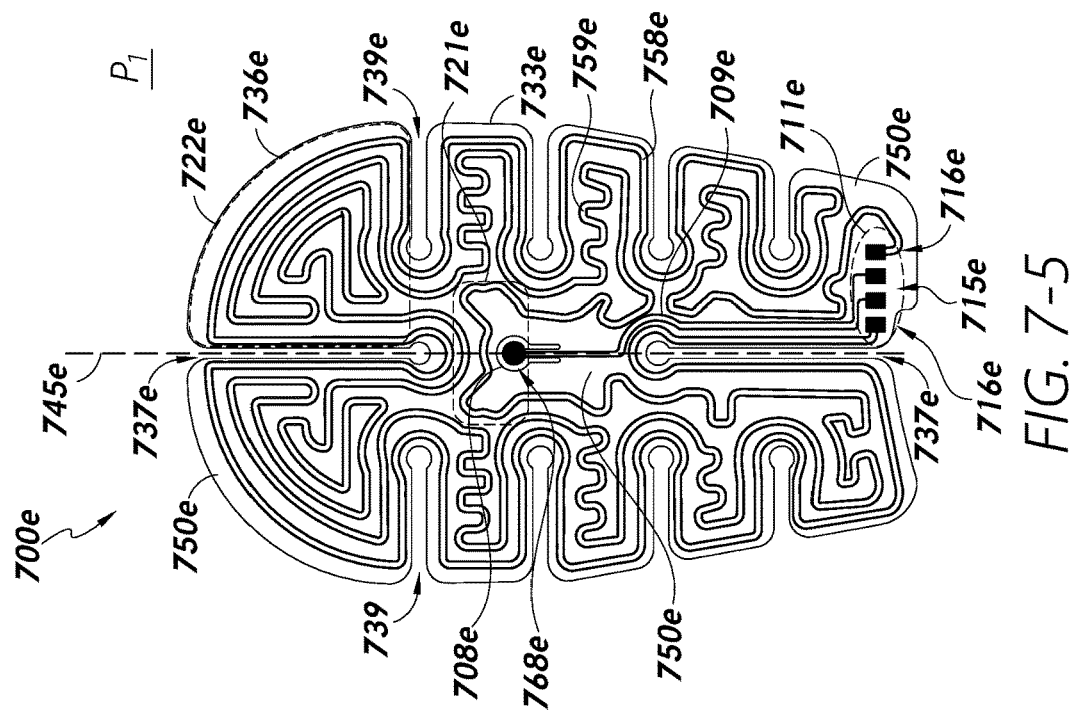
Figures 4, 7:
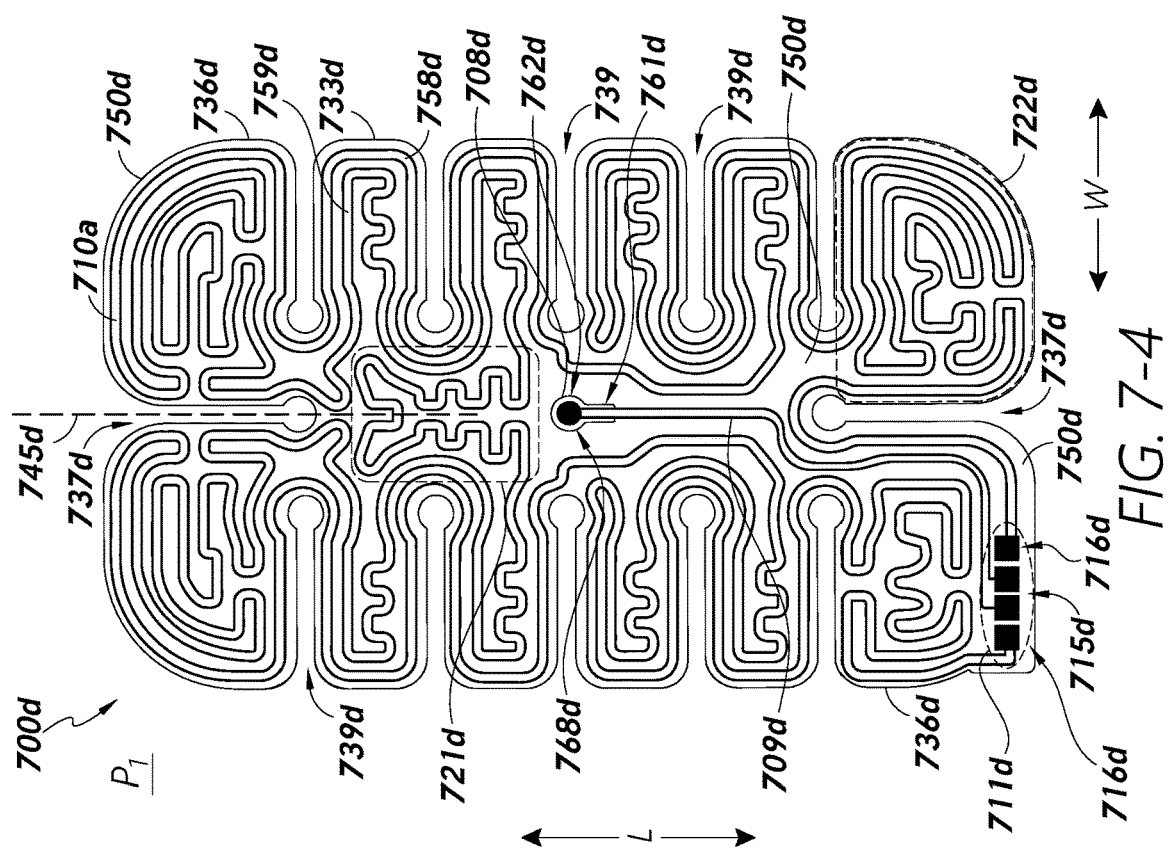

The thermistor(s) 768 may be disposed on, or in proximity to, a patient-facing side of the heating pad 32 and/or substrate 750 thereof, which side is shown in the illustrations of FIGS. 7-1-7-5. The thermistor(s) 768 may be used to provide sensor signals indicating a temperature of the heating pad 700 and/or proximate area, which may include the skin/tissue of the patient in the area of the popliteal fossa and/or the temperature of the sleeve proximate to the heating pad 700. In some embodiments, as in FIGS. 7-4 and 7-5, the thermistor(s) 768 may be centered, or near center, with respect to a center of mass of the heating pad 700.

The heating pads 700 include conformal and flexible substrates 750 with, for example, printed traces that when energized create heat. For example, the substrate 750 may comprise a plane or film that is configured to bend in one or more directions, such that the pad can conform to compound shapes on the human body. Slits and specific forms may be implemented in the heating pad substrates to facilitate such flexing/contortion. The heating conductors/traces 710 can be configured/designed to traverse the area of the substrate in a manner as to complete a circuit with a positive and negative electrical connections, thereby allowing for electrical current injection therethrough. The slits/channels, tabs, projections/extensions, and other shaped implemented in connection with embodiments of the present disclosure can allow the heating pad substrate to conform to any, or most, body forms.

Implementation of flexible, conformal heating pad substrates with slits and tabs as described herein can help eliminate or reduce air gaps between the heating pad and the patient's skin, and can improve efficiency of heat transfer to arterial and venous blood vessels close to the skin surface, thereby effectively heating the blood and raising core body temperature of the patient. Furthermore, some embodiments provide layer(s) of insulation behind heating pads and/or layer(s) of heat-transfer medium (e.g., silicone), which may provide additional flexibility/conformity and insulation for the heating pad. In some embodiments, straps, bands, and/or tapes can be implemented that are specifically designed for particular body parts to aid in conforming the planer substrate/film (e.g., with slits and unique shapes) to conform to the body topology. In some embodiments, adhesive(s) may be implemented with heating pads that aid in conforming the planer substrate/film with inventive slit and shape/tab combinations to conform to the body. In some embodiments, thermistor(s) may be adhered to the heating pad and/or other component of a heating pad assembly in a configuration that is substantially (e.g., directly) over the target veinous/arterial area based on locating topography and/or graphics of the strap system.

In some embodiments, the heating pads 700 (e.g., heating pads 700*d*, 700*e*) include substrate cut-outs around at least a portion of the thermistor(s) 768. For example, the thermistor(s) 768 may be disposed in a central area or region of the heating pad with respect to the width W and/or length L thereof. As with the embodiments 700*d* and 700*e*, unlike the slit cut-outs 735, 737, 739, which are open at a perimeter of the heating pad 700 and/or substrate 750, the cut-out 708 around the thermistor(s) 768 may be substrate-locked and not open to the perimeter of the heating pad 700 in some embodiments. The thermistor cut-out 708 may have any suitable or desirable shape, size, or form. For example, in some embodiments, the cut-out 708 is at least partially elongated and/or has a lengthwise component that allows for deflection of the thermistor 768 and/or portion of the substrate 750 associated therewith to be deflected away from the plane Pi of the heating pad 700 and/or away from the substrate 750 immediately around the cut-out 708. References herein to the "plane" of a heating pad, with respect to the orientations of the heating pads 700 shown in FIGS. 7-1-7-5, may refer to the plane of the page. That is, when a heating pad is flat and not contorted/flexed, such heating pad may generally lie in a plane, wherein the flexibility characteristics of heating pads of the present disclosure may allow for deflection of various tabs or other portions of the flexible substrate thereof away from the plane of the heating pad, such as into or out of the page with respect to the illustrated orientations of FIG. 7-1-7-5. The images of FIG. 7-1-7-5 show example shapes of a thermistor cut-out features 708, which have a generally pear/bulb-type shape including a stem/trunk portion 761 and a bulb portion 762.

The cut-out 708 around the thermistor(s) 768 may provide certain benefits and/or advantages for the heating pads having such features. For example, the cut-out 708 may provide an airgap or other gap between the thermistor(s) 768 and the substrate 750 immediately adjacent thereto and/or surrounding the cut-out 7008, which may provide thermal and/or electrical isolation for the thermistor(s) 768. Such isolation may reduce the risk of corruption of thermistor signals and/or the risk of thermistor readings being undesirably influenced by the thermal conditions of the adjacent portions of the substrate 750. For example, the thermistor 768 may be utilized primarily to determine the temperature at a surface of the patient's skin, rather than the temperature of the heating pad itself, and therefore at least partial thermal isolation from the heating pad may be desirable.

The cut-out 708 may further advantageously provide flexibility to allow for independent deflection of the thermistor(s) 768 out of the plane of the heating pad, which may be desirable for various reasons. For example, the thermistor 768 may be deflected as a means to allow for the thermistor 768 to be protruded/passed through one or more layers of material, such as thermally-conductive medium layer(s) and/or cloth layer(s) that may be disposed generally between the heating pad 700 and the patient's skin when fitted on a patient. That is, such deflection may allow the thermistor to be inserted/threaded/punctured through such layer(s) to come into closer proximity with the patient's skin. Deflection of the thermistor 768 may further be advantageous as allowing the thermistor 768 to maintain a position relatively close to the patient's skin when the heating pad 700 is contorted/flexed to conform to the surface of the patient's anatomy. That is, where the heating pad portions are bent in a manner as to fit/nest within/against an at least partially concave surface, such as the depression of the popliteal fossa and/or arch of the foot, such contortion may cause one or more tabs or other portions of the heating pad to deflect away from the patient-facing side of the center of the heating pad 700. That is, with respect to the orientations of FIG. 7-1-7-5, the contortion of the heating pads 700 to fit against the at least partially concave anatomy may cause deflection of one or more tabs or portions of the heating pads away from the patient (i.e., into the page). When such contortion occurs, the cut-out 708 around the thermistor(s) 768 may allow for the thermistor 768 to be deflected toward the patient's skin (i.e., out of the page with respect to the illustrated orientation) to thereby position the thermistor(s) 768 relatively closer to the patient's skin as a result of such deflection. For example, the thermistor 768 may be biased (e.g., via shape memory) to deflect toward the patient when the substrate 750 is contorted away from the patient in one or more areas around the thermistor 768.

In some embodiments, the heating pads 700 may include electrical contacts 711 which may be configured to electrically couple to certain control circuitry of the heating system via one or more connections. For example, the contacts 711 may include one or more thermistor contacts 715 configured to inject an electrical current through the thermistor(s) 768. For example, the contacts 715 may include an input pin/contact and an output pin/contact to allow for a circuit through the thermistor(s) 768. The contacts 711 may further include one or more heating conductor contacts 716. For example, the contacts 716 may include input and output pins/contacts that allow for current to flow through the conductor(s) 710.

In some embodiments, such as in the embodiment 700*b* shown in FIG. 7-2, the heating pad 700 may include one or more corner slits/cut-outs 735, which may provide flexibility for out-of-plain deflection of transverse/side 733, longitudinal/parallel 732 and/or corner 736 tabs substantially independently of one another, wherein such tabs may be defined by slits/cut-outs on multiple sides thereof. The resistive heating traces 710 may be routed in a manner as to cover and/or occupy a substantial portion of the area of the respective heating pad 700. Therefore, such traces may be routed around, through, and/or traverse the various tabs 732, 733, 736 of the respective heating pads 700 in a manner as to cover a substantial portion of the area thereof. In some embodiments, heating pads 700 are substantially symmetrical, at least with respect to a width dimension W thereof, such as about a lengthwise line/dimension 745, which may bifurcate the heating pad 700 about a central point along the width of the respective heating pad 700 in some embodiments. In some embodiments, the heating traces 710 may traverse the respective heating pads 700 on a first side of the bifurcation line 745 and then move across the bifurcation line in an area 721 from where the trace proceeds to traverse the other side of the line 745.

For heating pad embodiments that include flexibility-enhancing slits 735, 739, 737, the routing of the heating traces 710 may advantageously run around the perimeter of the heating pad and follow along/around the various slits/cut-outs/channels to allow for traversal from one tab (e.g., 733, 736.732) to an adjacent tab around the slit/cut-out/channel separating such tabs. In some embodiments, the resistive heating traces 758 traverse the transverse tabs 733 and/or a subset thereof around a perimeter of the tabs and around the intervening slits/channels 739 through a plurality of transverse tabs 733, wherein the traces then double back 759 through the same tabs to provide additional coverage of the heating traces 710. In some embodiments, as in the heating pad 700*d* and 700*e* shown in FIGS. 7-4 and 7-5, the secondary/interior double-back traces/conductor portions 759 include a zig-zag and/or key-type design/routing to fill in the area between the path of the perimeter traces 758 around the perimeter of the tab 733 to thereby increase the heat transfer associated with a given tab 733. Such key-type interior trace design is shown in the tabs 733 shown in FIGS. 7-4 and 7-5. In some embodiments, corner tabs 736 may include heating trace routing that includes multiple layers/rows of overlapping/passing traces in a maze-type design, as shown in the embodiments of FIGS. 7-4 and 7-5. Such additional double-backing of routing within the tabs 736 may be desirable to cover the area of such tabs in embodiments where such tabs are larger than the transverse tabs 733, and therefor provide greater substrate area to be covered to provide efficient heat transfer therefrom. For the embodiment 700*e* of FIG. 7-5, the distal corner tabs 736*e* may be rounded and have a radius of curvature that is approximately circular (i.e., curved transverse and distal longitudinal sides approximate a quarter circle), such as within 5-10% of exactly circular. For example, the radius of the curve at a medial/central point of the curve (e.g., at 45°, 135° with respect to the illustrated orientation of FIG. 7-5) may be within 10% of the radius/dimension of the tab at the 0°/180° and 90° positions with respect to the illustrated orientation of FIG. 7-5.

Figure 8A:
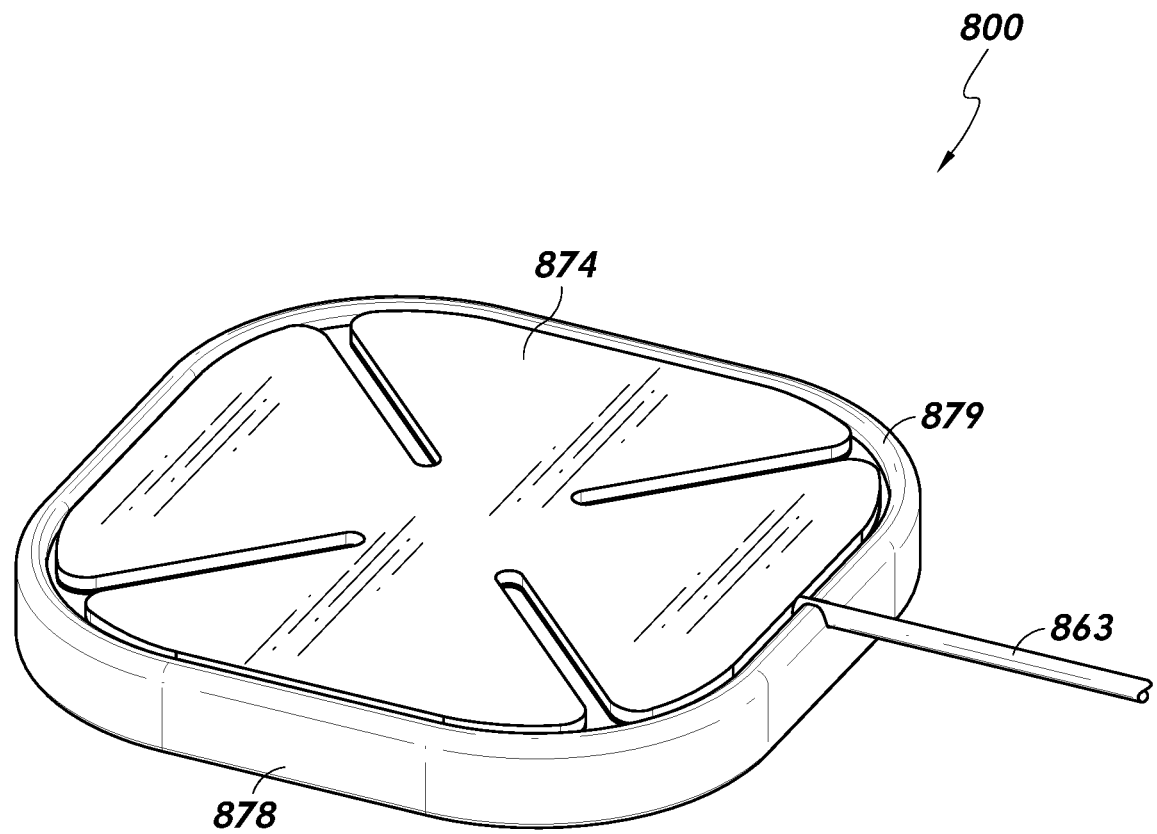
FIGS. 8A and 8B show perspective and exploded views, respectively, of an example heating pad assembly in accordance with one or more embodiments.
Figure 8B:
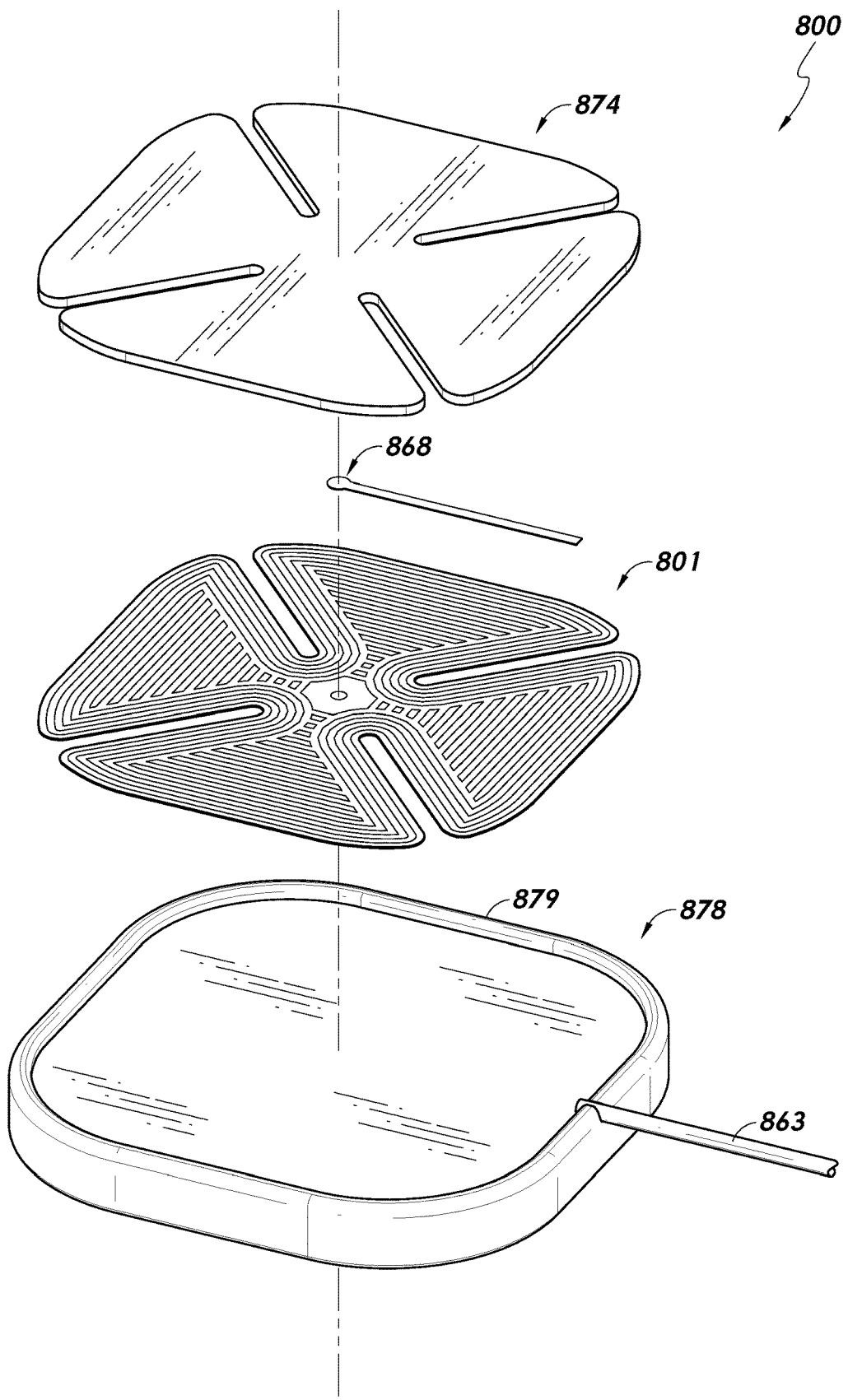

FIGS. 8A and 8B show perspective and exploded views, respectively, of an example heating pad assembly 800 in accordance with one or more embodiments. The heating pad assembly 800 includes a heating pad 801, which may have any suitable or desirable shape, form, and/or heating trace/conductor routing; the heating pad 801 may be any of the heating pads described herein. The assembly 800 may include one or more layers of certain heat-transfer media 874, which may not be present with respect to certain embodiments of heating pad assemblies in accordance with the present disclosure. For example, the heat-transfer media 874 may comprise heat-transfer gel and/or other media configured to facilitate the transfer/conduction of thermal energy from the heating pad 801 through the patient-facing side of the heating pad assembly 800. In some embodiments, the heat transfer medium 874 is disposed on, over, and/or under one or more thermistors 868, which may be used to determine temperature conditions at or near the heating pad 801. In some embodiments, the heat-transfer medium 874 comprises a silicone rubber with relatively high thermal conductivity, wherein such material may be suitable for, and or facilitate, pressure against the patient's skin The heating pad 801 may be any type of heating pad, such as a resistive radiating heating pad. For example, the heating pad 801 may comprise polyimide or other substrate material, which may be flexible or rigid in whole or in part. The heating pad 801, and/or thermistor(s) 868, may be coupled to electrical wiring 863, which may be electrically coupled to an electrical connector.

In some embodiments, the heating pad assembly 800 further includes certain thermal insulation features 878, which may comprise heat-insulating foam and/or padding. Such thermal insulation feature(s) may improve patient and/or physician comfort and/or reduce the risk of injury or damage to equipment from thermal energy originating in the heating pad 801. The insulation features 878 can further advantageously present pressure on the heating pad 801 from behind to push the heating pads towards the patient to thereby improve contact and heat transfer to the patient. The insulation 878 can further improve the efficiency of thermal transfer to the patient by reducing thermal energy dissipation/disbursement away from the patient from the backside (i.e., side facing away from the patient) of the heating pad 801. The heat-transfer layer(s)/medium 874 and/or insulation 878 may have a similar shape and/or profile to that of the heating pad 801. For example, as shown, the heat-transfer medium layer(s) 874 may have a similar shape to the heating pad 801, including similar slits/cut-outs as the heating pad 801, which may improve flexibility of the assembly 801. In some embodiments, the insulation structure 878 has a similar shape to the heating pad 801, but with a slightly larger profile, which may be desirable to provide greater insulation characteristics. In some embodiments, the insulation structure 878 includes a lip 879, which may provide insulation from the sides of the heating pad 801.

A relatively light fabric having moisture-absorbent characteristics may be positioned between the assembly 800 and the patient's skin. The heat-transfer medium 874 may comprise relatively highly thermally-conductive foam (e.g., 6 W/mK), which may help reduce or eliminates airgaps between the assembly 800 and the patients skin. Such material may advantageously retain heat. In some embodiments, the heat-transfer layer(s) 874 (and similar components disclosed herein in connection with other embodiments) has a larger size than the heating pad 801 to provide for greater distribution. The conductive traces on the heating pad 801 may comprise carbon-printed heat trace patterns, which may be printed on a plastic substrate of the heating pad 801.

An adjustable strap of a sleeve device incorporating the heating pad assembly 800 may help to compress the heating pad assembly 800 onto the target body part. The insulation 863 may serve to insulate the patient's anatomy (e.g., popliteal fossa) from, for example, a stainless steel surgical table, which may be relatively cold and/or uncomfortable. The assembly 874 may include a backing of thermally-reflective material, such as metalized mylar or similar, which may advantageously holds in heat for greater efficiency.

Figure 9:
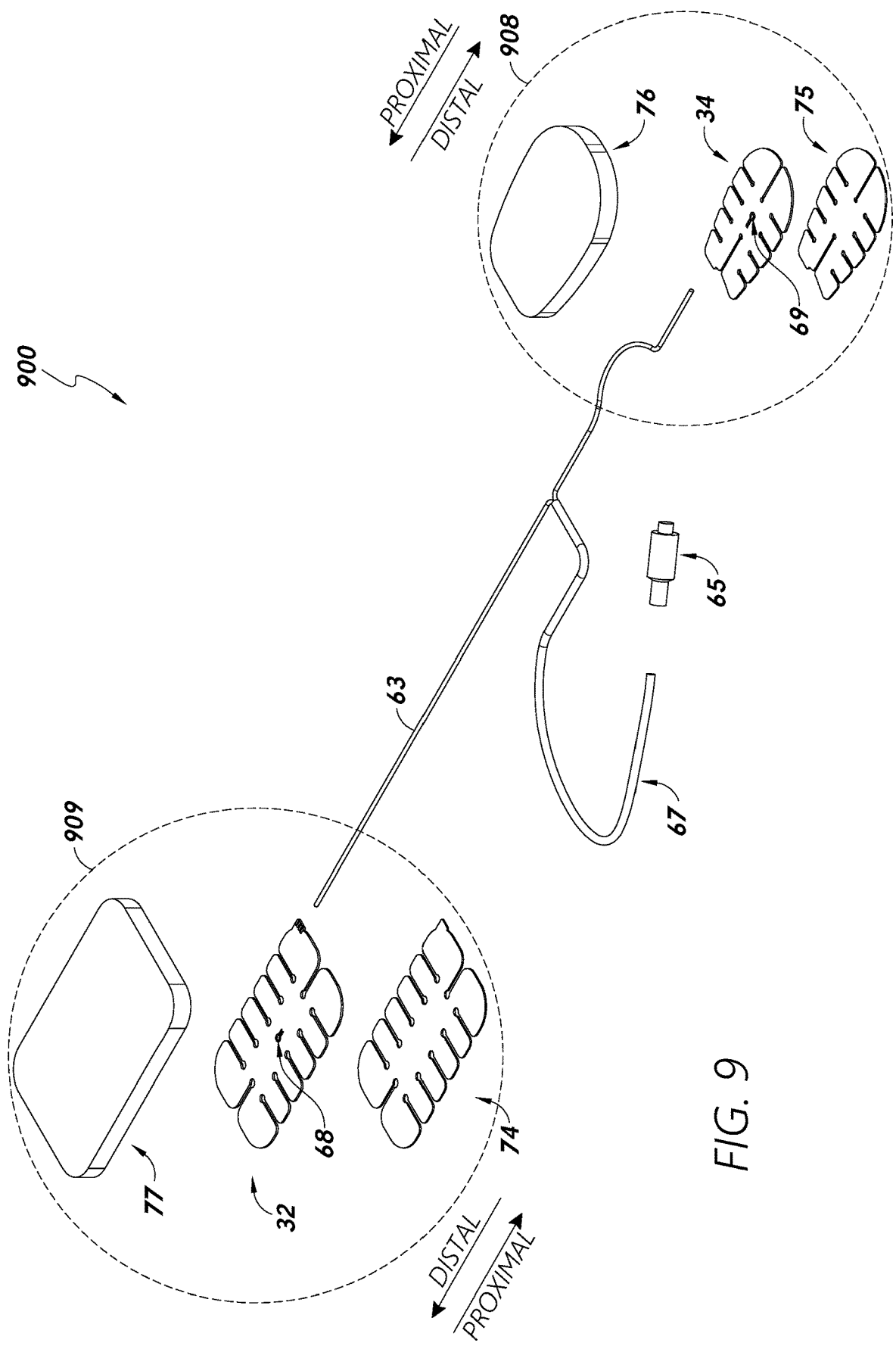
FIG. 9 is an exploded view of an example heater assembly in accordance with one or more embodiments.

FIG. 9 is an exploded view of an example heater assembly 900 in accordance with one or more embodiments. The heater assembly 900 includes a popliteal fossa heating pad assembly 909, which includes a heating pad 32, which may have any suitable or desirable shape, form and/or heating trace/conductor routing; the heating pad 32 may be any of the heating pads described herein. The assembly 909 may include one or more layers of certain heat-transfer medium 74. For example, the heat-transfer medium 74 may comprise heat-transfer gel and/or other medium (e.g., silicone) configured to facilitate the transfer/conduction of thermal energy from the heating pad 32 through the patient-facing side of the heating pad assembly 909. In some embodiments, the heat transfer medium 74 is disposed on, over, and/or under one or more thermistors 68, which may be used to determine temperature conditions at or near the heating pad 32. The heating pad 32 may be any type of heating pad, such as a resistive radiating heating pad. For example, the heating pad 32 may comprise polyimide or other substrate material, which may be flexible or rigid in whole or in part. The heating pad 32, and/or thermistor(s) 68, may be coupled to electrical wiring 63, which may be electrically coupled to an electrical connector 65 of the assembly 900.

In some embodiments, the heating pad assembly 909 further includes certain thermal insulation structure/features 77, which may comprise heat-insulating foam and/or padding. The insulation structure 77 (e.g., foam, padding form) may have any features disclosed herein in connection with like components. In some embodiments, the insulation structure 77 has a similar shape to the heating pad 32. For example, the insulation structure 77 may have a rounded rectangular shape in embodiments in which a general outline of the perimeter of the heating pad 32 is that of a rectangle with rounded corners; the corners of the heating pad 32 and insulation 77 may or may not be rounded.

The heater assembly 900 further includes a foot heating pad assembly 908, which includes a heating pad 34, which may have any suitable or desirable shape, form and/or heating trace/conductor routing; the heating pad 34 may be any of the heating pads described herein. The assembly 908 may include one or more layers of certain heat-transfer medium 75. For example, the heat-transfer medium 75 may comprise heat-transfer gel and/or other medium (e.g., silicone) configured to facilitate the transfer/conduction of thermal energy from the heating pad 34 through the patient-facing side of the heating pad assembly 908. In some embodiments, the heat transfer medium 75 is disposed on, over, and/or under one or more thermistors 69, which may be used to determine temperature conditions at or near the heating pad 34. The heating pad 34 may be any type of heating pad, such as a resistive radiating heating pad. For example, the heating pad 34 may comprise polyimide or other substrate material, which may be flexible or rigid in whole or in part. The heating pad 34, and/or thermistor(s) 69, may be coupled to the electrical wiring 63.

In some embodiments, the heating pad assembly 908 further includes certain thermal insulation structure/features 76, which may comprise heat-insulating foam and/or padding. The insulation structure 76 (e.g., foam, padding form) may have any features disclosed herein in connection with like components. In some embodiments, the insulation structure 76 has a similar shape to the heating pad 34. For example, the insulation structure 76 may have a rounded, tapered rectangular shape that has a width that narrows moving from a distal end/portion of the form/structure to a proximal end/portion of the form/structure 76 in embodiments in which a general outline of the perimeter of the heating pad 34 is that of a tapered rectangle with rounded corners; the corners of the heating pad 34 and insulation 76 may or may not be rounded.

In some embodiments, the heater assembly 900 can be contained at least partially within a pouch, which may comprise plastic, fabric, or other material, and may be configured to contain the internal components of the heater assembly 900. In some embodiments, the heater assembly 900 may be configured to be sutured, welded, or otherwise secured in a sleeve member/article without a pouch around the heating pads and/or wiring components. In some embodiments, the heater assembly 900 includes certain control circuitry, which may be associated with any of the illustrated components. The wiring 63 may include an electrical connector portion 67, which may jut out from the path of the wiring 63 connected between the pad assemblies 908, 909.

Figure 10A:
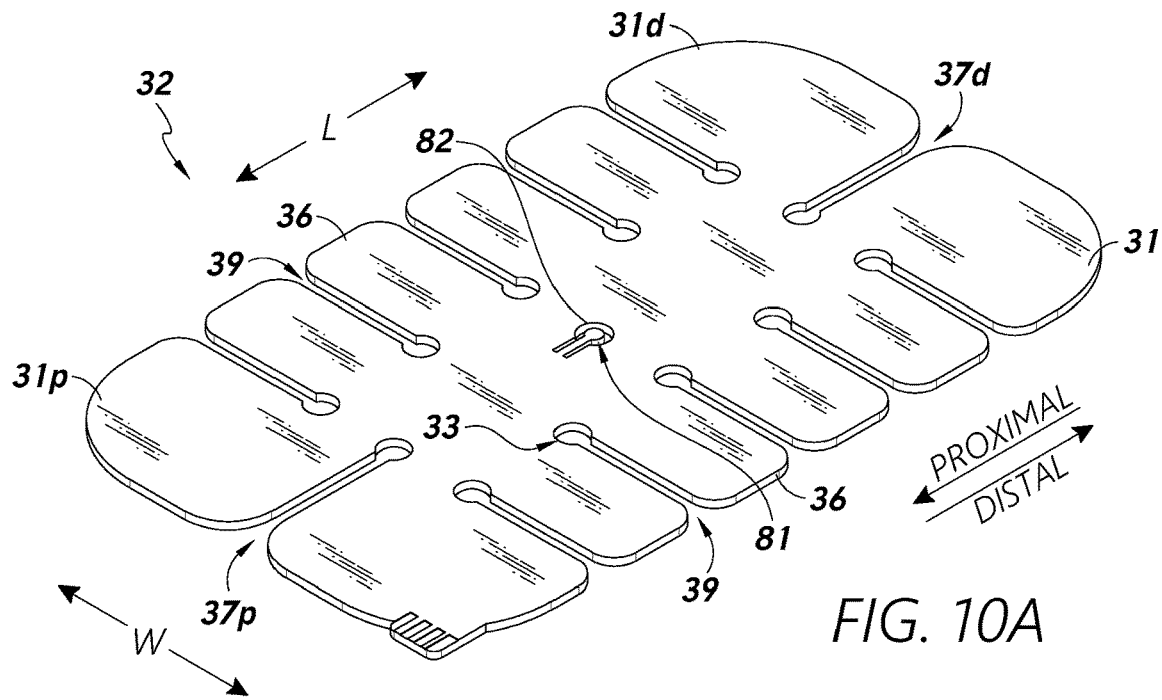
Figure 10B:
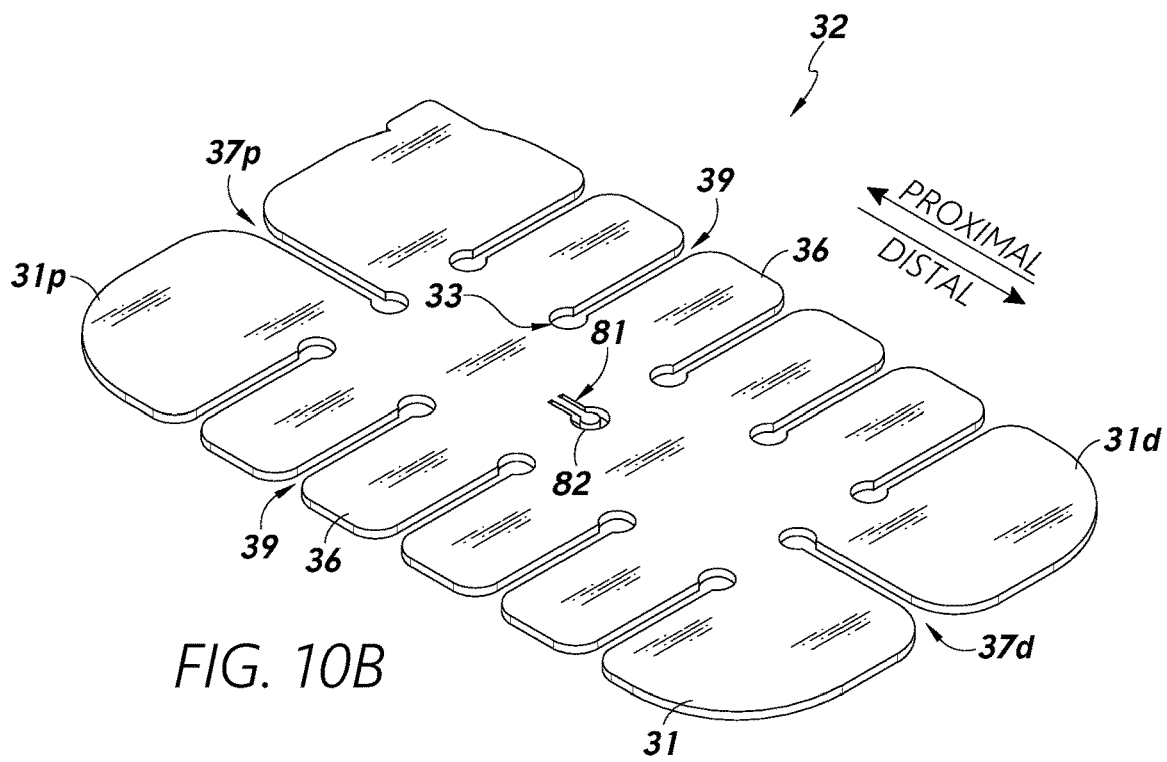
Figure 10E:
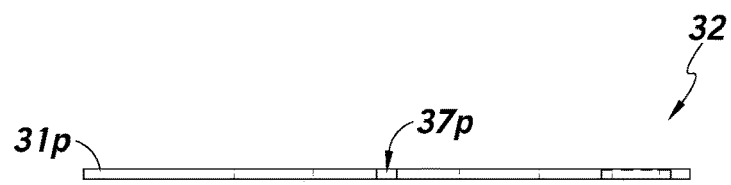
Figure 10F:
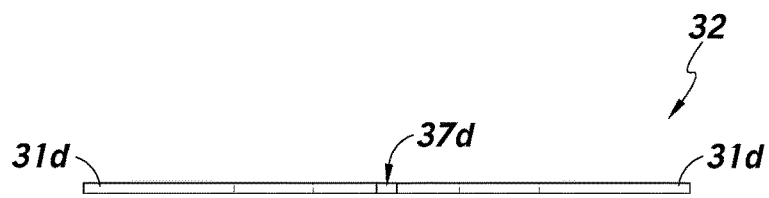
Figure 10G:
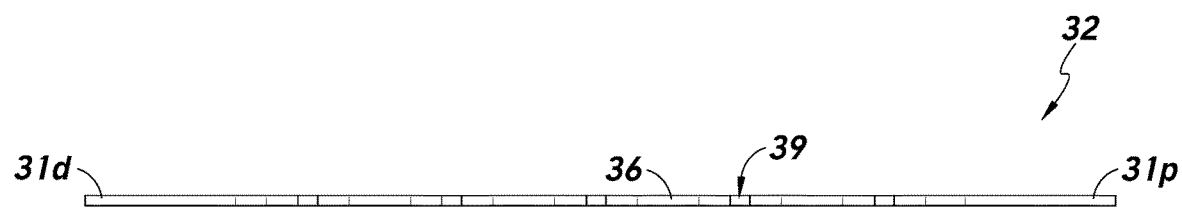
Figure 10H:
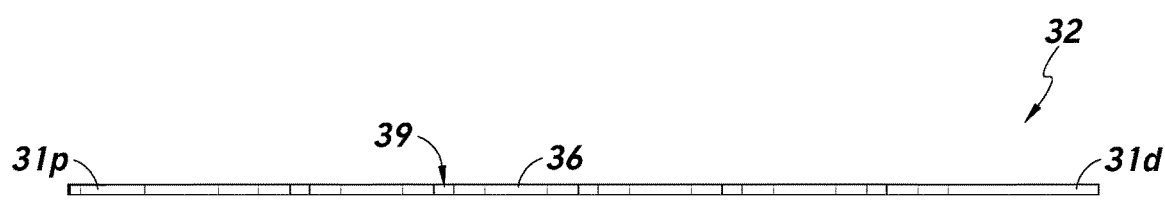

FIGS. 10A-10H show views of a popliteal fossa heating pad 32 in accordance with one or more embodiments. In particular, FIG. 10A shows a front (or back) and side perspective view of the heating pad 32. FIG. 10B shows a back (or front) and side perspective view of the heating pad 32. FIG. 10C shows a front (or back) view of the heating pad 32. FIG. 10D shows a back (or front) view of the heating pad 32. FIG. 10E shows a proximal longitudinal side view of the pad 32. FIG. 10F shows a distal longitudinal side view of the heater pad 32. FIG. 10G shows a first transverse/lateral side view of the heating pad 32. FIG. 10H shows a second transfer/lateral side view of the heating pad 32.

Although described as a popliteal fossa heating pad, it should be understood that the heating pad 32 may be used for heating any anatomy, such as a foot, arm bend, or other anatomy. The embodiments of the heating pad 32 shown in FIGS. 10A-10H may represent an embodiment of any of the heating pads disclosed herein. Furthermore, it should be understood that the illustrated heating pad 32 may comprise any of the features described herein in connection with any heating pad embodiments.

As illustrated, the heating pad 32 may have a generally rectangular form or shape, such that an outline around the perimeter thereof may be generally rectangular in shape. Furthermore, the shape of the heating pad 32 may be rounded at corners thereof. That is, corner tabs or portions 31 of the pad 32 may have rounded corners or edges, as shown. The pad 32 may further comprise one or more lateral/transverse slits, cut-outs, or channels 39, which may terminate in a bulbous/expanded terminus 33 in some embodiments. The transverse slits/channels 39 may generally extend from a perimeter of a side of the pad 32 generally towards a widthwise W center of the pad 32. The form of the pad 32 may be formed of one or more layers of substrate and may include certain resistive heating conductors and/or thermistor-connected conductors, as described herein. The pad 32 may further comprise one or more longitudinal slits, cut-outs, and/or channels 37. For example, the illustrated embodiment includes a single distal longitudinal slit/channel 37d, which projects from a distal end/side towards a lengthwise center of the pad 32, as well as a single proximal longitudinal slit/channel 37p, which projects from a proximal end/side towards the lengthwise center of the pad 32. The various slits/channels of the pad 32 form/define a plurality of transverse tabs 36 and corner/longitudinal tabs 31, which may provide desired flexibility for the substrate.

The heating pad 32 further comprises a deflectable (or non-deflectable) thermistor tab 81, which may be formed and/or defined by a thermistor channel/void 82 cut-out and/or otherwise formed in the substrate of the pad 32, thereby creating an airgap/void around the tab 81, as shown.

Figure 11A:
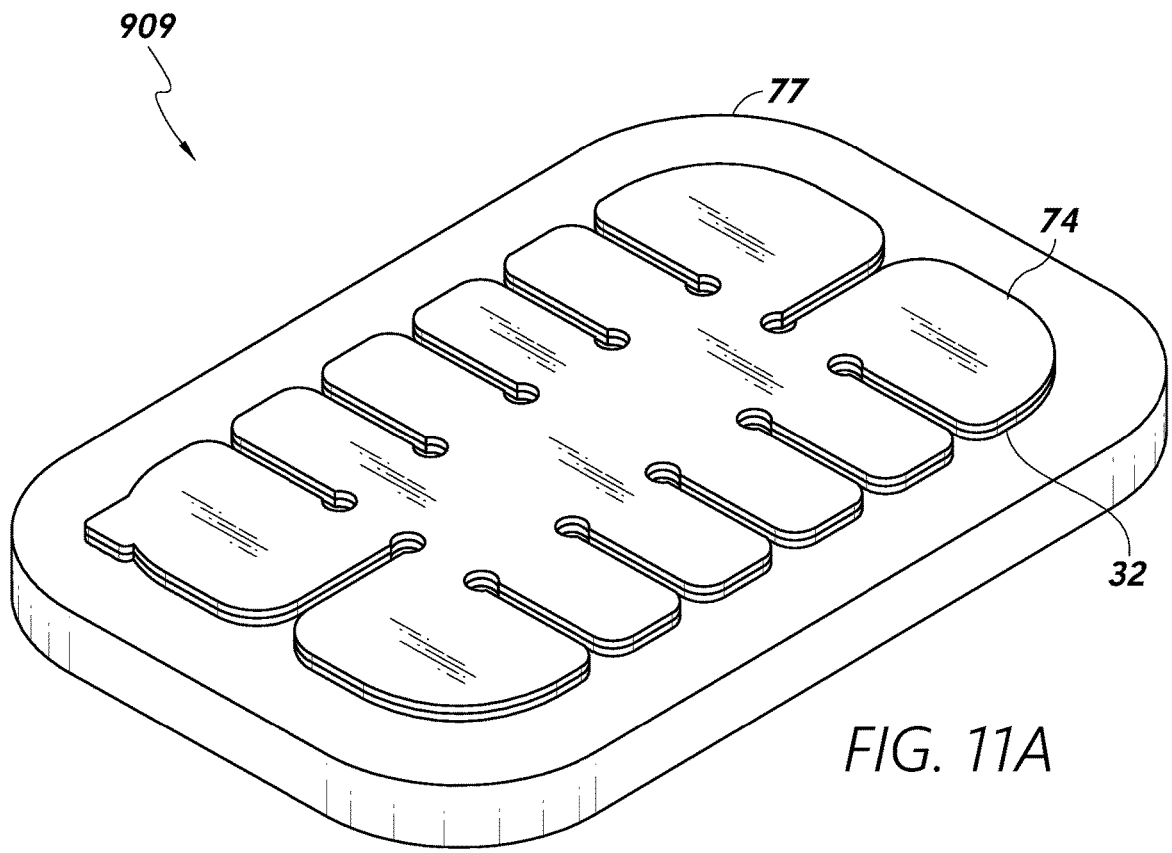
FIGS. 11A-11C show views of a popliteal fossa heating pad assembly in accordance with one or more embodiments.
Figure 11B:
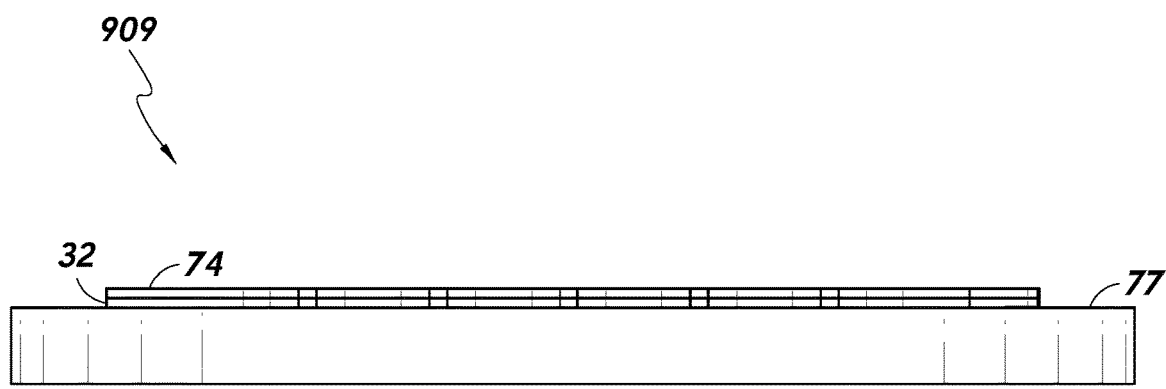
Figure 11C:
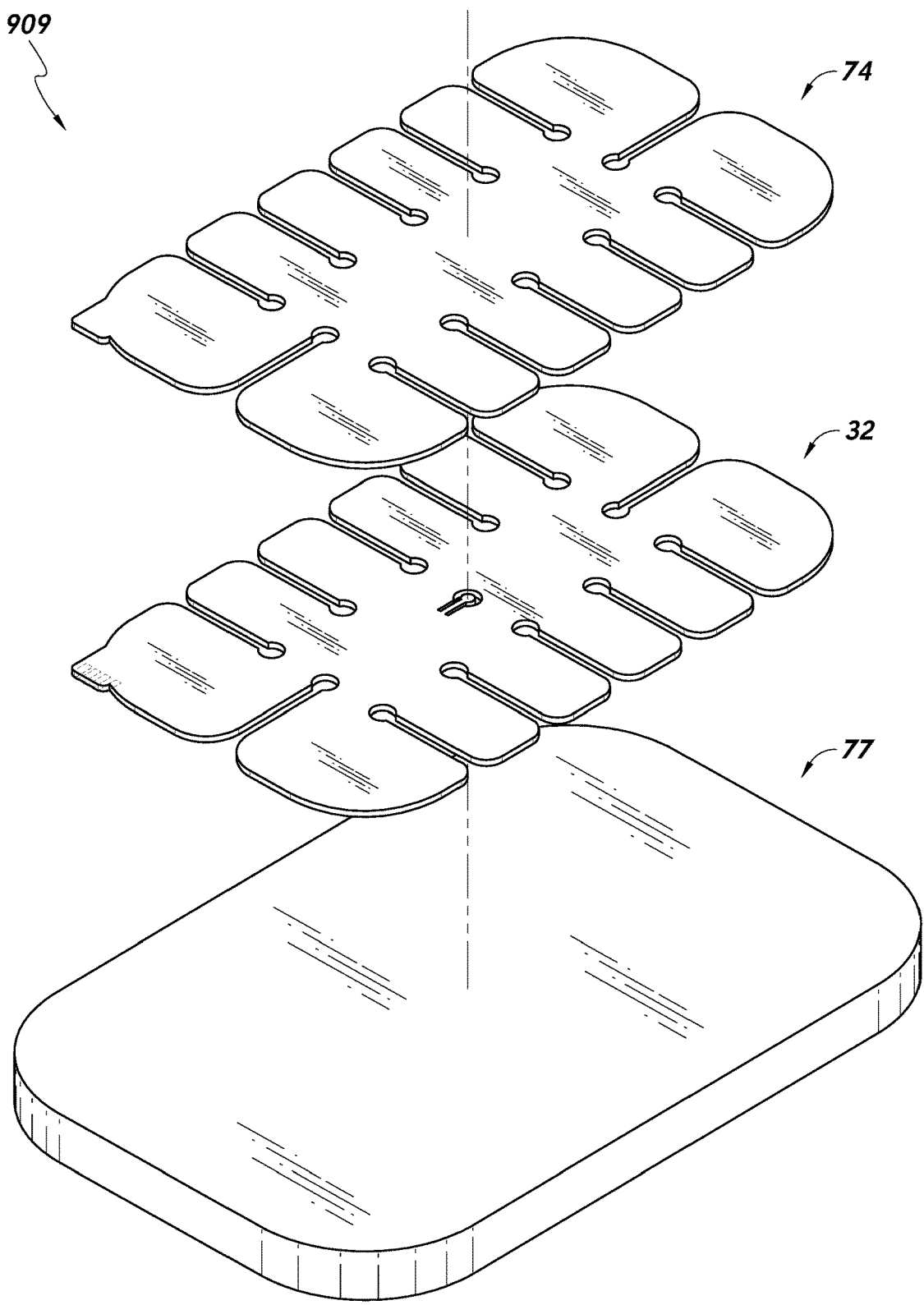

FIGS. 11A-11C show views of a popliteal fossa heating pad assembly 909 in accordance with one or more embodiments. In particular, FIG. 11A shows a front (e.g., patient-facing side) and side perspective view of the heating pad assembly 909. FIG. 11B shows a transverse side view of the heater pad assembly 909. FIG. 11C shows an exploded frontside and side perspective view of the heating pad assembly 909. The heating pad assembly 909 includes a heating pad 32, which may represent an embodiment of any of the heating pads disclosed herein, as well as a thermal-transfer form or layer(s) 74 disposed on the heating pad 32 on a patient-facing side thereof, as well as an insulator structure/form 77, which may be disposed on a backside of the heating pad 32, as described in detail herein.

Figures 2, 12:
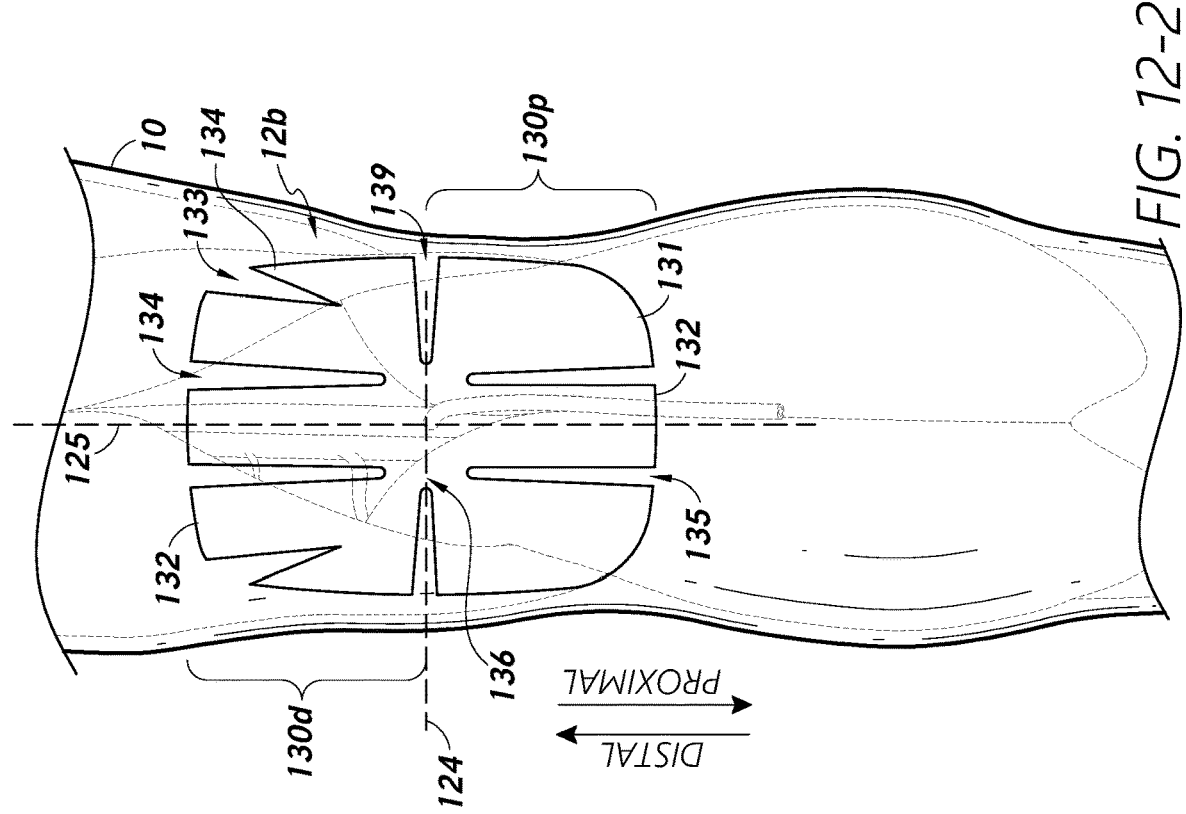
Figures 1, 12:
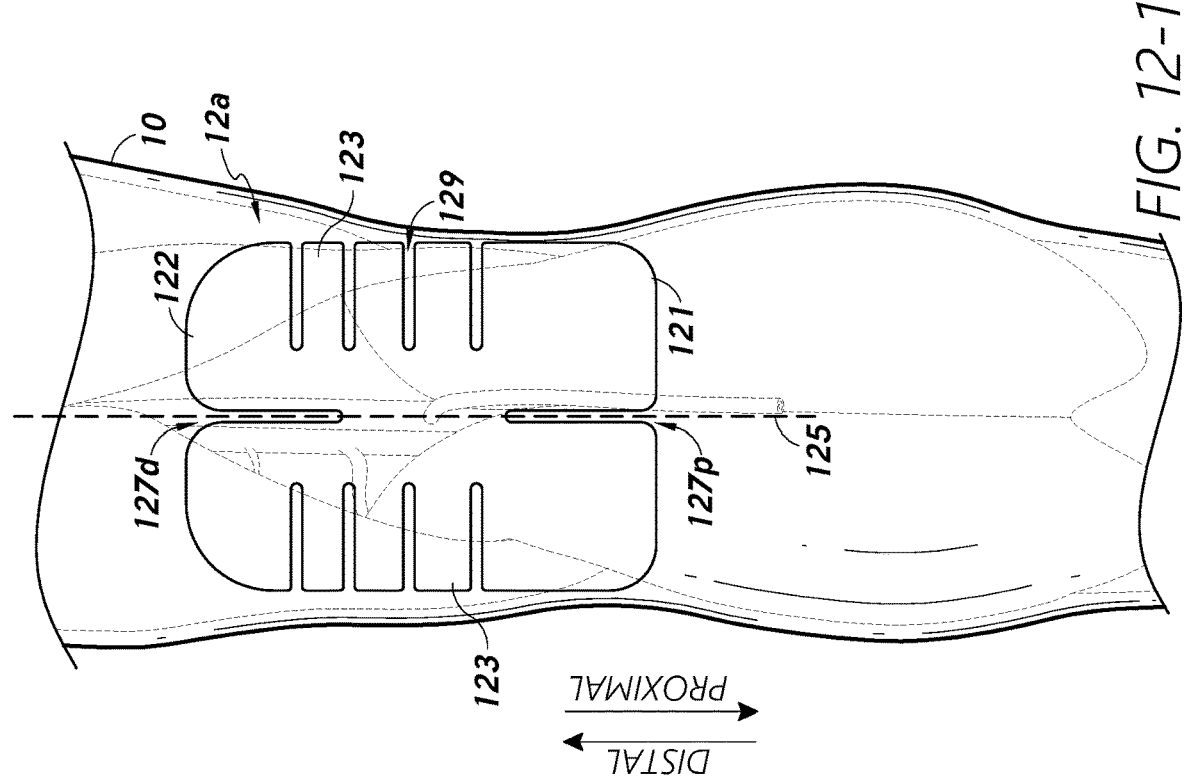
Figures 4, 12:
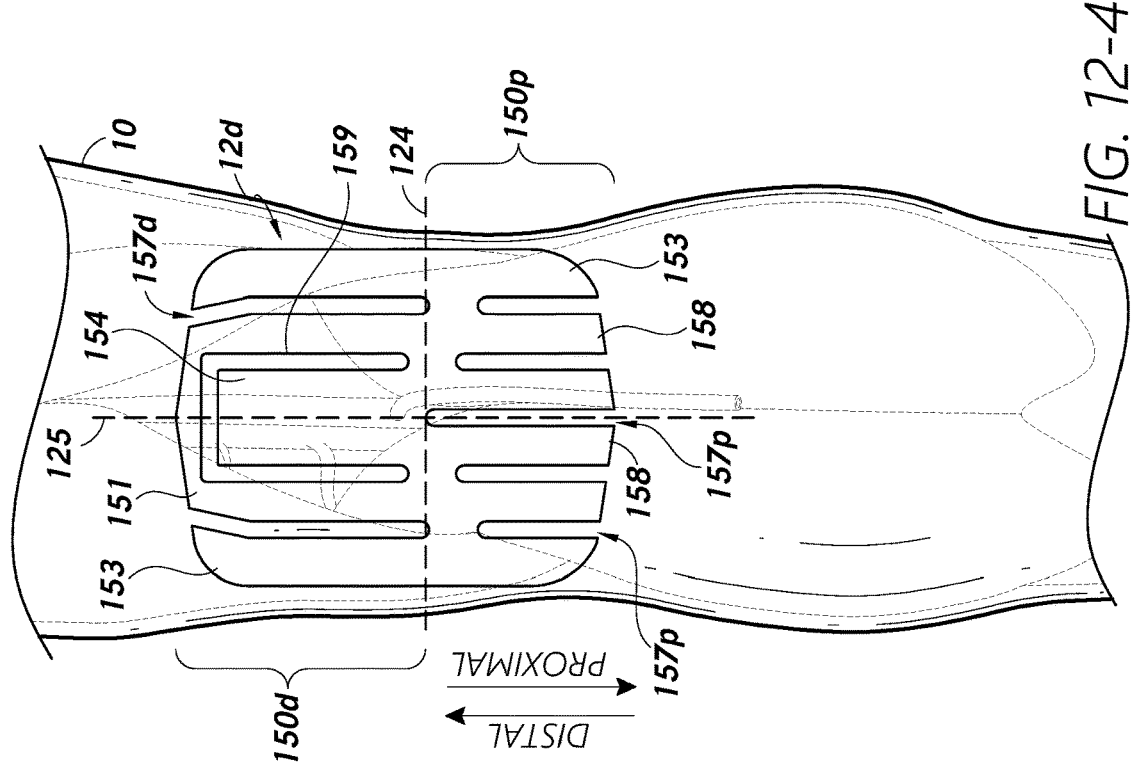
Figures 3, 12:
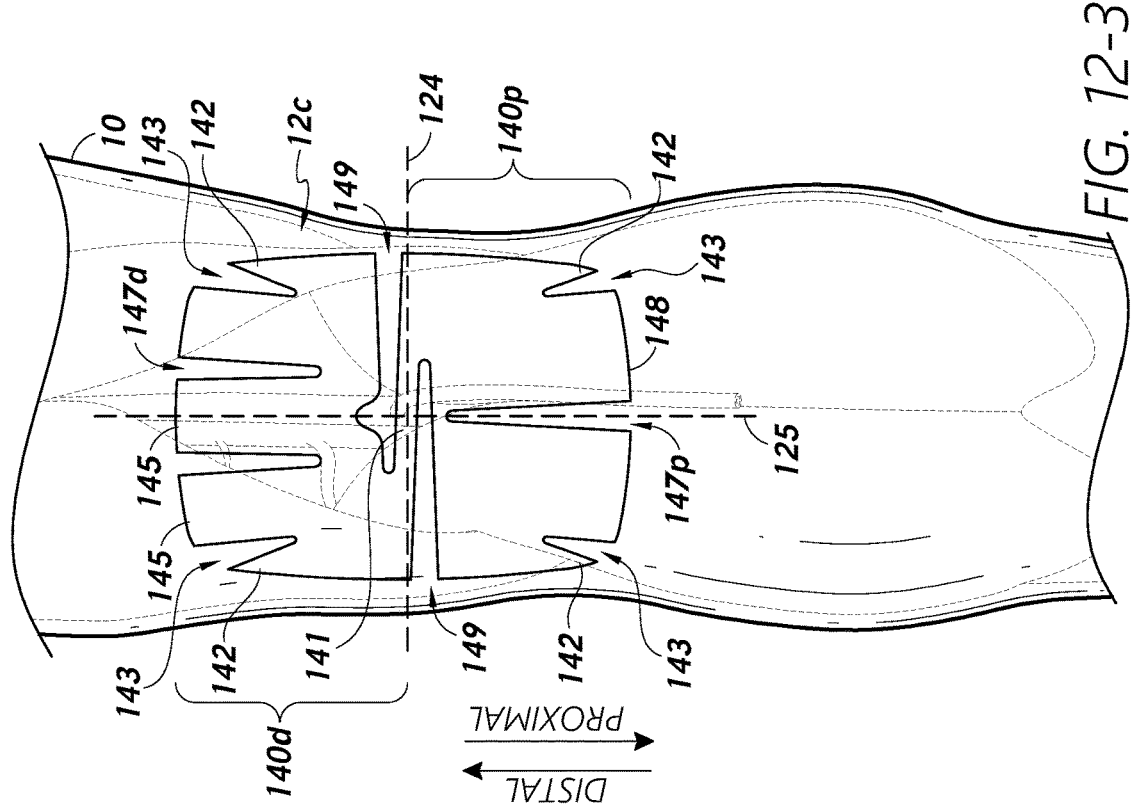
Figures 6, 12:
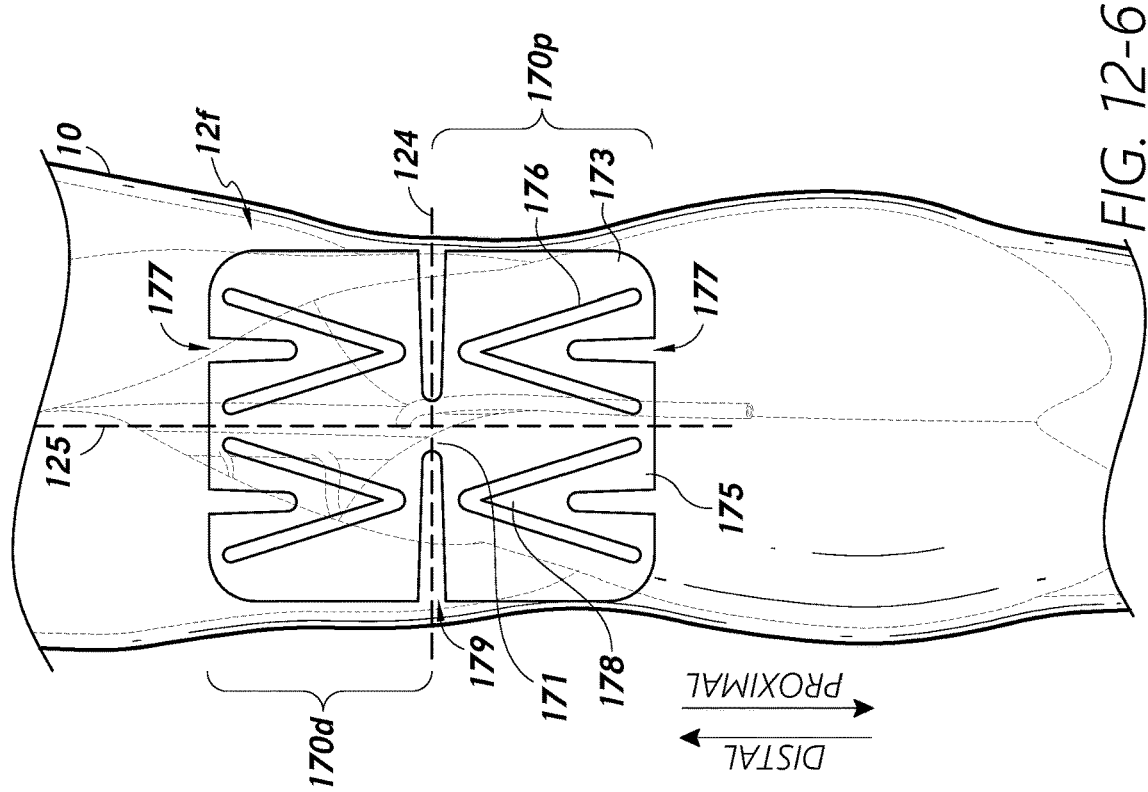
Figures 5, 12:
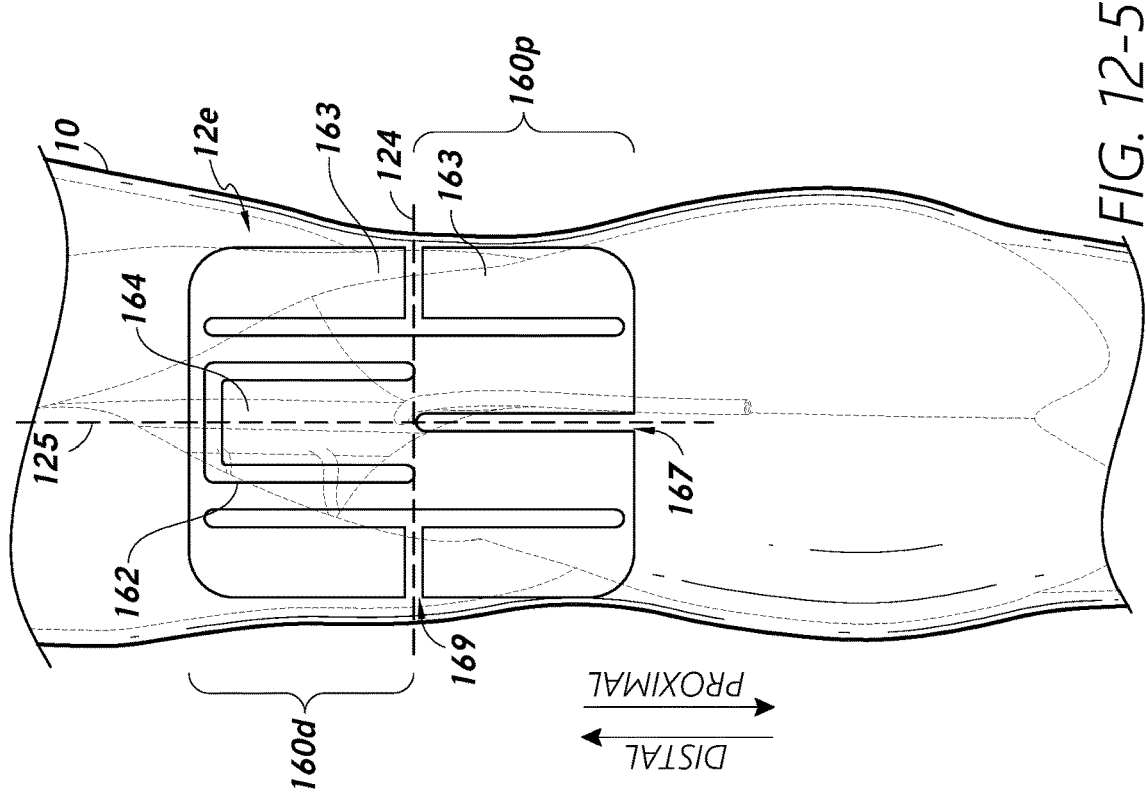
Figures 7, 12:
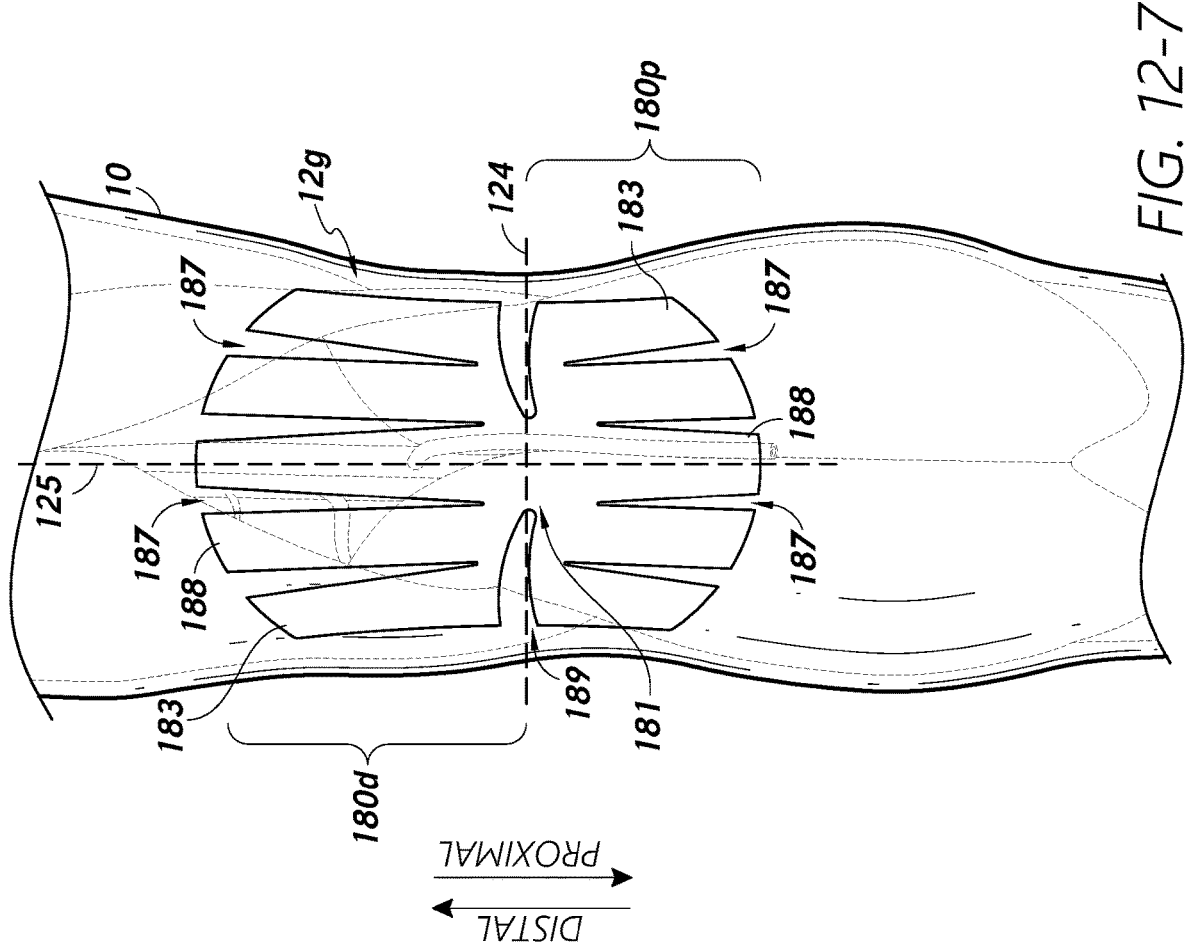

FIGS. 12-1-12-7 show popliteal fossa heating pad designs in accordance with one or more embodiments. Although not shown for clarity, it should be understood that the various heating pad designs of FIGS. 12-1-12-7 may have associated therewith resistive heating conductors/traces and/or thermistor components having any suitable or desirable layout or configuration relative to the various features of the respective embodiments.

FIG. 12-1 shows a popliteal fossa heating pad 12a including a plurality of lateral/transverse slits/channels 129 on both sides of a bifurcating line of symmetry 125, wherein such channels extend from an outer perimeter towards the center 125. The heating pad 12a further includes a distal longitudinal channel/slit 127d as well as a proximal longitudinal channel/slit 127p, both of which may extend generally towards a lengthwise center of the pad 12a. The heating pad 12a includes a plurality of transverse tabs 123, which may be formed and/or defined by the transverse slits/channels 129. The heating pad 12a further includes a plurality of distal corner tabs 122 and proximal corner tabs 121. In some embodiments, the proximal corner tabs 121 are longer than the distal corner tabs 122 in the dimension of the line 125.

FIG. 12-2 illustrates an embodiment of a heating pad 12b that is symmetrical about a lengthwise axis/line 125, as shown. The heating pad 12b includes a distal portion 130d and a proximal portion 130p, wherein such separate longitudinally-offset portions may have different features in some embodiments. The heating pad 12b may include distal longitudinal slits/channels 134 as well as proximal longitudinal slits/channels 135, wherein such channels may define certain deflectable tabs 132. The distal portion 130d of the heating pad 12b may include corner slits/cut-outs 133, which may at least partially define one or more corner tabs 134. The heating pad 12b may further comprise proximal corner tabs 131 and transverse channels 139 that separate the distal portion 130d from the proximal portion 130p and allow for bending of the heating pad 12b about the line 124 at a neck portion 36 of the pad.

FIG. 12-3 shows an S-shaped heating pad 12c including a diagonal strut/band 141 coupling a distal portion 140d and a proximal portion 140p across a medial line 124. While the pad 12c may include certain features that are symmetrically mirrored across the line of bifurcation 125, the pad 12c may not be fully symmetrical due at least in part to the diagonal band 141. The distal portion 140d may include a plurality of longitudinal slits 147d defining longitudinal tabs 145, as well as one or more corner slits 143, which may at least partially define corner tabs 142. The proximal portion 140p may likewise include at least one longitudinal slit 147p and one or more corner slits 143 defining flexible tabs 148 and corner tabs 142. Transverse channels 149 extending from opposite sides of the pad 12c may define the diagonal band 141 and provide desirable flexibility about the medial line/area 124.

FIG. 12-4 provides a heating pad 12d that is symmetrical about a bifurcation line 125. The heating pad 12d may be considered to comprise a distal portion 150d and a proximal portion 150p, wherein each portion may have similar and/or distinct characteristics and/or features. In some embodiments, the distal portion 150d includes a horseshoe type tab 151 that is disposed about an internal tab 154, wherein an internal gap/cut-out 159 separates such tabs. Additional longitudinal slits/channels 157d may be included between the horseshoe tab 151 and corner tabs 153 on either side of the horseshoe tab 151, which in some embodiments are longer and/or extend farther towards the proximal portion 150p than the longitudinal legs/portions of internal channel 159, as shown. The proximal portion 150p may include a plurality of longitudinal slits/channels 157p, which may define flexible tabs 158 and corner tabs 153, as shown. In some embodiments, as shown in FIG. 12-4, the length of the channels 157p may increase moving towards the centerline 125, thereby producing a tapered channel design.

FIG. 12-5 shows a heating pad 12e disposed on a leg 10 of a patient, wherein the pad 12e includes an internal tab 164 associated with a distal portion 160d of the heating pad 12e, wherein the internal tab 164 is longitudinally oriented and defined by a horseshoe-type channel 162 that includes leg portions on either side of the tab 164. The proximal portion 160p of the heating pad 12e includes a central longitudinal slit/channel 167, which may extend into the pad 12e to an area at or near the line 124 dividing the distal portion 160d from the proximal portion 160p. The heating pad 12e may further comprise T-shaped channels/cut-outs 169, which may extend from both lateral sides of the heating pad 12e, as shown, and may define corner tabs 163, which are oriented towards the lengthwise line of delineation 124. That is, while various tabs of embodiments the present disclosure are oriented to project longitudinally away from the center of the pad, the tabs 163, due to the T-channels 169, project toward the center of the pad 12e and/or toward one another from opposite sides of the delineation line 124.

FIG. 12-6 illustrates an embodiment of a heating pad 12f including certain internal channels/cut-outs 176, which may be designed to increase flexibility of the distal 170d and proximal 170p portions of the heating pad 12f, wherein such portions may be separated and/or defined on either side of a lengthwise line of delineation 124. Lateral/transverse channels 179 may be aligned longitudinally with the line of delineation 124 and may provide for flexibility/bending about such line. A neck portion 171 may couple the distal portion 170d to the proximal portion 170p, as shown. In some embodiments, the heating pad 12f is symmetrical about the longitudinal bifurcation line 125 and the transverse delineation line 124. In some embodiments, either or both of the distal 170d and proximal 170p portions may include longitudinal slits/channels 177, which may define tabs 173 and/or 175. The heating pad 12f may further include additional internal tabs 178, which may be oriented towards the longitudinal center 124, and may be defined on one or more sides by the internal channels 176.

FIG. 12-7 shows a heating pad 12g including distal 180d and proximal 180p portions, wherein such portions may be divided by transverse slits/channels 189 and connected by a neck portion 181. The heating pad 12g may be substantially symmetrical about a bifurcation line 125 parallel with the longitudinal dimension of the heating pad 12g. Both the distal 180d and proximal 180p portions may include a plurality of longitudinal slits/channels 187, which may define certain longitudinally-projecting tabs 188 and corner tabs 183. In some embodiments, the distal and proximal edges/ends of the heating pad 12g may be curved across the various tabs thereof, as shown.

Figure 13A:
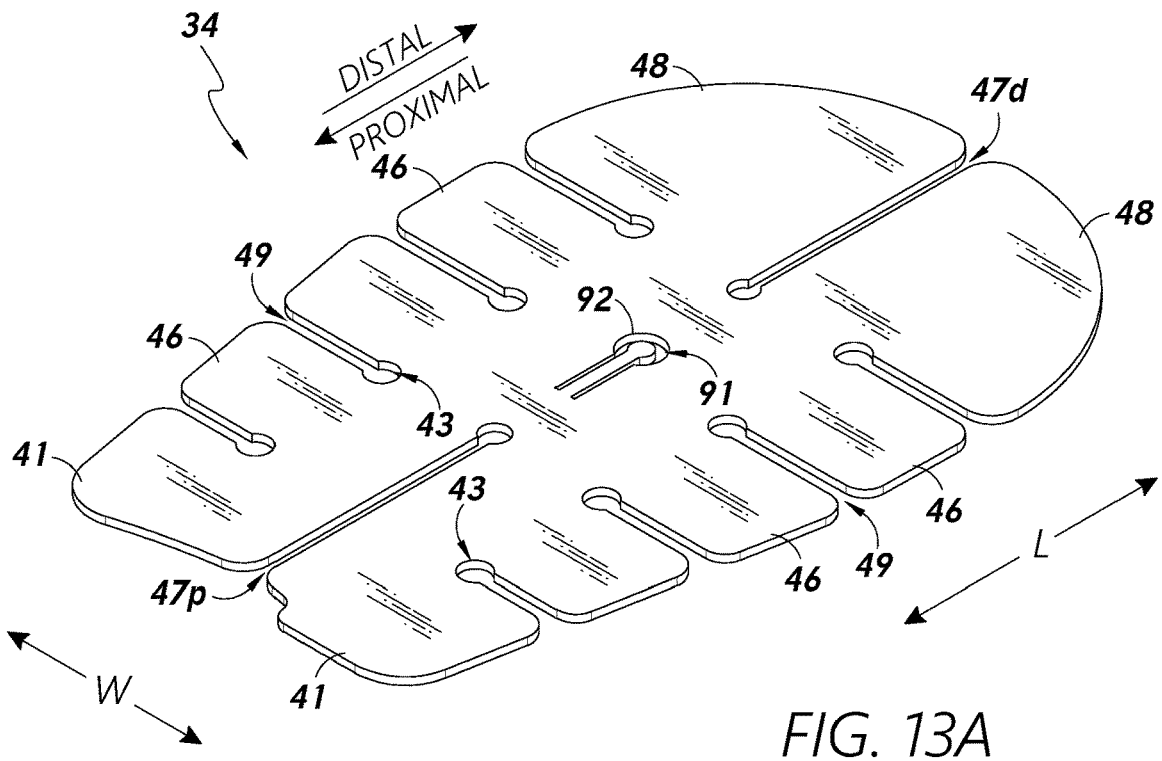
FIGS. 13A-13H show views of a foot heating pad in accordance with one or more embodiments.
Figure 13B:
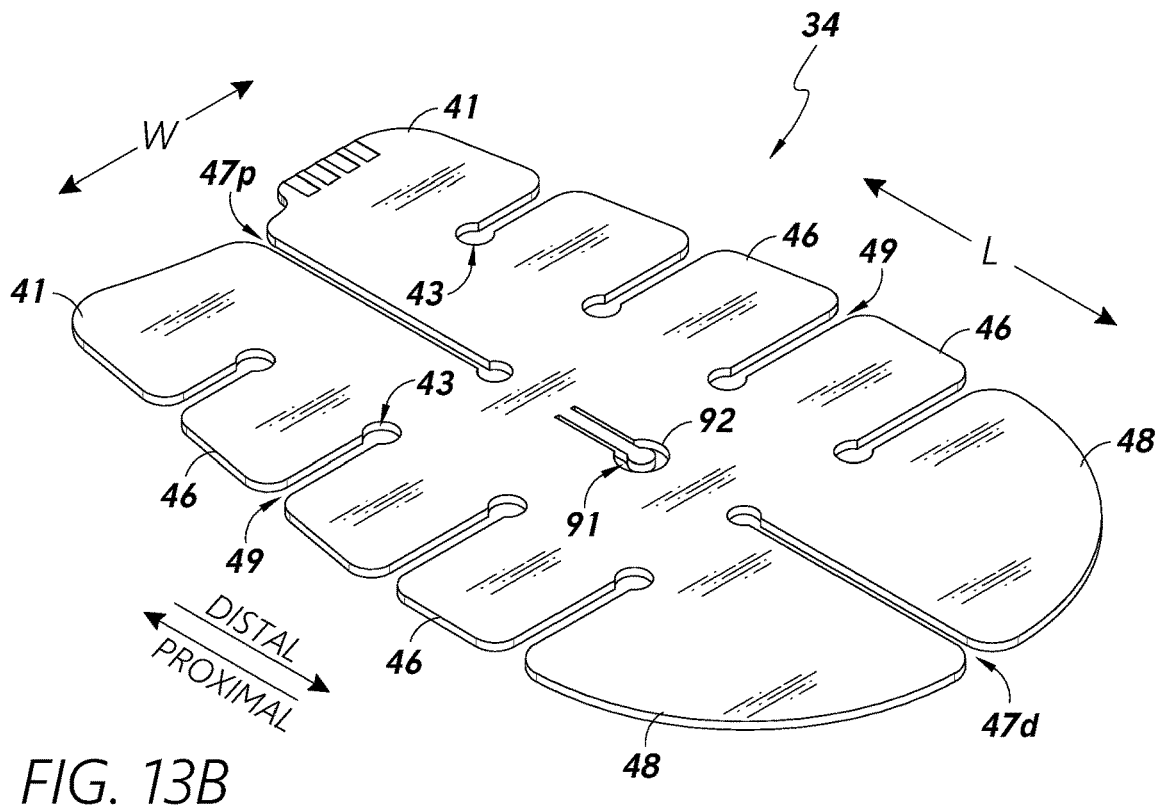
Figure 13D:
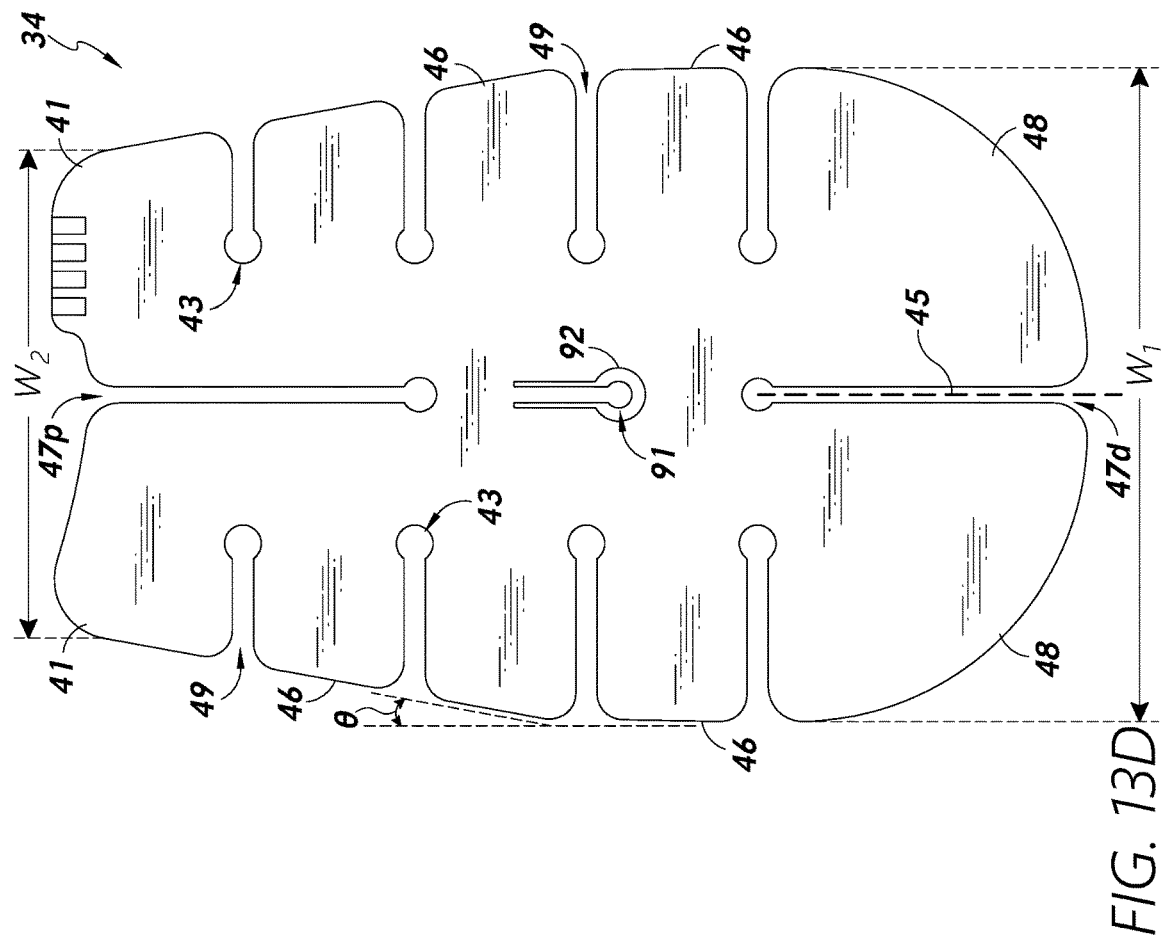
Figure 13C:
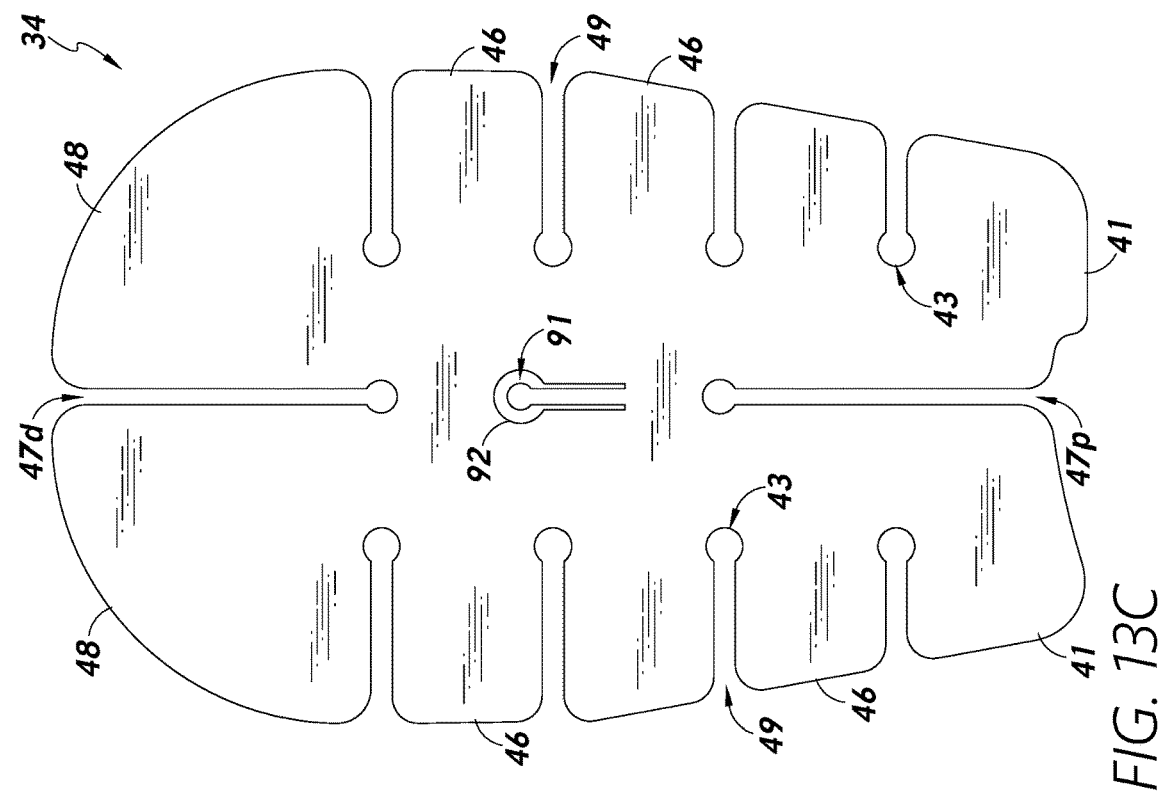
Figure 13E:
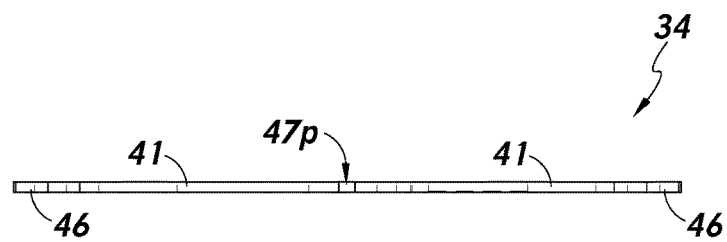
Figure 13F:
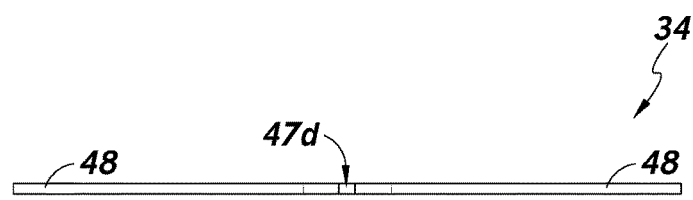
Figure 13G:
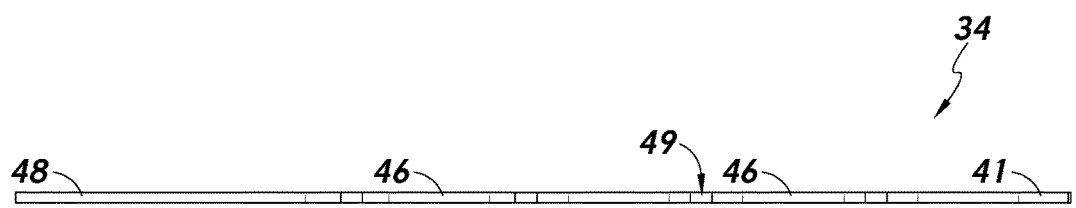
Figure 13H:
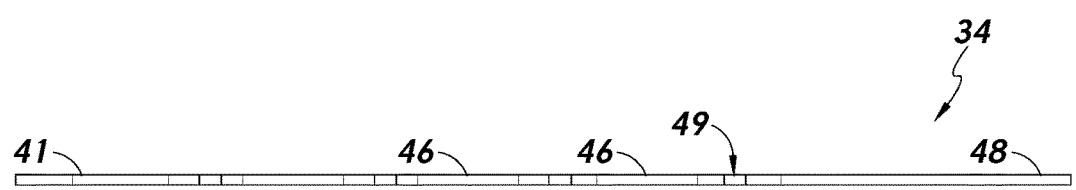

FIGS. 13A-13E show views of a foot heating pad 34 in accordance with one or more embodiments. In particular, FIG. 13A shows a front (or back) and side perspective view of the heating pad 34. FIG. 13B shows a back (or front) and side perspective view of the heating pad 34. FIG. 13C shows a front (or back) view of the heating pad 34. FIG. 13D shows a back (or front) view of the heating pad 34. FIG. 13E shows a proximal longitudinal side view of the pad 34. FIG. 13F shows a distal longitudinal side view of the heater pad 34. FIG. 13G shows a first transverse/lateral side view of the heating pad 34. FIG. 13H shows a second transfer/lateral side view of the heating pad 34.

Although described as a foot heating pad, it should be understood that the heating pad 34 may be used for heating any anatomy, such as a popliteal fossa, arm bend, or other anatomy. The embodiments of the heating pad 34 shown in FIGS. 13A-13H may represent an embodiment of any of the heating pads disclosed herein. Furthermore, it should be understood that the illustrated heating pad 34 may comprise any of the features described herein in connection with any of the heating pad embodiments of the present disclosure.

As illustrated, the heating pad 34 may have a tapered and/or rounded, generally rectangular form or shape, such that an outline around the perimeter thereof may be generally rectangular in shape with rounded corners. That is, corner tabs or portions 48 and/or 41 of the pad 34 may have rounded corners or edges, as shown. The pad 34 may further comprise one or more lateral/transverse slits, cut-outs, or channels 49, which may terminate in a bulbous/expanded terminus form in some embodiments. The transverse slits/channels 49 may generally extend from a perimeter of a side of the pad 34 generally towards a widthwise W center of the pad 34. The pad 34 may be formed of one or more layers of substrate (e.g., flexible substrate), and may include certain resistive heating conductors and/or thermistor-connected conductors, as described herein. The pad 34 may further comprise one or more longitudinal slits, cut-outs, and/or channels 47. For example, the illustrated embodiment includes a single distal longitudinal slit/channel 47*d*, which projects from a distal end/side towards a lengthwise center of the pad 34, as well as a single proximal longitudinal slit/channel 47*p*, which projects from a proximal end/side towards the lengthwise center of the pad 34. The various slits/channels of the pad 34 form/define a plurality of transverse tabs 46 and corner/longitudinal tabs 41, 48, which may provide desired flexibility for the substrate. The distal corner tabs 48 may have a greater radius of curvature than the proximal corner tabs 41. In some embodiments, the two distal corner tabs 48 may collectively form a semicircular form that is bisected at least partially by the longitudinal channel 47*d*.

The heating pad 34 further comprises a deflectable (or non-deflectable) thermistor tab 91, which may be formed and/or defined by a thermistor channel/void 92 cut-out from and/or otherwise formed in the substrate of the pad 34, thereby creating an airgap/void around the tab 91, as shown. The shape of the pad 34 may be at least partially tapered on the lateral sides thereof, as shown, such that the pad 34 has a greater width $w_1$ towards a proximal end of the tabs 46 than the width $w_2$ at the proximal end of the pad 34. Such form may be achieved by implementing lateral sides that are not parallel with the longitudinal dimension 45 of the pad 34, but rather are angled by an angle θ, as shown in FIG. 13C.

Figure 14A:
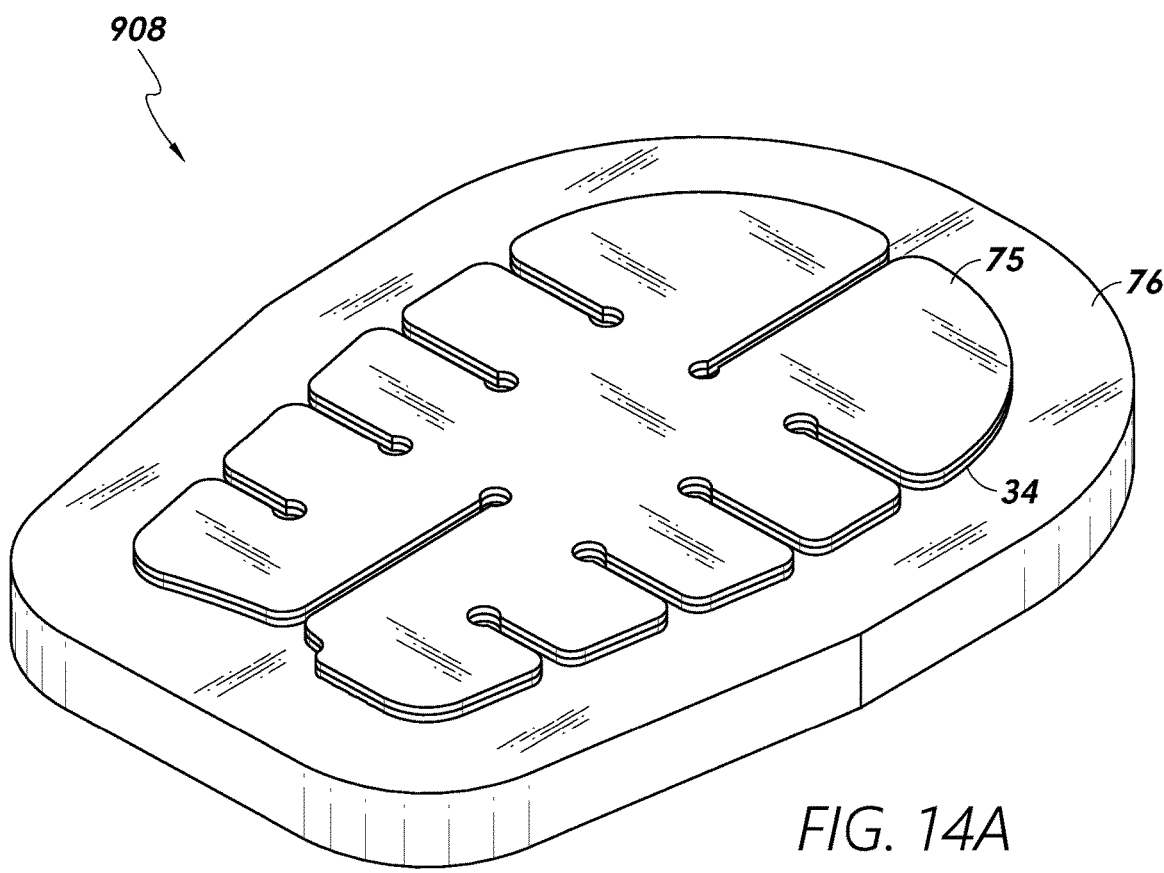
FIGS. 14A-14C show views of a foot heating pad assembly in accordance with one or more embodiments.
Figure 14B:
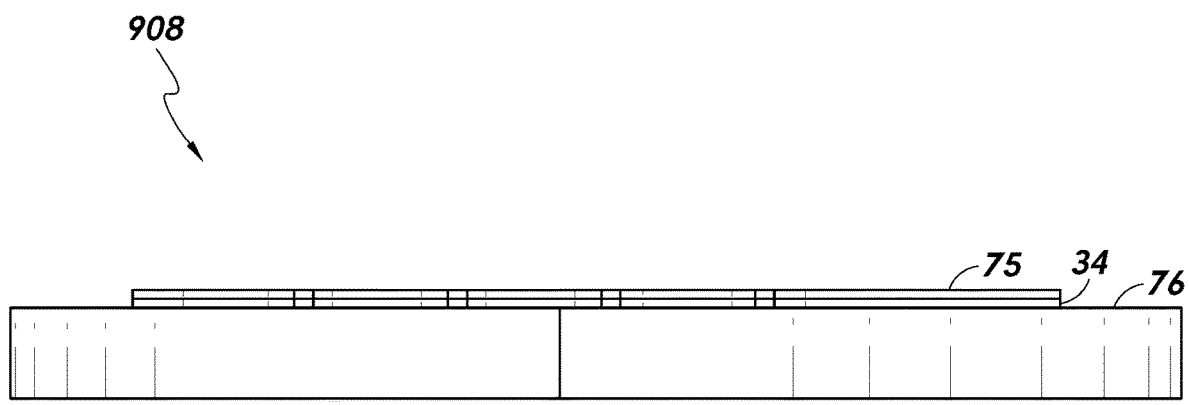
Figure 14C:
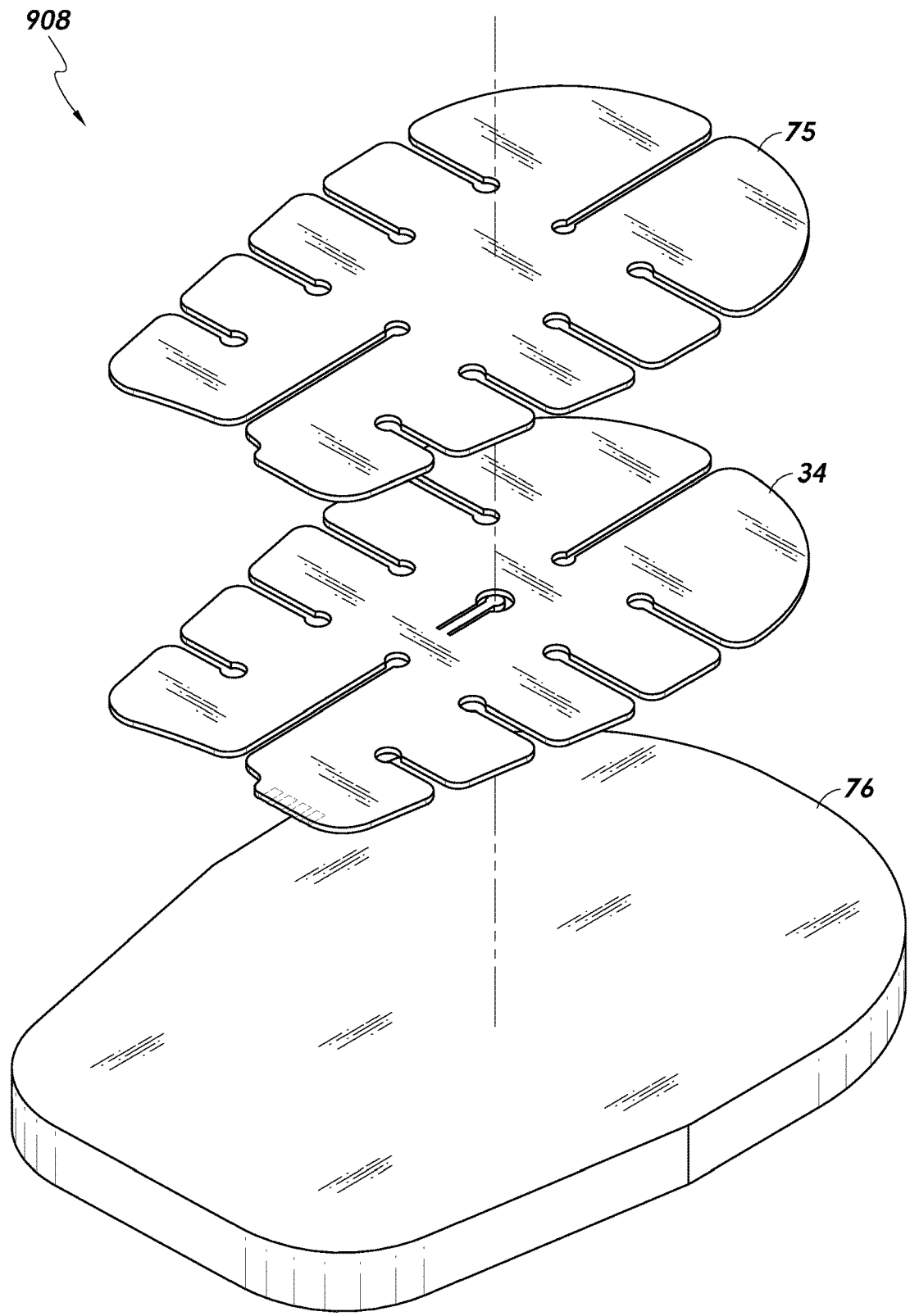

FIGS. 14A-14C show views of a foot heating pad assembly 908 in accordance with one or more embodiments. In particular, FIG. 14A shows a front (e.g., patient-facing side) and side perspective view of the heating pad assembly 908. FIG. 14B shows a transverse side view of the heater pad assembly 908. FIG. 14C shows an exploded frontside and side perspective view of the heating pad assembly 908. The heating pad assembly 908 includes a heating pad 34, which may represent an embodiment of any of the heating pads disclosed herein, as well as a thermal-transfer form or layer(s) 75 disposed on the heating pad 34 on a patient-facing side thereof, as well as an insulator structure/form 76, which may be disposed on a backside of the heating pad 34, as described in detail herein.

Figure 15:
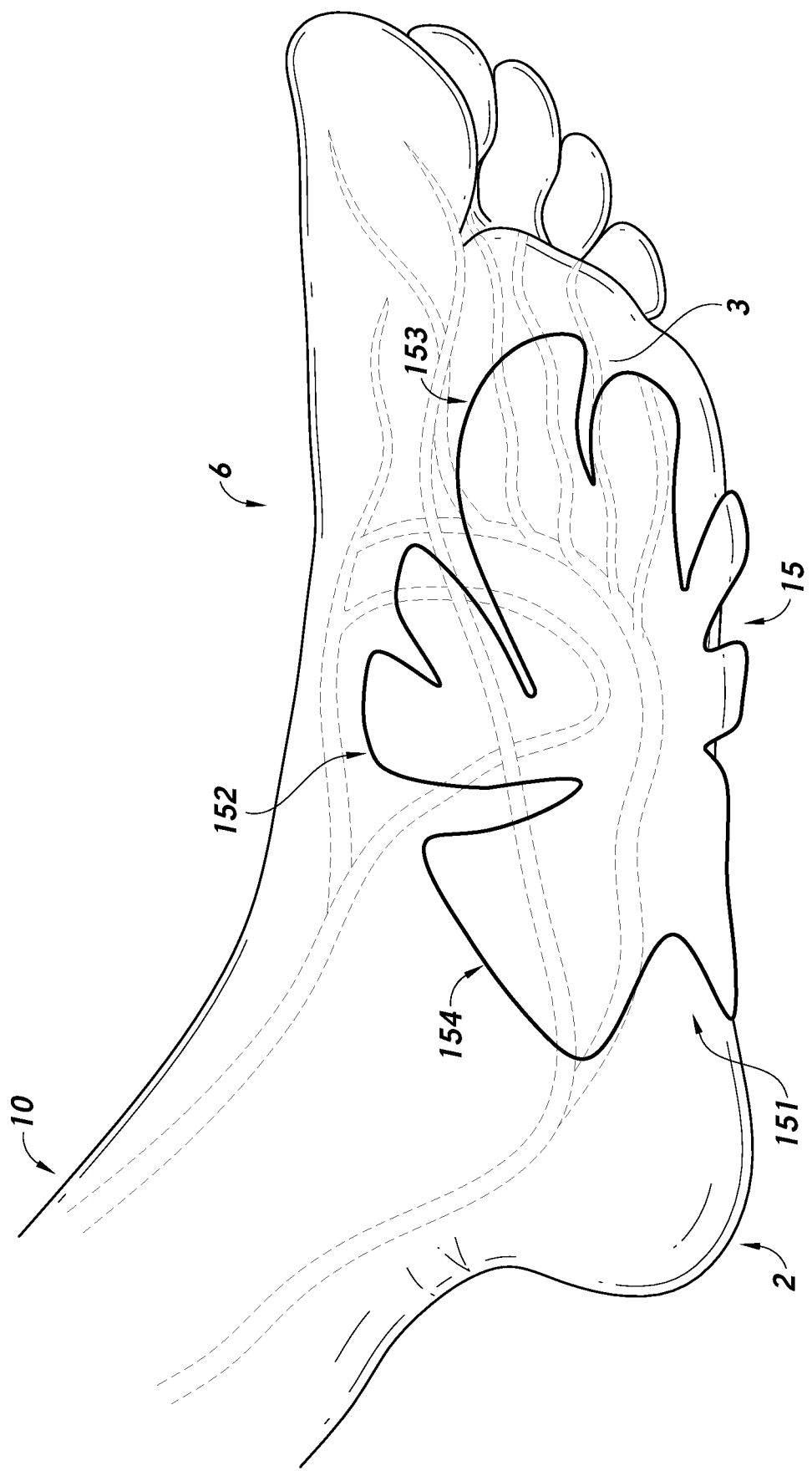
FIG. 15 shows a foot heating pad design in accordance with one or more embodiments.

FIG. 15 shows a foot heating pad design 15 in accordance with one or more embodiments. The foot heating pad 15 includes certain anatomical features, including a heel cut-out/contour 151 designed to fit around the heel 2 of the foot 6 and maximize the area of coverage of the heating pad 15 around the heel 2. The heating pad 15 further includes one or more arch tabs/projections 152, 154, which may be configured to wrap up alongside the arch and side of the foot 6 to cover target blood vessels for thermal energy transmission in accordance with aspects of the present disclosure. The heating pad 15 further includes certain tabs or projections 153 that may be designed to fit on or around the anatomy of the ball of the foot to maximize coverage over the sole of the foot and/or sides of the foot for efficient thermal energy transmission accordance with aspects of the present disclosure.

Figures 2, 16:
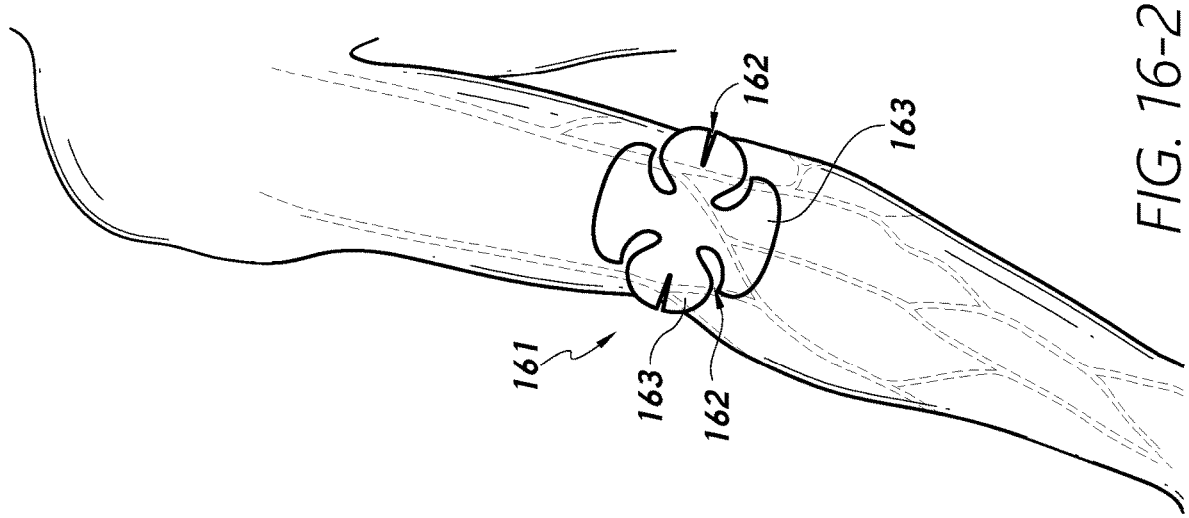
Figures 1, 16:
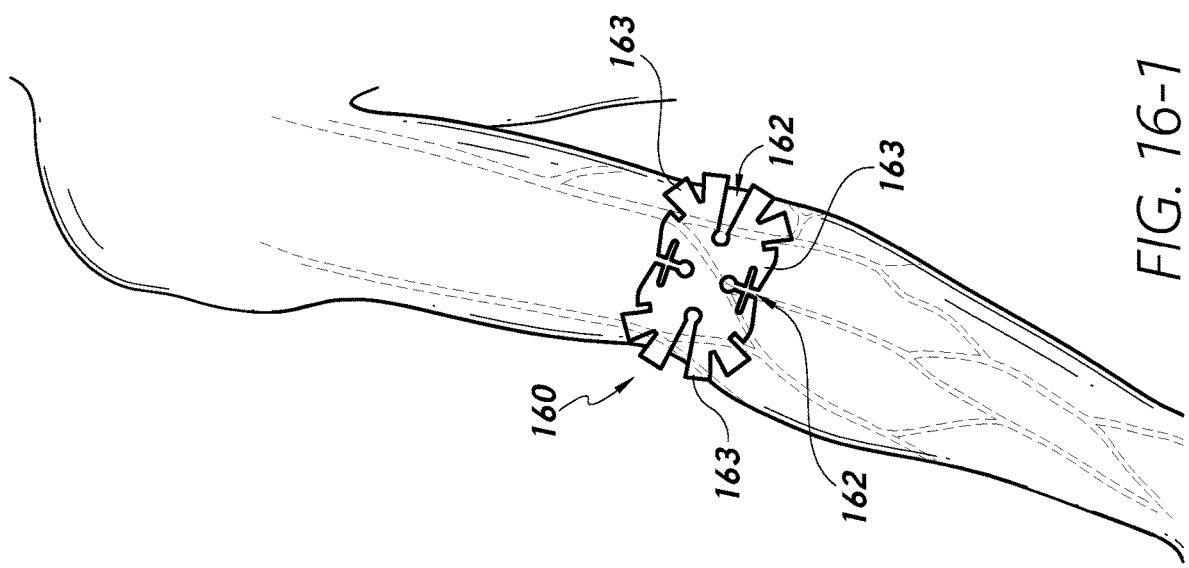

FIGS. 16-1 and 16-2 show arm heating pad designs in accordance with one or more embodiments. The arm pad designs 160, 161 may be configured to fit in the bend of the arm opposite the elbow, wherein such anatomy may represent an area of relatively close/exposed passage of veins and arteries, such that heating such areas can provide efficient thermal energy transfer to heat the body through blood circulation. The heating pads 160, 161 include various cut-outs/slits 162 that define and/or form various projections/tabs 163 that have certain flexibility and can be deflected to some degree relative to other portions of the heating pads due to the shape thereof and to the cut-outs/slits 162. It should be understood that any of the heating pads described herein can be utilized as arm heating pads and placed in the area shown in FIGS. 16-1 and 16-2.

Additional Embodiments

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes.

Conditional language used herein, such as, among others. "can." "could," "might." "may," "e.g.," and the like, unless specifically stated otherwise, or otherwise understood within the context as used, is intended in its ordinary sense and is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising." "including," "having," and the like are synonymous, are used in their ordinary sense, and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is understood with the context as used in general to convey that an item, term, element, etc. may be either X, Y or Z. Thus, such conjunctive language is not generally intended to imply that certain embodiments require at least one of X, at least one of Y and at least one of Z to each be present.

It should be appreciated that in the above description of embodiments, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the inventions herein disclosed and claimed below should not be limited by the particular embodiments described above, but should be determined only by a fair reading of the claims that follow.

It should be understood that certain ordinal terms (e.g., "first" or "second") may be provided for ease of reference and do not necessarily imply physical characteristics or ordering. Therefore, as used herein, an ordinal term (e.g., "first." "second." "third," etc.) used to modify an element, such as a structure, a component, an operation, etc., does not necessarily indicate priority or order of the element with respect to any other element, but rather may generally distinguish the element from another element having a similar or identical name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited.

Unless otherwise defined, all terms (including technical and scientific terms) used herein have the same meaning as commonly understood by one of ordinary skill in the art to which example embodiments belong. It be further understood that terms, such as those defined in commonly used dictionaries, should be interpreted as having a meaning that is consistent with their meaning in the context of the relevant art and not be interpreted in an idealized or overly formal sense unless expressly so defined herein.

The spatially relative terms "outer." "inner," "upper," "lower." "below." "above," "vertical," "horizontal," and similar terms, may be used herein for ease of description to describe the relations between one element or component and another element or component as illustrated in the drawings. It be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Unless otherwise expressly stated, comparative and/or quantitative terms, such as "less." "more." "greater." and the like, are intended to encompass the concepts of equality. For example, "less" can mean not only "less" in the strictest mathematical sense, but also, "less than or equal to."

What is claimed is:

1. A heating pad assembly comprising:
   a flexible heating pad comprising:
      a flexible substrate having a longitudinal dimension and a transverse dimension that is perpendicular to the longitudinal dimension, the flexible substrate forming a plurality of deflectable tabs including:
         first and second distal corner tabs each associated with both distal end and side portions of the flexible substrate, the first and second distal corner tabs being separated by a distal longitudinal slit that is positioned at a widthwise center of the flexible substrate and aligned with the longitudinal dimension;
         a first set of side tabs on a first side of the widthwise center of the flexible substrate, the first set of side tabs being separated by a first set of transverse slits that terminate on the first side and run parallel with the transverse dimension; and
         a second set of side tabs on a second side of the widthwise center of the flexible substrate, the second set of side tabs being separated by a second set of transverse slits that terminate on the second side and run parallel with the transverse dimension; and
      one or more electrically conductive heating traces routed through the plurality of deflectable tabs and configured to radiate heat therefrom in response to electrical current flowing through the one or more electrically conductive heating traces, the one or more electrically conductive heating traces crossing over both the widthwise center and a lengthwise center of the flexible substrate.

2. The heating pad assembly of claim 1, wherein the first set of side tabs and the second set of side tabs each include a plurality of tabs of progressively-increasing length moving in a distal direction.

3. The heating pad assembly of claim 2, wherein a distal-most tab of the first set of side tabs is adjacent to, and has a same transverse dimension as, the first distal corner tab.

4. The heating pad assembly of claim 3, the flexible substrate further comprising a proximal longitudinal slit that is positioned at the widthwise center of the flexible substrate and is aligned with the distal longitudinal slit.

5. The heating pad assembly of claim 4, the flexible substrate further comprising first and second proximal corner tabs separated by the proximal longitudinal slit.

6. The heating pad assembly of claim 5, wherein:
   the first and second distal corner tabs have an outer perimeter with a quarter-circle arc shape; and
   the first and second proximal corner tabs have rounded corners that have a smaller radius of curvature than the first and second distal corner tabs.

7. The heating pad assembly of claim 1, further comprising:
   a thermistor disposed at the widthwise center of the flexible substrate;
   wherein the flexible substrate includes a closed internal cut-out that surrounds at least a portion of the thermistor to form an elongated flexible tab within a contour of the internal cut-out, the elongated flexible tab running along the longitudinal dimension and configured to be deflected away from a plane of the flexible substrate independently of the first and second distal corner tabs, the first set of side tabs, and the second set of side tabs.

8. The heating pad assembly of claim 7, further comprising:
   a layer of heat transfer medium disposed on a patient-facing side of the flexible substrate; and
   an insulation structure disposed on an opposite side of the flexible substrate from the patient-facing side.

9. The heating pad assembly of claim 8, wherein:
   the layer of heat transfer medium has a shape that matches a shape of the flexible substrate; and
   the insulation structure has a width and a length that is greater than a width and a length of the flexible substrate, respectively.

10. The heating pad assembly of claim 7, wherein:
   the one or more electrically conductive heating traces consists of a single trace that is routed around perimeters and interiors of all of the plurality of deflectable tabs on both sides of the widthwise center of the flexible substrate; and the single trace runs along a path that follows a perimeter of a plurality of the first set of side tabs and doubles-back to form key-shaped traces in interior portions of the plurality of the first set of side tabs.

11. A heating pad assembly comprising:

a popliteal fossa heating pad comprising:
- a first flexible substrate having a first length in a first longitudinal dimension and a first width in a first transverse dimension perpendicular to the first longitudinal dimension, the first flexible substrate including a first set plurality of deflectable side tabs defined by transverse slits in the first flexible substrate that run parallel with the first transverse dimension; and
- one or more electrically conductive first heating traces configured to radiate heat in response to electrical current flowing therethrough;
- wherein the first set of side tabs are matched in length to define straight side profiles of the first flexible substrate; and a foot heating pad coupled to the popliteal fossa heating pad via a coupling dimensioned to span between a popliteal fossa and foot of a patient, the foot heating pad comprising:
- a second flexible substrate having a second length in a second longitudinal dimension, the second length being shorter than the first length, the second flexible substrate including a second set of deflectable side tabs defined by transverse slits in the second flexible substrate that run parallel with a second transverse dimension perpendicular to the second longitudinal dimension; and
- one or more electrically conductive second heating traces configured to radiate heat in response to electrical current flowing therethrough;
- wherein the second set of side tabs are graduated in length to define tapered side profiles of the second flexible substrate.

12. The heating pad assembly of claim 11, further comprising a heat transfer layer of silicone with a first side thereof disposed on a patient-facing surface of the first flexible substrate, wherein:

the first flexible substrate includes an internal cut-out that defines an elongate internal tab inside of an outer profile of the first flexible substrate;

a thermistor is disposed on a distal portion of the elongate internal tab; and the elongate internal tab is deflected out of a plane of the first flexible substrate to puncture through the heat transfer layer of silicone, such that the thermistor is positioned on a patient-facing side of the heat transfer layer of silicone.

13. The heating pad assembly of claim 11, wherein the heating pad assembly is integrated with a sleeve device configured to be worn on a limb of the patient.

14. The heating pad assembly of claim 12, further comprising one or more electrical conductors that run along the elongate internal tab to the thermistor, the one or more electrical conductors passing through the heat transfer layer of silicone.

15. The heating pad assembly of claim 12, wherein the internal cut-out defining the elongate internal tab provides a gap in the plane of the first flexible substrate that thermally isolates the thermistor from the one or more electrically conductive first heating traces.

16. The heating pad assembly of claim 12, wherein the elongate internal tab further punctures through a layer of cloth of a sleeve structure that is integrated with the heating pad assembly to position the thermistor outside of the sleeve structure on a patient-facing side of the sleeve structure.

17. The heating pad assembly of claim 11, wherein the second set of deflectable side tabs of the second flexible substrate of the foot heating pad have end profiles that are straight and angled relative to the first longitudinal dimension.

18. The heating pad assembly of claim 11, wherein the second flexible substrate includes two corner tabs that have quarter-circular curvature.

19. The heating pad assembly of claim 11, wherein a first one of the second set of deflectable side tabs has a greater length than a second one of the second set of deflectable side tabs.

20. The heating pad assembly of claim 11, wherein:

the first flexible substrate is symmetrical about distal and proximal longitudinal slits in the first flexible substrate that are parallel with the first longitudinal dimension; and the second flexible substrate is symmetrical about distal and proximal longitudinal slits in the second flexible substrate that are parallel with the second longitudinal dimension.

\* \* \* \* \*